US009507563B2

(12) United States Patent
Billa et al.

(10) Patent No.: US 9,507,563 B2
(45) Date of Patent: Nov. 29, 2016

(54) SYSTEM AND METHOD TO TRAVERSE A NON-DETERMINISTIC FINITE AUTOMATA (NFA) GRAPH GENERATED FOR REGULAR EXPRESSION PATTERNS WITH ADVANCED FEATURES

(71) Applicant: Cavium, Inc., San Jose, CA (US)

(72) Inventors: Satyanarayana Lakshmipathi Billa, Sunnyvale, CA (US); Rajan Goyal, Saratoga, CA (US)

(73) Assignee: Cavium, Inc., San Jose, CA (US)

( * ) Notice: Subject to any disclaimer, the term of this patent is extended or adjusted under 35 U.S.C. 154(b) by 126 days.

(21) Appl. No.: 14/186,913

(22) Filed: Feb. 21, 2014

(65) Prior Publication Data

US 2015/0067836 A1   Mar. 5, 2015

Related U.S. Application Data

(60) Provisional application No. 61/872,612, filed on Aug. 30, 2013, provisional application No. 61/872,622, filed on Aug. 30, 2013.

(51) Int. Cl.

| H04L 29/06 | (2006.01) |
|---|---|
| G06F 5/14 | (2006.01) |
| H04L 12/24 | (2006.01) |
| G06F 13/28 | (2006.01) |
| G06F 17/30 | (2006.01) |

(52) U.S. Cl.
CPC ............... *G06F 5/14* (2013.01); *G06F 13/28* (2013.01); *G06F 17/30985* (2013.01); *H04L 41/28* (2013.01); *H04L 63/1408* (2013.01); *G06F 2205/126* (2013.01); *G06F 2213/2806* (2013.01)

(58) Field of Classification Search
CPC .. G06F 9/444; G06F 13/28; G06F 17/30985; G06F 5/14; G06F 2205/126; G06F 2213/2806; H04L 41/28; H04L 63/1408
USPC .......................................................... 726/22
See application file for complete search history.

(56) References Cited

U.S. PATENT DOCUMENTS

| 5,428,554 A | 6/1995 | Laskoski |
|---|---|---|
| 5,608,662 A | 3/1997 | Large et al. |
| 5,893,142 A | 4/1999 | Moyer et al. |

(Continued)

FOREIGN PATENT DOCUMENTS

| EP | 2276217 A2 | 1/2011 |
|---|---|---|
| WO | WO 2004/013777 A1 | 2/2004 |
| WO | WO 2007/109445 A1 | 9/2007 |
| WO | WO 2008/005772 A2 | 1/2008 |
| WO | WO 2013/078053 | 5/2013 |

OTHER PUBLICATIONS

Navarro, G., "NR-grep: A Fast and Flexible Pattern Matching Tool," pp. 1-49, published 2000.

(Continued)

*Primary Examiner* — Yogesh Paliwal
(74) *Attorney, Agent, or Firm* — Hamilton, Brook, Smith & Reynolds, P.C.

(57) ABSTRACT

In one embodiment, a method of walking a non-deterministic finite automata (NFA) graph representing a pattern includes extracting a node type and an element from a node of the NFA graph. The method further includes matching a segment of a payload for the element by matching the payload for the element at least zero times, the number of times based on the node type.

72 Claims, 28 Drawing Sheets

(56) References Cited

U.S. PATENT DOCUMENTS

| | | | |
|---|---|---|---|
| 6,314,513 B1 | 11/2001 | Ross et al. |
| 7,046,848 B1 | 5/2006 | Olcott |
| 7,225,188 B1 | 5/2007 | Gai et al. |
| 7,260,558 B1 | 8/2007 | Cheng et al. |
| 7,460,473 B1 | 12/2008 | Kodama et al. |
| 7,594,081 B2 | 9/2009 | Bouchard et al. |
| 7,702,629 B2 | 4/2010 | Cytron et al. |
| 7,710,988 B1 | 5/2010 | Tripathi et al. |
| 7,805,392 B1 | 9/2010 | Steele et al. |
| 7,870,161 B2 | 1/2011 | Wang |
| 7,949,683 B2 | 5/2011 | Goyal |
| 7,962,434 B2 | 6/2011 | Estan et al. |
| 8,024,802 B1 | 9/2011 | Preston |
| 8,051,085 B1 | 11/2011 | Srinivasan et al. |
| 8,180,803 B2 | 5/2012 | Goyal |
| 8,301,788 B2 | 10/2012 | Bouchard et al. |
| 8,392,590 B2 | 3/2013 | Bouchard et al. |
| 8,407,794 B2 | 3/2013 | Kim et al. |
| 8,473,523 B2 | 6/2013 | Goyal |
| 8,554,698 B2 | 10/2013 | Bando et al. |
| 8,566,344 B2 | 10/2013 | Bando et al. |
| 8,683,590 B2 | 3/2014 | Namjoshi et al. |
| 9,083,731 B2 | 7/2015 | Namjoshi et al. |
| 9,203,805 B2 | 12/2015 | Goyal et al. |
| 9,398,033 B2 | 7/2016 | Goyal et al. |
| 9,419,943 B2 | 8/2016 | Goyal et al. |
| 9,426,165 B2 | 8/2016 | Billa et al. |
| 9,426,166 B2 | 8/2016 | Billa et al. |
| 9,438,561 B2 | 9/2016 | Goyal et al. |
| 2003/0195874 A1 | 10/2003 | Akaboshi |
| 2004/0059443 A1 | 3/2004 | Sharangpani |
| 2004/0162826 A1 | 8/2004 | Wyschogrod et al. |
| 2004/0172234 A1 | 9/2004 | Dapp et al. |
| 2004/0225999 A1 | 11/2004 | Nuss |
| 2005/0278781 A1 | 12/2005 | Zhao et al. |
| 2006/0069872 A1 | 3/2006 | Bouchard et al. |
| 2006/0075206 A1 | 4/2006 | Bouchard et al. |
| 2006/0085533 A1 | 4/2006 | Hussain et al. |
| 2006/0101195 A1 | 5/2006 | Jain |
| 2007/0192863 A1 | 8/2007 | Kapoor et al. |
| 2007/0282833 A1* | 12/2007 | McMillen ............ H04L 63/145 |
| 2008/0034427 A1 | 2/2008 | Cadambi et al. |
| 2008/0047012 A1 | 2/2008 | Rubin et al. |
| 2008/0059464 A1 | 3/2008 | Law et al. |
| 2008/0071783 A1 | 3/2008 | Langmead et al. |
| 2008/0082946 A1 | 4/2008 | Zilic et al. |
| 2008/0097959 A1 | 4/2008 | Chen et al. |
| 2008/0101371 A1 | 5/2008 | Law et al. |
| 2008/0189784 A1 | 8/2008 | Mangione-Smith et al. |
| 2008/0229415 A1 | 9/2008 | Kapoor et al. |
| 2008/0262991 A1 | 10/2008 | Kapoor et al. |
| 2008/0270833 A1 | 10/2008 | McMillen |
| 2008/0271141 A1 | 10/2008 | Goldman et al. |
| 2009/0106183 A1 | 4/2009 | Estan et al. |
| 2009/0119279 A1 | 5/2009 | Goyal et al. |
| 2009/0119399 A1 | 5/2009 | Hussain et al. |
| 2009/0138440 A1 | 5/2009 | Goyal |
| 2009/0138494 A1 | 5/2009 | Goyal |
| 2010/0095162 A1 | 4/2010 | Inakoshi |
| 2010/0114973 A1 | 5/2010 | Goyal |
| 2010/0138367 A1* | 6/2010 | Yamagaki ......... G06F 17/30985 |
| | | 706/12 |
| 2010/0146623 A1 | 6/2010 | Namjoshi |
| 2010/0153420 A1 | 6/2010 | Yang et al. |
| 2010/0158394 A1 | 6/2010 | Chang et al. |
| 2010/0174770 A1 | 7/2010 | Pandya |
| 2010/0192225 A1 | 7/2010 | Ma et al. |
| 2010/0198850 A1 | 8/2010 | Cytron et al. |
| 2011/0016154 A1 | 1/2011 | Goyal et al. |
| 2011/0093484 A1 | 4/2011 | Bando et al. |
| 2011/0093496 A1* | 4/2011 | Bando ............... G06F 17/30985 |
| | | 707/769 |
| 2011/0113191 A1 | 5/2011 | Pandya |
| 2011/0119440 A1 | 5/2011 | Pandya |
| 2011/0173490 A1 | 7/2011 | Narayanaswamy et al. |
| 2011/0185077 A1 | 7/2011 | Bremler-Barr et al. |
| 2011/0238855 A1 | 9/2011 | Korsunsky et al. |
| 2011/0320397 A1 | 12/2011 | Podkolzin et al. |
| 2012/0017262 A1 | 1/2012 | Kapoor et al. |
| 2012/0143854 A1 | 6/2012 | Goyal et al. |
| 2012/0221494 A1 | 8/2012 | Pasetto et al. |
| 2012/0221497 A1 | 8/2012 | Goyal et al. |
| 2012/0311529 A1 | 12/2012 | Beveridge et al. |
| 2013/0133064 A1 | 5/2013 | Goyal et al. |
| 2013/0191916 A1 | 7/2013 | Yao et al. |
| 2013/0290356 A1 | 10/2013 | Yang et al. |
| 2014/0101176 A1 | 4/2014 | Ruehle |
| 2014/0173254 A1 | 6/2014 | Ruehle |
| 2014/0214749 A1 | 7/2014 | Ruehle |
| 2015/0066927 A1 | 3/2015 | Goyal et al. |
| 2015/0067123 A1 | 3/2015 | Goyal et al. |
| 2015/0067200 A1 | 3/2015 | Goyal et al. |
| 2015/0067776 A1 | 3/2015 | Goyal et al. |
| 2015/0067863 A1 | 3/2015 | Billa et al. |
| 2015/0186786 A1 | 7/2015 | Goyal et al. |
| 2015/0220454 A1 | 8/2015 | Goyal et al. |
| 2015/0220845 A1 | 8/2015 | Goyal et al. |
| 2015/0262009 A1 | 9/2015 | Szabo |
| 2015/0293846 A1 | 10/2015 | Goyal et al. |
| 2015/0295889 A1 | 10/2015 | Goyal et al. |
| 2015/0295891 A1 | 10/2015 | Goyal et al. |
| 2016/0021060 A1 | 1/2016 | Goyal et al. |
| 2016/0021123 A1 | 1/2016 | Goyal et al. |

OTHER PUBLICATIONS

Navarro, G., "Pattern Matching," pp. 1-24, published 2002.
Branch, J.W. et al., "Denial of Service Intrusion Detection Using Time Dependent Deterministic Finite Automata," *Proc. Research Conference,* Troy, NY, Oct. 2002.
Faro, S., et al., "Efficient Variants of the Backward-Oracle-Matching Algorithm," *Proceedings of Prague Stringology Conference,* 2008, pp. 146-160.
Becchi, M., "Data Structures, Algorithms and Architectures for Efficient Regular Expression Evaluation," Washington University in St. Louis School of Engineering & Applied Science, published May 2009.
Becchi, M., et al., "A Hybrid Finite Automation for Practical Deep Packet Inspection," published 2007.
Becchi, M., et al., "Extending Finite Automata to Efficiently Match Perl-compatible Regular Expressions", Proceedings of the 2008 CoNext Conference, Dec. 9-12, 2008.
Chodnicki, S., "An Introduction to Regular Expressions-Adventures with Open Source B1", available at http:--type-exit.org-adventures-with-open-source-bi-2011-05-an-introduction-toregular-expressions May 7, 2013 (29 pgs).
Hopcroft, J.E. and Ullman, J.D., "Introduction to Automata Theory, Languages, and Computation," *Addison-Wesley Publishing, Reading, Massachusetts (1979)* ISBN 0-201-02988-X (See chapter 2.).
Rabin, M.O. and Scott, D., "Finite Automata and their Decision Problems," IBM Journal of Research and Development, 3(2): 114-125 (1959).
Singh, H., Regular Expressions, http:—www.seeingwithe.org-topic7html.html (2002) downloaded May 7, 2013 (10 pgs).
Sipser, M., "Introduction to the Theory of Computation," *PWS, Boston (1997).* ISBN 0-534-94728-X (See section 1.2: Nondeterminism, pp. 47-63.).
Sun, W., et al., "HFilter: Hybrid Finite Automation Based Stream Filtering for Deep and Recursive XML Data," School of Computer Science and Tech., published 2008.
U.S. Office Action dated Jun. 30, 2016 for U.S. Appl. No. 14/186,978, filed Feb. 21, 2014 entitled "Generating A Non-Deterministic Finite Automate (NFA) Grapher For Regular Expression Patterns With Advanced Features,".
Hayes, C.L., et al., "DPICO: A High Speed Deep Packet Inspection Engine Using Compact Finite Automata," ANCS'07 pp. 195-203 (2007).

\* cited by examiner

| | | |
|---|---|---|
| 2502 | NODE TYPE | VARIABLE COUNT MATCH |
| 2504 | MATCH TYPE | LAZY (OR) GREEDY (OR) POSSESSIVE (OR) ALL |
| 2506 | ELEMENT | CHARACTER (OR) CHARACTER CLASS INDEX |
| 2508 | NEXT NODE ADDRESS | ADDRESS OF THE NEXT NODE IN GRAPH |
| 2510 | COUNT | NUMBER OF TIMES TO COUNT |

FIG. 25 (2500)

| | | |
|---|---|---|
| 2602 | STACK ENTRY TYPE | CC MATCH |
| 2604 | MATCH TYPE | NOT APPLICABLE |
| 2606 | ELEMENT | CHARACTER CLASS INDEX |
| 2608 | NEXT NODE ADDRESS | ADDRESS OF THE NEXT NODE IN GRAPH |
| 2610 | COUNT | NOT APPLICABLE |
| 2612 | DUPLICATE | ONE IF IT IS A DUPLICATE, ZERO OTHERWISE |
| 2614 | REVERSE | ONE IF WALKING IN REVERSE, ZERO OTHERWISE |
| 2616 | OFFSET | OFFSET OF NEXT BYTE TO PROCESS IN PAYLOAD |

FIG. 26 (2600)

| | | |
|---|---|---|
| 2702 | STACK ENTRY TYPE | STRING MATCH |
| 2704 | MATCH TYPE | NOT APPLICABLE |
| 2706 | ELEMENT | ADDRESS OF REMAINING STRING DATA |
| 2708 | NEXT NODE ADDRESS | ADDRESS OF THE NEXT NODE IN GRAPH |
| 2710 | COUNT | REMAINING LENGTH OF THE STRING |
| 2712 | DUPLICATE | ONE IF IT IS A DUPLICATE, ZERO OTHERWISE |
| 2714 | REVERSE | ONE IF WALKING IN REVERSE, ZERO OTHERWISE |
| 2716 | OFFSET | OFFSET OF NEXT BYTE TO PROCESS IN PAYLOAD |

FIG. 27 (2700)

| | | |
|---|---|---|
| 2802 | STACK ENTRY TYPE | FIXED COUNT MATCH |
| 2804 | MATCH TYPE | NOT APPLICABLE |
| 2806 | ELEMENT | CHARACTER (OR) CHARACTER CLASS INDEX |
| 2808 | NEXT NODE ADDRESS | ADDRESS OF THE NEXT NODE IN GRAPH |
| 2810 | COUNT | REMAINING COUNT |
| 2812 | DUPLICATE | ONE IF IT IS A DUPLICATE, ZERO OTHERWISE |
| 2814 | REVERSE | ONE IF WALKING IN REVERSE, ZERO OTHERWISE |
| 2816 | OFFSET | OFFSET OF NEXT BYTE TO PROCESS IN PAYLOAD |

FIG. 28

| | | |
|---|---|---|
| 2902 | STACK ENTRY TYPE | VARIABLE COUNT MATCH |
| 2904 | MATCH TYPE | LAZY (OR) GREEDY (OR) POSSESSIVE (OR) ALL |
| 2906 | ELEMENT | CHARACTER (OR) CHARACTER CLASS INDEX |
| 2908 | NEXT NODE ADDRESS | ADDRESS OF THE NEXT NODE IN GRAPH |
| 2910 | COUNT | REMAINING COUNT |
| 2912 | DUPLICATE | ONE IF IT IS A DUPLICATE, ZERO OTHERWISE |
| 2914 | REVERSE | ONE IF WALKING IN REVERSE, ZERO OTHERWISE |
| 2916 | OFFSET | OFFSET OF NEXT BYTE TO PROCESS IN PAYLOAD |

FIG. 29

SYSTEM AND METHOD TO TRAVERSE A NON-DETERMINISTIC FINITE AUTOMATA (NFA) GRAPH GENERATED FOR REGULAR EXPRESSION PATTERNS WITH ADVANCED FEATURES

RELATED APPLICATIONS

This application claims the benefit of U.S. Provisional Application No. 61/872,612, filed on Aug. 30, 2013 and U.S. Provisional Application No. 61/872,622, filed on Aug. 30, 2013. This application is being co-filed on the same date to a common Assignee with "Generating A Non-Deterministic Finite Automata (NFA) Graph For Regular Expression Patterns With Advanced Features" by Rajan Goyal and Satyanarayana Lakshmipathi Billa.

The entire teachings of the above applications are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed. Wire-speed is the rate of data transfer over a physical medium of the network over which data is transmitted and received.

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor can perform the compute intensive tasks, it does not provide sufficient performance to process the data so that it can be forwarded at wire-speed.

Content aware networking requires inspection of the contents of packets at "wire-speed." The content may be analyzed to determine whether there has been a security breach or an intrusion. A large number of patterns and rules in the form of regular expressions are applied to ensure that all security breaches or intrusions are detected. A regular expression is a compact method for describing a pattern in a string of values/characters/letters. The simplest pattern matched by a regular expression is a single value/character/letter or string of values/characters/letters, for example, /c/ or /cat/. The regular expression also includes operators and meta-characters that have a special meaning.

Through the use of meta-characters, the regular expression can be used for more complicated searches such as, "abc.*xyz". That is, find the string "abc", followed by the string "xyz", with an unlimited number of characters in- between "abc" and "xyz". Another example is the regular expression "abc..abc.*xyz;" that is, find the string "abc," followed two characters later by the string "abc" and an unlimited number of characters later by the string "xyz."

An Intrusion Detection System (IDS) application inspects the contents of all individual packets flowing through a network, and identifies suspicious patterns that may indicate an attempt to break into or compromise a system. One example of a suspicious pattern may be a particular text string in a packet followed by 100 characters later by another particular text string.

Content searching is typically performed using a search algorithm such as, Deterministic Finite Automata (DFA) or Non-Deterministic Finite Automata (NFA) to process the regular expression.

SUMMARY

In an embodiment, a payload segment, also referred to as a segment of the payload, is a portion of the payload being inspected to match an element indicated in an NFA graph node. The segment of the payload can be a value, character, letter, byte or other size of the data. The payload segment can be of any granularity (e.g., size). For example, the payload segment can be a byte, multiple bytes, less than a byte, or even any number of bits. An engine can process a minimum granularity (e.g., one byte, or any amount of data), but it can also process greater than the minimum granularity. In an embodiment, a payload segment can be a payload byte.

In an embodiment, a method of walking a non-deterministic finite automata (NFA) graph representing a pattern can include extracting a node type, next node address, count value, and an element from a node of the NFA graph and matching a segment of a payload for the element by matching the payload with the element at least zero times. The number of times can be based on the node type.

In an embodiment, the node type can be at least one of a variable count, fixed count, fixed count and variable count, character, case insensitive character, character class, string, case insensitive string, marked, split.

In an embodiment, the method can also include pushing an entry to a run stack. The entry can indicate the node type, an address of a next node in the graph, a duplicate bit, a reverse bit, a payload offset bit, match type, or count value. Pushing the entry to the run stack can be based on the node type. Pushing the entry to the run stack can be performed if the node type is variable count, fixed-variable count, or split. The method can also include popping a top entry of the run stack, loading a graph node indicated by the popped top entry, and matching the segment of the payload with the element. The element can be indicated in the loaded graph node, at a payload offset indicated in the popped top entry. Popping the top entry of the run stack is performed after a mismatch of matching the segment of the payload with the element.

In an embodiment, the method includes popping a top entry of a run stack, extracting graph node information stored in the popped top entry, and matching the segment of the payload with the element. The element can be indicated in the extracted graph node, at a payload offset indicated in the popped top entry. Popping the top entry of the run stack can be performed after a mismatch of the segment of the payload with the element.

In an embodiment, a node type of string can represent a pattern of a plurality of values. Each value can be at least one of a byte, letter, or character. Matching the segment of the payload for the element associated with a node type of string can include matching at least two values within the segment against respective values of the string stored as the element in the node (e.g., in parallel). The method can include, if the segment partially matches the element and if the length of the payload is shorter than the length of the string stored as the element of the node, loading a next payload of a same flow of the payload and continuing matching remaining values in the string to values in the next payload. The method can further include pushing a partial match to a save buffer to be loaded upon loading the next payload. Pushing the partial match to the save buffer can include storing a current run stack entry being processed in the save buffer and, upon loading the next payload, copying the stored at least one entries in the save buffer to the run stack. If the node is read from the run stack entry, the method can further include reducing the number of segments stored in the run stack entry and, if the number of segments stored in the run stack entry is greater than zero, pushing the run stack entry to the run stack. Matching the segment of the payload with the element if the node type is variable count possessive node can include fetching at least one segment of the payload and matching the at least one segment to the element until there is a nomatch, and if the payload runs out, pushing the stack entry to the save buffer and setting a terminate walk value.

In an embodiment, matching the segment of the payload for the element with a node type of variable count can include matching for the element a variable amount of times indicated by the node. The variable amount of times can be at least zero times, at most a finite number of times, or at most an infinite number of times. The node type can further indicate that the variable count node is a greedy node, lazy node, possessive, or all match node.

In an embodiment, matching the segment of the payload for the element if the node type is variable count lazy node can include returning the shortest match found in the payload. Matching for the segment of the payload for the element if the node type is variable count lazy node can include matching the segment to the element, and if the segment matches, loading a next node at the next node address in the graph, and if the segment does not match, returning a nomatch. Matching the segment of the payload for the variable count lazy node can include, if the segment matches the element, pushing a stack entry to the run stack and loading a next node at the next node address in the graph. The stack entry can indicate the variable count lazy node and payload offset. Matching the segment of the payload with the element if the node type is variable count lazy node includes, if matching the next node element with the segment is a mismatch, popping the node of the node type of variable count lazy node from the stack entry of the run stack, and matching the element stored in the popped node with the payload segment. Upon matching the segment of the payload with the element stored in the popped node, the method can include reducing a count value of the variable count lazy node, pushing an updated stack entry to the run stack, and loading a next node ad the next node address stored in the popped entry. If the segment of the payload continues in a next payload of a same flow of the first payload, the method also includes pushing the run stack entry to a save buffer and upon loading the next payload, loading the next save buffer entries into the run stack.

In an embodiment, matching the segment of the payload for the element if the node type is variable count greedy node or variable count possessive node includes returning a longest match found in the payload.

In an embodiment, matching the segment of the payload with the element if the node type is variable count greedy node can include fetching at least one segment of the payload. The method can further include matching the at least one segment to the element. If there is a nomatch and at least one segment matches the element a number of times less than or equal to a variable count in the variable count greedy node, or no more segments of the payload are available, the method can include: pushing a run stack entry storing the node type of the node, a payload offset of the at least one segment of the payload, and a number of segments matched, if the number of segments matched indicates the element has been matched less than a maximum number of times, fetching a next node of the NFA graph indicated by the next node address, and continuing matching a next segment of the payload indicated by a position after the payload offset with a second element of the next node, wherein if there is a nomatch, popping the run stack entry from the run stack, decrementing a number of segments matched count, pushing the updated run stack entry back to the run stack, and continuing matching the next segment of the payload from the offset stored in the popped entry with the element of a next node stored at the next node address in the popped entry.

The method can further include, if the match is determined, pushing an entry to a run stack indicating a payload offset of the segment and, if a count of the variable count greedy node is reached, loading a next node. The method can further include, if the count of the variable count greedy node is not reached, determining a match of a subsequent segment of the payload to the element. The method can further include, if a nomatch is determined, popping an entry from a run stack and determining a match of the segment of the payload at the payload offset indicated in the node of the popped entry to the element indicated in the node of the popped entry.

In an embodiment, the method can further include matching the segment of the payload for the element if the node type is variable count greedy node by fetching at least one segment of the payload and matching the at least one segments to the element until there is a nomatch, where the at least one segments have matched the element a number of times equaling a variable count in the variable count greedy node, or no more segments of payload are available, and then pushing a run stack entry if a count of the stack entry is greater than zero. The method can further include, if the node is read from a stack entry, reducing the variable count of the stack entry and, if the variable count is greater than zero, pushing a run stack entry.

In an embodiment, the method can further include matching the segment of the payload for the element if the node type is variable count possessive node by continually matching the payload segment to the element until a nomatch or a count of the variable count possessive node indicates the element has been matched a maximum number of times, and then continuing to match the subsequent segment of the payload with the next node stored at the next node address. If the payload including the payload segment runs out, the method includes pushing the node, count, and payload offset to a save buffer, and upon loading a next payload segment from a same stream of the payload segment, loading the node, count, and payload offset from the save buffer and continuing to match the segment of the next payload segment with the element.

In an embodiment, matching the segment of the payload for the element if the node type is variable count all match node can include returning all matches found in the payload.

Matching the segment of the payload for the element if the node type is variable count all match node can further include matching the segment to the element, and if it is a match, pushing the node to the run stack, and if it is a nomatch, returning a nomatch. The stack entry can indicate the variable count all match node and a payload offset with an indication to continue matching the NFA graph. Pushing the run stack entry can include setting a duplication value as untrue. If segments of payload are unavailable, matching the segment of the payload can include pushing the node to the save buffer and setting a terminate walk value to true.

In an embodiment, matching the segment of the payload for the element if the node type is variable count all match node can include matching the segment to the element, and if the byte is matching, storing the match with an indication to continue matching the NFA graph if a match is found.

In an embodiment, matching the segment of the payload with the element if the node type is variable count all match node includes matching the segment to the element, and if it is a match, pushing the node to the run stack, and if it is a nomatch, returning a nomatch. Pushing the run stack entry includes setting a duplication value as untrue. If segments of payload are unavailable, the method includes matching the segment of the payload includes pushing the node to the save buffer and setting a terminate walk value to true.

In an embodiment, a node type of fixed count represents a pattern to match for an element a fixed number of times. If the length of the payload is shorter than the count of the fixed count node, the method can include loading a next payload and continuing matching the remaining values in the element to the values in the next payload. The method can further include pushing a partial match to a save buffer to be loaded upon loading the next payload. Pushing the partial match to the save buffer can include storing at least one entry from a run stack in the save buffer and, upon loading the next payload, copying the stored at least one entries in the save buffer to the run stack. The element of the node type of fixed count can be character, character class or string. Matching the segment of the payload with the element associated with the node type of fixed count includes matching at least two values within the segment against a value of the element stored in the node. If the segment matches the element and if the length of the payload is shorter than the count of the fixed count node, the method includes loading a next payload of a same flow of the payload and continuing matching the remaining values in the element to the values in the next payload.

In an embodiment, an element can be at least one of a character, character class and string. A character class can represent a Boolean-or operation of at least one value. Each character class can be stored in a memory as a mask, wherein an indicator corresponding to each possible character in the mask is set if the character is part of the character class, and not set if it is not part of the character class. The method can further include matching a segment of the payload by employing the payload segment as an index to the mask such that if the indexed entry is set, the graph walk engine determines the segment of the payload is matched to the character class. Each character class can be stored in memory as a two-dimensional matrix. The two dimensional matrix can be accessed by a first index associated with the character class, and a second index associated with the character value. Matching the segment of the payload for the element if the node type is character class can include accessing the two-dimensional matrix with the first index being a character class index indicated in the element of the node and the second index being the segment of the payload, and issuing a match if the entry is set and issuing a nomatch if the entry is unset.

In an embodiment, the method can include, upon a successful match, loading, from the next node address extracted from the node, a second node of the NFA graph.

In an embodiment, the count value can indicate a maximum number of times to match for the element. If the node type is fixed count, the count value can indicate an exact number of times to match for the element. If the node type is string, the count value can indicate a length of the string.

The method can also include, if the node type is variable count, extracting a count value from the node, where the count value indicates a maximum number of times to match with the element, if the node type is fixed count, extract a count value from the node, the count value indicating an exact number of times to match with the element, if the node type is string, extracting a count value from the node, the count value indicating a length of the string, and if the node type is fixed-variable count, extracting two count values from the node, a first count value indicating an exact number of times to match with the element and a second count value indicating a maximum number of times to match with the element.

In an embodiment, the method can include, matching the segment of the payload with the element associated with the node type of marked by indicating a match is found, and popping any entries in a run stack, or, if indicated in the node, continuing walking, in a reverse direction, a next node at the next address indicated in the node.

In an embodiment, matching the segment of the payload with the element associated with the node type of fixed-variable count can include matching with the element a fixed number of times indicated by a fixed count value extracted from the node and a variable number of times indicated by a variable count value extracted from the node. The variable number of times can be at least zero times, at most a finite number of times or at most an infinite number of times. The fixed number of times can be at least one times. The fixed number of times can be zero times, such that the element with the node type of fixed-variable count is matched as a variable count node.

In an embodiment, matching the segment of the payload with the element if the node type is fixed-variable count lazy node can include matching the segment with the element for the fixed number of times, and if the segment matches, loading a next node at the next node address in the graph, and if the segment does not match, returning a nomatch. Matching the segment of the payload with the element if the node type is fixed-variable count lazy node can include pushing a stack entry to a run stack, the stack entry indicating the fixed-variable count lazy node and payload offset, and loading a next node at the next address in the graph. Matching the segment of the payload with the element if the node type is the variable count lazy node can include, if the segment matches the element, pushing a stack entry to the run stack, the stack entry indicating the fixed-variable count lazy node and payload offset, loading a next node at the next node address in the graph, and if the segment does not match the element, returning a nomatch.

In an embodiment, a system for walking a non-deterministic finite automata (NFA) graph representing a pattern can include a determination module configured to extract a node type, next node address, count value, and an element from a node of the NFA graph and a matching module configured to match a segment of a payload for the element by matching the payload for the element at least zero times, the number of times based on the node type.

A variable count node is a node that matches for an element a variable amount of times, the amount of times defined by a range (e.g., zero to five times). A variable count node can have one of four properties: lazy, greedy, possessive, or all-match. A variable count lazy node is configured finds the shortest possible match of elements within the range. A variable count greedy or possessive node is configured to find the longest possible match of elements within the range. A variable count all match node is configured to return all matches in the payload.

A fixed count node matches for an element a fixed amount of times. A fixed count and variable count pattern can an expression of a pattern of a variable count configured to match for a range, where the range starts at a number higher than zero. For example, a variable count pattern matching for an element from 10-20 times can be expressed as a fixed count node matching for the element ten times followed by a variable count node matching for the element 0-10 times. A string node is a node that matches for a string—a set of characters in a particular order.

A marked node is a node that indicates that a match of the pattern is found in the payload. A split node is a node that indicates a choice between two paths in the graph.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 21 is a table illustrating an example embodiment of a bitmap/mask employed in a character class.

FIG. 25 is a table illustrating a format of a Variable Count Match Node.

FIG. 26 is a table illustrating a format of a Character Class Match Stack Entry.

FIG. 27 is a table illustrating a format of a String Match Stack Entry.

FIG. 28 is a table illustrating a format of a Fixed Count Match Stack Entry.

FIG. 29 is a table illustrating a format of a Variable Count Match Stack Entry.

DETAILED DESCRIPTION OF THE INVENTION

A description of example embodiments of the invention follows.

"Reverse NFA Generation and Processing" by Goyal et al., U.S. application. Ser. No. 13/303,885, published as U.S. Pub. No. 2013/0133064, now U.S. Pat. No. 9,203,805, and "Regular Expression Processing Automaton" by Goyal et al., U.S. application Ser. No. 13/168,395, published as U.S. Pub. No. 2012/0221497 describes NFA and expression matching concepts. The entire teachings of the above applications are incorporated herein by reference.

Perl Compatible Regular Expression (PCRE) has become a de facto standard for regular expression syntax in security and networking applications. As more applications requiring deep packet inspections have emerged or more threats have become prevalent in the internet, corresponding signatures/patterns to identify virus/attacks or applications have also become more complex. Signature databases evolved from having simple string patterns to regular expression (regex)

patterns with wild characters/ranges/character classes to advanced PCRE signatures. Advanced PCRE signatures specifically refer to features such as start offset, back references, captured groups, and assertions. Embodiments of the present invention support advanced PCRE features at wire-speed.

Before describing example embodiments of the present invention in detail, an example security application in which the embodiments may be implemented and typical processing using DFA, and NFA are described immediately below to help the reader understand the inventive features of the present invention.

Figure 1A:
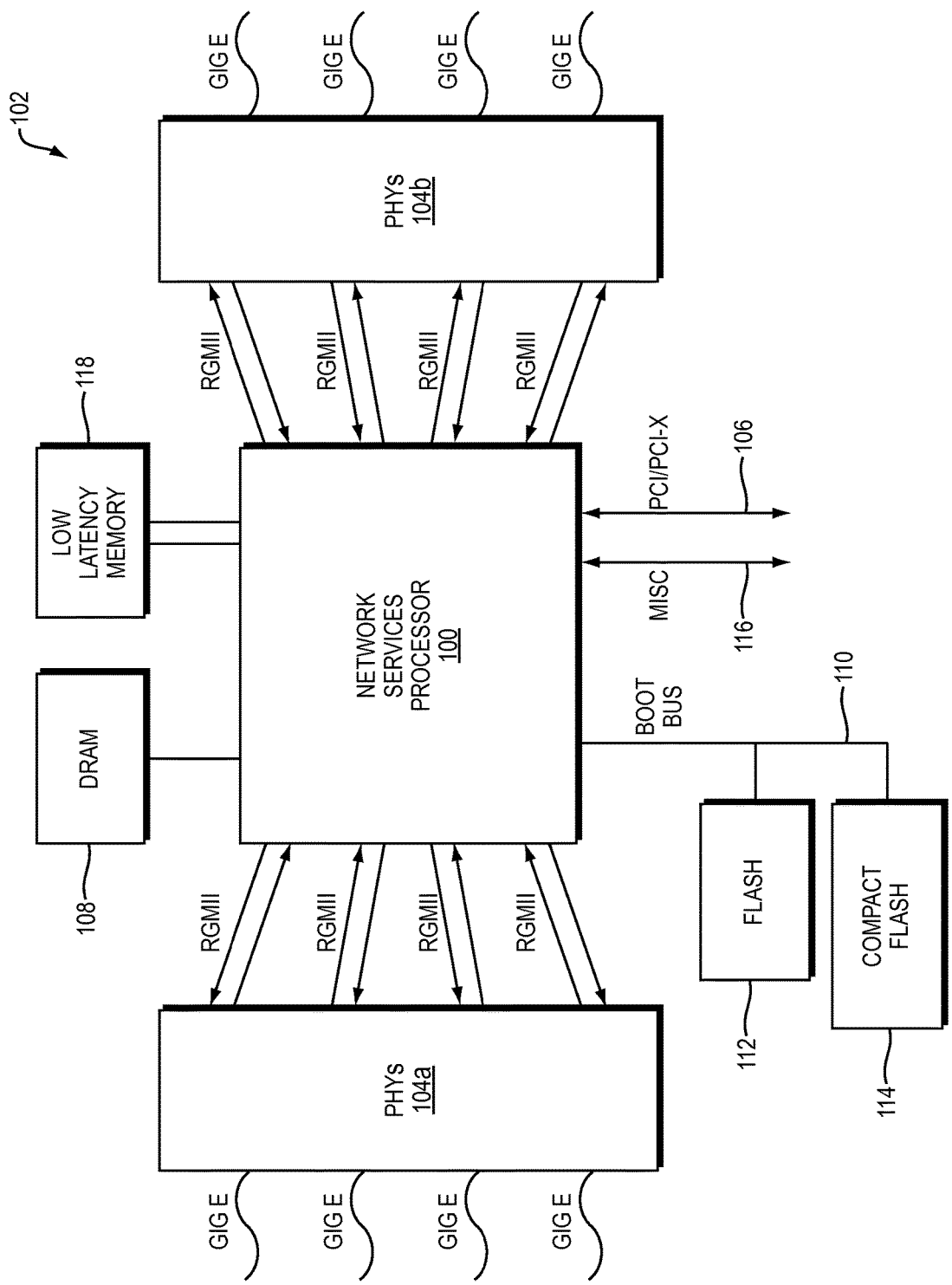
FIGS. 1A-B are block diagrams of an example security appliance including a network services processor.

FIG. 1A is a block diagram of an example security appliance 102 including a network services processor 100. The security appliance 102 may be a standalone system that may switch packets received at one Ethernet port (Gig E) to another Ethernet port (Gig E) and perform a plurality of security functions on received packets prior to forwarding the packets. For example, the security appliance 102 may be used to perform security processing on packets received on a Wide Area Network prior to forwarding the processed packets to a Local Area Network.

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. By processing the protocols to forward the packets at wire-speed, the network services processor does not slow down the network data transfer rate.

The network services processor 100 may include a plurality of Ethernet Media Access Control interfaces with standard Reduced Gigabit Media Independent Interface (RGMII) connections to the off-chip PHYs 104a, 104b.

The network services processor 100 may also receive packets from the Ethernet ports (Gig E) through the physical interfaces, PHYs104a and 104b, and perform L2-L7 network protocol processing on the received packets and forwards processed packets through the physical interfaces 104a and 104b to another hop in the network or the final destination or through the Peripheral Component Interconnect /Peripheral Component Interconnect Extended interface (PCI/PCI-X) bus 106 for further processing by a host processor. The network protocol processing may include processing of network security protocols such as Firewall, Application Firewall, Virtual Private Network (VPN) including IP Security (IPSec) and/or Secure Sockets Layer (SSL), Intrusion Detection System (IDS) and Anti-virus (AV).

The network services processor 100 may also include a memory controller for controlling external local memory 108, such as Dynamic Random Access Memory (DRAM) and double-data-rate synchronous dynamic random access memory (DDR SDRAM). In some embodiments, the external local memory 118 is a low latency memory.

The external local memory 118 may be used for Internet Services and Security applications allowing fast lookups, including the string-matching that may be required for Intrusion Detection System (IDS) or Anti Virus (AV) applications and other applications that require string matching.

The network services processor 100 may perform pattern search, regular expression processing, content validation, transformation and security to accelerate packet processing according to an embodiment of the present invention. The regular expression processing and pattern search may be used to perform string matching for IDS and AV applications and other applications that require string matching.

A DRAM controller in the network services processor 100 may control access to an external Dynamic Random Access Memory (DRAM) 108 that is coupled to the network services processor 100. The DRAM 108 may store data packets received from the PHYs interfaces 104a, 104b or the PCI/PCI-X interface 106 for processing by the network services processor 100. In an embodiment, the DRAM interface supports 64 or 128 bit Double Data Rate II Synchronous Dynamic Random Access Memory (DDR II SDRAM) operating up to 800 MHz. The DRAM may also store rules data required for lookup and pattern matching in DFA and NFA graph expression searches.

A boot bus 110 may provide the necessary boot code which may be stored in flash memory 112 and may be executed by the network services processor 100 when the network services processor 100 is powered-on or reset. Application code may also be loaded into the network services processor 100 over the boot bus 110, from a device 114 implementing the Compact Flash standard, or from another high-volume device, which can be a disk, attached via the PCI/PCI-X bus 106.

The miscellaneous I/O interface 116 offers auxiliary interfaces such as General Purpose Input/Output (GPIO), Flash, IEEE 802 two-wire Management Data Input/Output Interface (MDIO), Universal Asynchronous Receiver/Transmitters (UARTs) and serial interfaces.

Figure 1B:
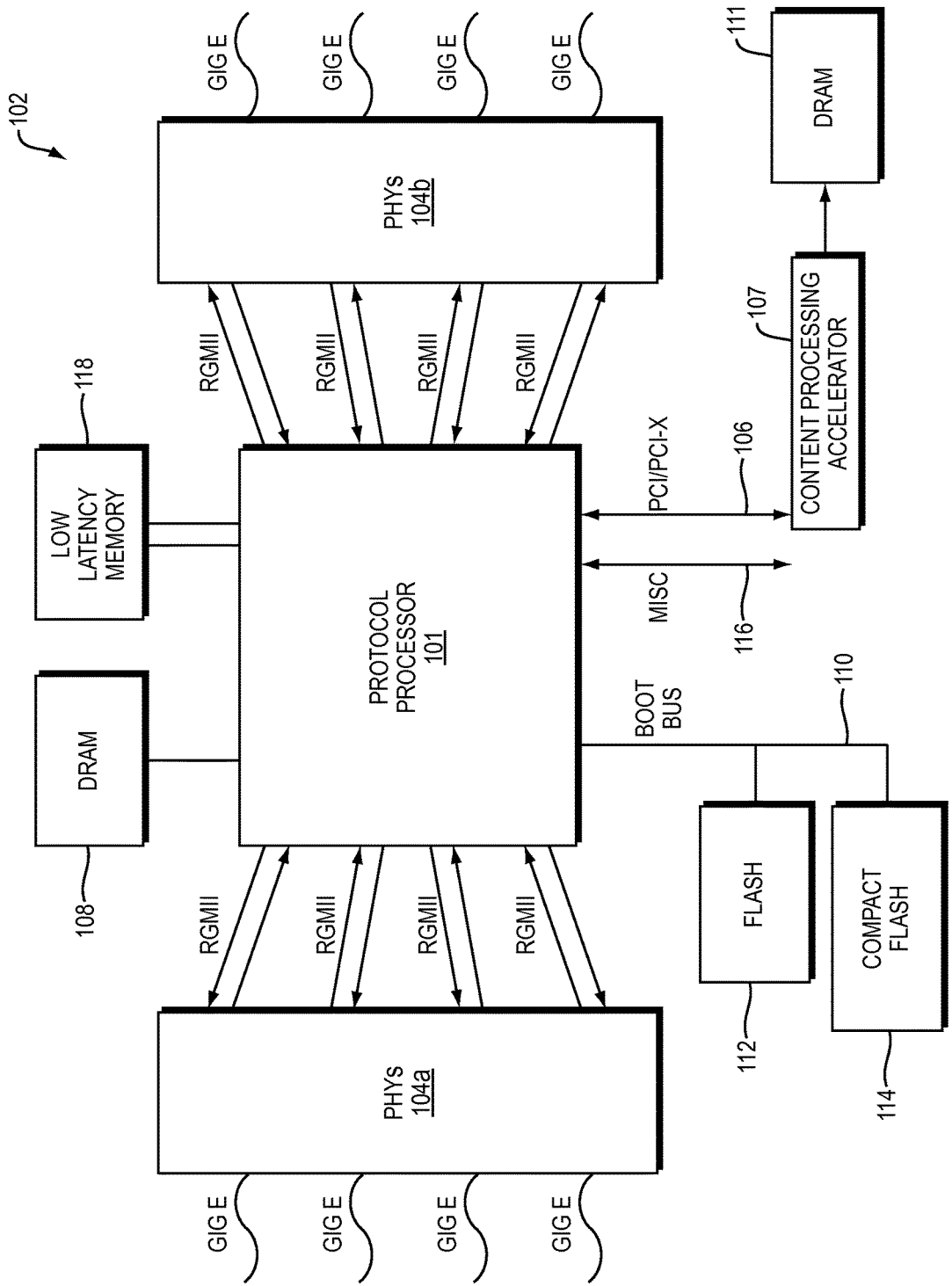

It should be appreciated that the example security appliance 102 may alternatively include a protocol processor 101 (FIG. 1B). The protocol processor 101 may include the element of the network services processor 100 with the addition of a content processing accelerator 107, coupled to the processor 101 via the PCI/PCI-X connection 106, and an external DRAM 111 coupled to the accelerator 107. The accelerator 107 and DRAM 111 may be employed in content search applications, therefore making all content searching operations external to the processor 101.

Figure 2A:
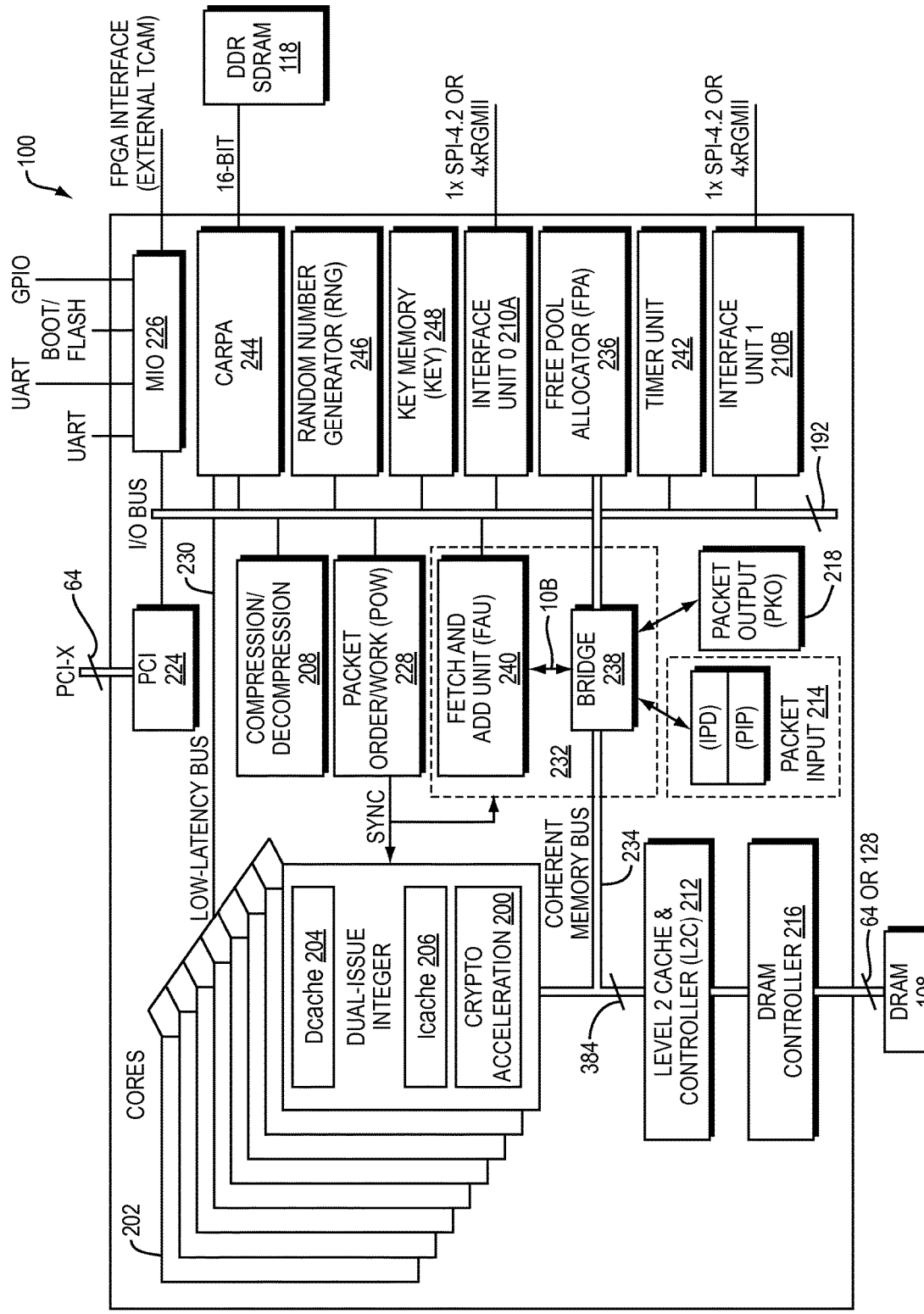
FIG. 2A is a block diagram of the network services processor, or the protocol processor shown in FIGS. 1A and 1B, respectively.

FIG. 2A is a block diagram of the network services processor 100, or the protocol processor 101 shown in FIGS. 1A and 1B, respectively. The network services processor 100, and/or the protocol processor 101, delivers high application performance using a plurality of processors (cores) 202. Network applications may be categorized into data plane and control plane operations. Each of the cores 202 may be dedicated to performing data plane or control plane operations. A data plane operation may include packet operations for forwarding packets. A control plane operation may include processing of portions of complex higher level protocols such as Internet Protocol Security (IPSec), Transmission Control Protocol (TCP) and Secure Sockets Layer (SSL). A data plane operation may include processing of other portions of these complex higher level protocols.

A packet may be received by any one of the interface units 210a, 210b through a SPI-4.2 or RGM II interface. A packet may also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 may perform pre-processing of L3 and L4 network protocol headers included in the received packet. The pre-processing includes checksum checks for Transmission Control Protocol (TCP)/User Datagram Protocol (UDP) (L3 network protocols).

The packet input unit 214 may write packet data into buffers in Level 2 cache 212 or DRAM 108 in a format that is convenient to higher-layer software executed in at least one processor 202 for further processing of higher level network protocols. The packet input unit 214 may also support a programmable buffer size and can distribute packet data across multiple buffers to support large packet input sizes.

The Packet order/work (POW) module (unit) 228 may queue and schedule work (packet processing operations) for the processor 202. Work is defined to be any task to be performed by a processor that is identified by an entry on a work queue. The task can include packet processing operations, for example, packet processing operations for L4-L7 layers to be performed on a received packet identified by a work queue entry on a work queue. Each separate packet processing operation is a piece of the work to be performed by a processor on the received packet stored in memory (L2 cache memory 212 or DRAM 108). For example, the work may be the processing of a received Firewall/Virtual Private Network (VPN) packet. The processing of a Firewall/VPN packet may include the following separate packet processing operations (pieces of work): (1) defragmentation to reorder fragments in the received packet; (2) IPSec decryption (3) IPSec encryption; and (4) Network Address Translation (NAT) or TCP sequence number adjustment prior to forwarding the packet.

The network services processor 100, and/or the protocol processor 101, may also include a memory subsystem. The memory subsystem may include level 1 data cache memory 204 in each processor 202, instruction cache in each processor 202, level 2 cache memory 212, a DRAM controller 216 for external DRAM memory and the interface 230 to external local memory 118 (e.g., DDR SDRAM). The memory subsystem is architected for multi-processor support and tuned to deliver both high-throughput and low-latency required by memory intensive content networking applications. Level 2 cache memory 212 and external DRAM memory 108 (of FIGS. 1A and 1B) may be shared by all of the processors 202 and I/O co-processor devices.

The network services processor 100, and/or the protocol processor 101, may also include application specific co-processors that offload the processors 202 so that the network services processor achieves high-throughput. The application specific co-processors include a co-processor 244 that performs the Non-deterministic Finite Automata (NFA) processing described in greater detail below and a compression/decompression co-processor 208 that performs compression and decompression.

Each processor 202 may be a dual-issue, superscalar processor with instruction cache 206, Level 1 data cache 204, built-in hardware acceleration (crypto acceleration module) 200 for cryptography algorithms with direct access to local memory over the low latency memory bus 230. The low-latency direct-access path to local memory 118 bypasses the L2 cache memory 212 and can be directly accessed from both the processors (cores) 202 and the NFA co-processor 244.

Prior to describing the operation of the content search macros used for regular expression processing and pattern search in further detail, the other modules in the network services processor 100 will be described. In an example, after the packet has been processed by the processors 202, a packet output unit (PKO) 218 reads the packet data from L2 cache or DRAM, performs L4 network protocol post-processing (e.g., generates a TCP/UDP checksum), forwards the packet through the interface unit 210a, 210b and frees the L2 cache 212 or DRAM 108 locations used to store the packet.

Each processor 202 is coupled to the L2 cache by a coherent memory bus 234. The coherent memory bus 234, which in an embodiment is 384 bits wide, is the communication channel for all memory and I/O transactions between the processors 202, an I/O Bridge (IOB) 232 and the Level 2 cache and controller 212.

A Free Pool Allocator (FPA) 236 maintains pools of pointers to free memory in level 2 cache memory 212 and DRAM 108. A bandwidth efficient (Last In First Out (LIFO)) stack is implemented for each free pointer pool. If a pool of pointers is too large to fit in the Free Pool Allocator (FPA) 236, the Free Pool Allocator (FPA) 236 builds a tree/list structure in level 2 cache 212 or DRAM 108 using freed memory in the pool of pointers to store additional pointers.

The I/O Bridge (IOB) 232 manages the overall protocol and arbitration and provides coherent I/O partitioning. The IOB 232 includes a bridge 238 and a FAU 240. The bridge 238 includes buffer queues for storing information to be transferred between the I/O bus, coherent memory bus, the packet input unit 214 and the packet output unit 218.

The Fetch and Add Unit (FAU) 240 is a 2 KB register file supporting read, write, atomic fetch-and-add, and atomic update operations. The Fetch and Add Unit (FAU) 240 can be accessed from both the processors 202 and the packet output unit 218. The registers store highly-used values and thus reduce traffic to access these values. Registers in the FAU 240 are used to maintain lengths of the output queues that are used for forwarding processed packets through the packet output unit 218.

The PCI interface controller 224 has a DMA engine that allows the processors 202 to move data asynchronously between local memory in the network services processor and remote (PCI) memory in both directions.

Typically, content aware application processing uses either a deterministic finite automata (DFA) or a non-deterministic finite automata (NFA) to recognize a pattern in the content of a received packet. The DFA and NFA are both finite state machines, that is, models of computation each including a set of states, a start-state, an input alphabet (set of all possible symbols) and a transition function. Computation begins in the start-state and changes to new states dependent on the transition function.

The pattern is commonly expressed using a regular expression that includes atomic elements, for example, normal text characters such as, A-Z, 0-9 and meta-characters such as, *,^, and |, or other values. The atomic elements of a regular expression are the symbols (single characters) to be matched. These are combined with meta-characters that allow matching of one or more of an element (+), alternation (|), Kleene-star (*), which matches zero or more of an element. In an embodiment, the meta-characters can be defined by the PCRE pattern standard. The meta-character for concatenation is used to create multiple character matching patterns from a single character (or sub-strings) while the meta-character for alternation (|) is used to create a regular expression that can match any of two or more sub-strings. The meta-character Kleene-star (*) allows a pattern to match any number of times, including no occurrences of the preceding character or character class or string of payload segments matching the preceding character or character class. Combining different operators and single characters allows complex expressions to be constructed. For example, the expression (th(is|at)*) will match the following character strings: th, this, that, thisis, thisat, thatis, or thatat. The meta-character (?) can be the equivalent of {0,1} when the meta-character (?) follows an element. For example, the pattern "zzza?" can match a payload of "zzz" or match the payload "zzza."

The character class construct [. . . ] allows listing of a list of characters to match for, e.g. gr[ea]y looks for both grey and gray. A dash indicates a range of characters, for example, [A-Z] or [0-9]. The character class can further have multiple ranges, for example, [a-zA-Z0-9] would include all letters, lowercase and uppercase, and all digits. The meta-character "." matches any one character except the new line character. In addition, the meta-character "^" indicates every character except for the one that follows. For example, "[^\n]" indicates every character except for a "new line" character (where "\n" indicates a new line). Another example is "[^0-9]," which indicates any character except for digits "0" through "9."

Typically, ASCII characters are stored as a binary number from 0-128 or 0-256 in 7-bit and 8-bit embodiments, respectively. For example, a new line (or line feed) character can be represented as the number 12 under ASCII. The new line can then be represented in binary as "000 1010" or "0000 1010," in 7-bit and 8-bit embodiments, respectively. However, this is not optimal for storing character classes.

The input to the DFA or NFA state machine is typically a string of (8-bit) bytes, that is, the alphabet is a single byte (one character or symbol). Each byte in the input stream results in a transition from one state to another state.

The states and the transition functions of the DFA or NFA state machine can be represented by a graph, where each node in the graph represents a state and arcs in the graph represent state transitions. The current state of the state machine is represented by a node identifier that selects a particular graph node.

Using DFA to process a regular expression and to find a pattern or patterns described by a regular expression in an input stream of characters is characterized by:

1) Deterministic run time performance: A next state of a DFA can be determined from an input character (or symbol) and a current state of the DFA. In other words, there is only one state transition per DFA state. As such, run time performance of the DFA is said to be deterministic and the behavior can be completely predicted from the input.

2) Smaller per flow context (e.g., state or node pointer) is required to support matches across multiple packets: In a search for a pattern in an input that spans several packets making up a flow, the search may stop at one packet and then resume at another packet. Generally, determining which state to resume the search requires tracking, remembering or otherwise storing (e.g., as state pointers or stack entries) all states traversed thus far when the search stopped. In DFA, however, only the state at which a search stopped needs to be remembered in order to resume the search. As such, a DFA is characterized as requiring smaller per flow context to support pattern matching across multiple input packets e.g., on the order of several bytes to store a state or node pointer.

3) A graph in which the number of nodes (or graph size) can grow exponentially with the size of a pattern.

In contrast, using NFA to process a regular expression and to find a pattern(s) described by the regular expression in an input stream of characters is characterized by:

1) Non-deterministic run time performance: Given an input character (or symbol) and a current state of the NFA, it is possible there are more than one next states of the NFA to which to transition. In other words, a next state of the NFA cannot be uniquely determined from the input and the current state of the NFA. As such, run time performance of the NFA is said to be non-deterministic and the behavior cannot be completely predicted from the input.

2) Larger per flow context (e.g., state or node pointer) required to support match across packets: As described previously, pattern matching across multiple input packets, where a search stops at one packet and then resumes at another, requires tracking all states traversed thus far when the search stopped. In NFA, as more of the input is matched, the greater the number of current states that need to be tracked. As such, it can be said that a NFA is characterized as requiring larger per flow context to support pattern matching across multiple input packets when compared to DFA.

3) A graph in which the number of nodes (or graph size) typically grows linearly with the size of a pattern.

Figure 2B:
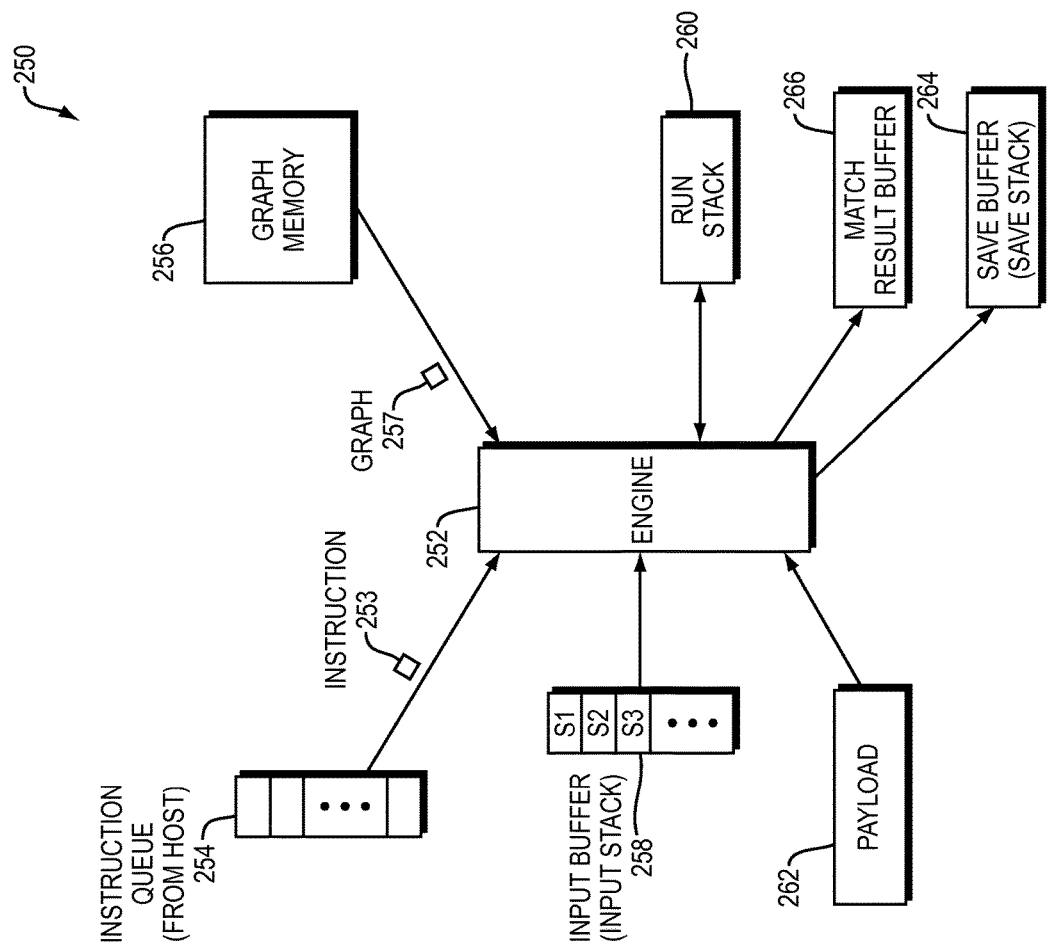
FIG. 2B is a block diagram illustrating an example embodiment of an environment of an engine, for example, the network services processor of FIG. 2A.

FIG. 2B is a block diagram 250 illustrating an example embodiment of an environment of an engine 252, for example, the network services processor (e.g. an NFA engine) of FIG. 2A. The engine 252 is operatively coupled to read one or more instruction 253 from an instruction queue 254. The instruction queue 254 stores instructions sent by a host to be processed by the engine 252. The engine 252 processes the instruction 253 by reading pointers stored therein. The pointers in the instruction 253 include a pointer to an entry of an input buffer 258 (which can be referred to as input stack even though it does not have the LIFO properties of a stack), a pointer to a payload 262, a pointer to a match result buffer 266, a pointer to a save buffer 264 (which can be referred to as a save stack even though it does not have the LIFO properties of a stack) and a pointer to a run stack 260.

The engine 252 loads entry/entries from pointer to the input buffer 258 (e.g., S1, S2, and/or S3). The engine then pushes the entry/entries from the input buffer 258 to the run stack 260. In this example, the engine can push entries S1, S2, and S3 to the run stack 260. The engine 252 then pops the first entry on the run stack (e.g., S1) and begins to process it. In an embodiment, the run stack is a last-in-first-out (LIFO) stack. Each entry from the input buffer 258 (e.g., S1, S2, and S3) includes a payload offset and a pointer to a graph 257. The engine can then load the graph 257 from the graph memory 256 and begin processing the graph using payload segments corresponding with the offset of the payload 262.

As the engine 252 processes the graph 257 using payload segments from the payload 262, it can push and pop entries to the run stack 260. The engine 252 pushes entries to the run stack 260 when it needs to save its place in the graph. The engine 252 needs to save its place in the graph when the graph presents multiple processing paths. The engine 252 can traverse one of these paths, and in the case of a mismatch, can return to the node and payload offset indicated in the run stack 260 entry to traverse the other path(s). A split node or a variable count node in the graph 257 can present such multiple paths in the graph.

In processing the payload 262 and graph 257, the payload 262 may run out of data before processing is complete. The payload 262 can be a packet or other grouping of data from a flow of data (or payload flow). The flow can have multiple payloads 262 (e.g., packets), each payload 262 having an order in the flow. Each segments of the payload 262 is a portion of the payload having a particular granularity, such as, but not limited to, one byte. In an embodiment, the granularity can be adjustable or selectable. An example of this is when the payload offset of the payload 262 begins towards the end of the packet, and only a partial match is found before the packet ends. To continue the job, the engine 252 saves the current stack entry into the save buffer 264. Therefore, the save buffer 264 stores one or more run stack entries of the run stack 260, when the payload ran out. Then, when the engine 252 loads the subsequent portion of the payload 262 from the data stream of packets, the engine 252 can load the run stack entries from the save buffer 264 and push them into the run stack 260 to continue the job. This loading of save buffer entries into run stack can also be performed by the host processor while submitting the instruction to the engine for a subsequent packet of the same flow.

Upon finding a match of the payload 262 to the graph 257, the engine 252 pops and may discard, unless it is configured to return all matches, all of the entries in the run stack 260 associated with the job loaded from the input buffer 258 (e.g., first entry S1). The engine 252 then saves the results (e.g., the match location and length) in the match results buffer 266 memory. The engine 252 can then load a next entry from the run stack that has been previously loaded from the input buffer 258 (e.g., S2). The engine 252 can then process the graph and payload segments corresponding to that entry, and continue to process additional jobs until the run stack 260 is empty.

Upon finding a mismatch of the payload 262 to the graph 257, the engine pops and processes the next entry in the run stack 260 associated with the job loaded from the input buffer 258 (e.g., first entry S1). If there is no entry left in run stack 260 associated with the job loaded from the input buffer 258 (e.g., first entry S1), then engine 252 is done with the current job and loads the next entry from the run stack that has been previously loaded from the input buffer 258 (e.g. S2). The engine 252 can then process the graph and payload segments corresponding to that entry, and continue to process additional jobs until the run stack 260 is empty.

Figure 3A:
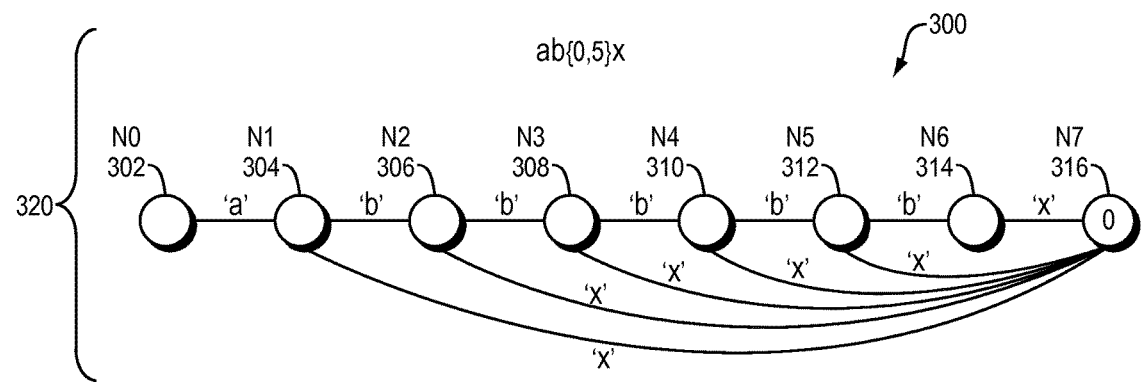
FIG. 3A is a diagram illustrating an example embodiment of an NFA graph.

FIG. 3A is a diagram 300 illustrating an example embodiment of an NFA graph 320 employed by, for example, the systems described in "Reverse NFA Generation and Processing" by Goyal et al.,U.S. application Ser. No. 13/303,885, published as U.S. Pub. No. 2013/0133064, now U.S. Pat. No. 9,203,805, or "Regular Expression Processing Automaton" by Goyal et al., U.S. application Ser. No. 13/168,395, published as U.S. Pub. No. 2012/0221497. The entire teachings of the above applications are incorporated herein by reference. The NFA graph 320 is configured to match a pattern "ab{0,5}x." The "b{0,5}" matches for a 'b' in the pattern anywhere from zero to five times. Therefore, the pattern matches the following payloads: ax, abx, abbx, abbbx, abbbbx, or abbbbbx.

The NFA graph 320 begins with Node N0 302. Upon loading Node N0 302, the graph walk engine is configured to determine whether the first segment (e.g., byte) of the payload matches 'a.' If so, the graph walk engine loads Node N1 304 and the next segment of the payload, and if not, the graph walk engine returns a nomatch.

Upon loading Node N1 304, if the next segment of the payload is an 'x,' the graph walk engine loads Node N7 316, which is a marked node. The marked node indicates that a match is found in the payload so that the graph walk engine returns a match. If the next segment of the payload is a 'b,' the graph walk engine loads Node N2 306. If the next segment of the payload is anything other than an 'x' or 'b,' the graph walk engine determines there is not a match in the payload and returns a nomatch.

Upon loading Node N2 306, if the next segment of the payload is an 'x,' the graph walk engine loads Node N7 316, which is a marked node. The marked node indicates that a match is found in the payload so that the graph walk engine returns a match. If the next segment of the payload is a 'b,' the graph walk engine loads Node N3 308. If the next segment of the payload is anything other than an 'x' or 'b,' the graph walk engine determines there is not a match in the payload and returns a nomatch.

Upon loading Node N3 308, if the next segment of the payload is an 'x,' the graph walk engine loads Node N7 316, which is a marked node. The marked node indicates that a match is found in the payload so that the graph walk engine returns a match. If the next segment of the payload is a 'b,' the graph walk engine loads Node N4 310. If the next segment of the payload is anything other than an 'x' or 'b,' the graph walk engine determines there is not a match in the payload and returns a nomatch.

Upon loading Node N4 310, if the next segment of the payload is an 'x,' the graph walk engine loads Node N7 316, which is a marked node. The marked node indicates that a match is found in the payload so that the graph walk engine returns a match. If the next segment of the payload is a 'b,' the graph walk engine loads Node N5 312. If the next segment of the payload is anything other than an 'x' or 'b,' the graph walk engine determines there is not a match in the payload and returns a nomatch.

Upon loading Node N5 312, if the next segment of the payload is an 'x,' the graph walk engine loads Node N7 316, which is a marked node. The marked node indicates that a match is found in the payload so that the graph walk engine returns a match. If the next segment of the payload is a 'b,' the graph walk engine loads Node N6 314. If the next segment of the payload is anything other than an 'x' or 'b,' the graph walk engine determines there is not a match in the payload and returns a nomatch.

Upon loading Node N6 314, if the next segment of the payload is an 'x', the graph walk engine loads Node N7 316, which is a marked node. The marked node indicates that a match is found in the payload so that the graph walk engine returns a match. If the next segment of the payload is anything other than an 'x', the graph walk engine determines there is not a match in the payload and returns a nomatch.

Figure 3B:
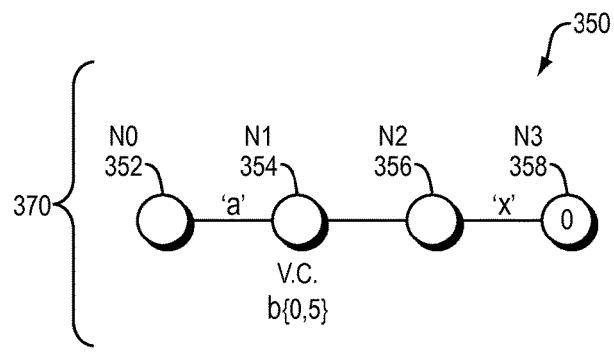
FIG. 3B is a diagram of an example embodiment of an NFA graph employed by the present invention.

FIG. 3B is a diagram of an example embodiment of an NFA graph 370 employed by the present invention. The NFA graph 370 is configured to match the same pattern "ab{0, 5}x" as in FIG. 3A. As described above, the b{0,5} matches for a 'b' in the pattern anywhere from zero to five times. Therefore, the pattern matches the following payloads: ax, abx, abbx, abbbx, abbbbx, or abbbbbx.

Node N0 352 is a character node configured to match for the element 'a.' Node N1 354 is a variable count node configured to match for the element 'b' anywhere from '0' and '5' times. A variable count node can be configured to match for an element any number of times, including an infinite number of times. Node N2 356 is a character node configured to match for the element 'x.' Node N3 358 is a marked node configured to signify the end of the pattern and signal a match has been found in the payload.

A graph walk engine loads Node N0 352 from the NFA graph 370. The graph walk engine then processes the first segment of the payload. If the segment of the payload is 'a,' the graph walk engine loads Node N1 354. Otherwise, the graph walk engine returns a nomatch.

Upon loading Node N1 354, the graph walk engine interprets the node as a variable count node matching for the character class 'b' occurring from 0 to 5 times. From this node, the graph walk engine is configured to match for such a pattern in the payload, and then load the next node, Node N2 356. Node N2 356 then determines if the next segment of the payload is an 'x.' If so, the graph walk engine loads Node N3 358, a marked node, indicating that the pattern is a match. If not, the graph walk engine returns a nomatch. Specific details of the graph walk engine walking variable count nodes using the run stack are described below.

The NFA graph 370 identifies the same patterns as the NFA graph 320 of FIG. 3A, however does so with less nodes. Therefore, the NFA graph 370 uses less memory and is of a reduced complexity.

Figure 3C:
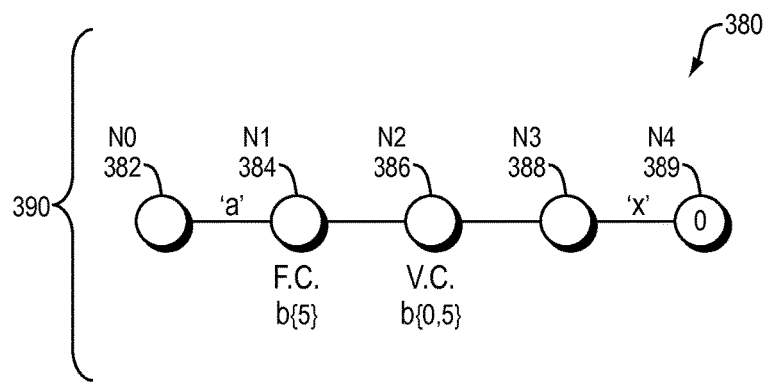
FIG. 3C is a diagram illustrating an example embodiment of an NFA graph showing other types of counting nodes can be employed.

FIG. 3C is a diagram 380 illustrating an example embodiment of an NFA graph 390 showing other types of counting nodes. A fixed count node searches a payload segment for an element a fixed number of times, instead of using a range. For example, the pattern "ab{5}x" matches the payload "abbbbbx" but does not match "ax," "abx," "abbx," "abbbx," or "abbbbx." Likewise, a variable count match pattern that starts with a range other than zero can be converted to a fixed count pattern followed by a variable count pattern. For example, "ab{5,10}x" can also be expressed as "ab{5}b{0,5}x." This equivalent pattern is shown by NFA graph 390 in FIG. 3C. This, as described above, generates node N0 382 to match for "a," a fixed count node N1 384 to match for "b" five times, a variable count node N2 386 to match for "b" from zero to five times, a node N3 388 to match for "x," and a marked node N4 389 to signify a match is found.

As an example embodiment of the present invention, each node stores an element, where an element is either an individual value/character/letter, character class ID (e.g., character class index), or string. Each node further stores its node type and any other information the node type requires, e.g., a variable count node stores the maximum (and optionally minimum) number of times to match for each element and whether it is a lazy/greedy/possessive/all match type node, a fixed count node stores the number of times to match for each element.

Figure 4A:
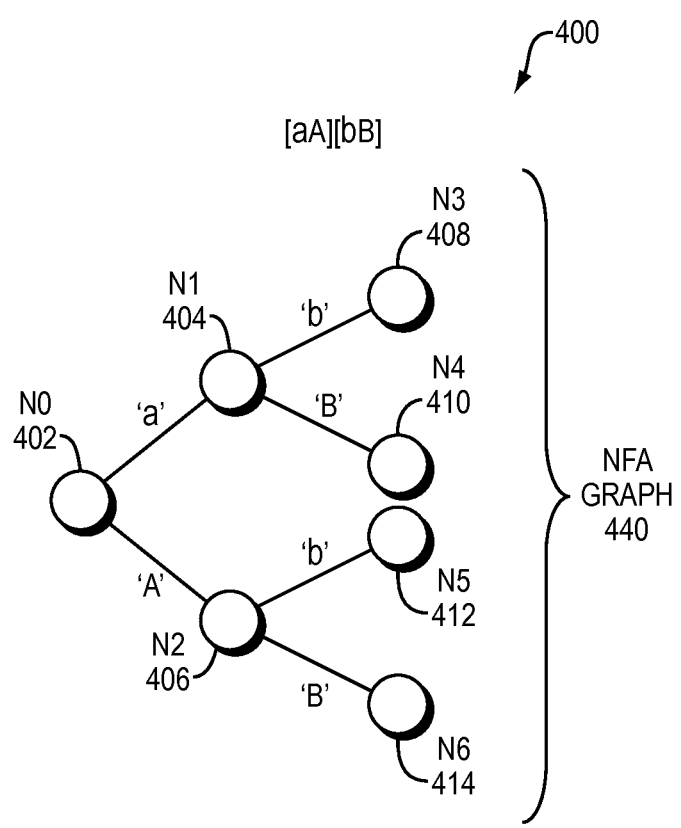
FIG. 4A is an example embodiment of an NFA graph employed by prior systems.

FIG. 4A is an example embodiment of an NFA graph 440 employed by prior systems. The NFA graph 440 is configured to match the pattern of "[aA][bB]," which matches payloads including "ab," "aB," "Ab," and "AB."

The graph walk engine first processes Node N0 402. If the payload is "a," the graph walk engine loads Node N1 404. The graph walk engine then processes the next segment of the payload. If the payload is 'b', the graph walk engine loads Node N3 408, which is a marked node. If the payload is 'B,' the graph walk engine loads Node N4 410, which is also a marked node. Both marked nodes instruct the graph walk engine to return a match.

On the other hand, if when processing Node N0 402, the graph walk engine processes the payload being an "A," the graph walk engine loads Node N2 406. The graph walk engine then processes the next segment of the payload. If the payload is 'b,', the graph walk engine loads Node N5 412, which is a marked node. If the payload is 'B,' the graph walk engine loads Node N6 414, which is also a marked node. Both marked nodes instruct the graph walk engine to return a match.

The NFA graph 440 can increase in complexity even with a short pattern such as "[aA][bB]." Even if each character class only designates two values/characters/letters, each additional character class added to the pattern doubles the number of nodes in the graph. Further, character classes can have any number of characters indicated, the more of which increases the complexity of the graph even further.

In an embodiment, each character class can be stored in a 128-bit or 256-bit map. Each bit of the character class represents its corresponding ASCII value. For example, the $12^{th}$ bit of the bit map represents the "new line" character. If the $12^{th}$ bit is a 1, that means the character class includes the "new line" character. If the $12^{th}$ bit is a 0, the character class does not include the "new line" character. In the same manner, each character class can store multiple ASCII values. For example, [^\n] (i.e., character class with all characters except new line) marks all bits as "1" except for the 12 bit. As another example, the character class [a-z] includes the ASCII values of 97-122. Therefore, the bitmap of the character class [a-z] would have bits 97-122 set as "1," and all other bits set as "0."

When the graph walk engine is matching a payload segment to a character class, it can use the ASCII value of the payload as an index to the character class. For example, where the character class is [a-z], assume the graph walk engine is processing the letter "r," which has an ASCII value of 114. The graph walk engine can access the $114^{th}$ bit of the character class and determine whether it is set to determine whether it matches the character class. This can be expressed with the following logical statement: "if (CharacterClass [PayLoadASCIIValue]==true), return match; else return nomatch," where PayLoadASCIIValue is the ASCII value of the current segment of the payload, or in this case, 114.

A given pattern can also include multiple character classes. For example, the pattern "[a-z][0-9][^\n][a-z]" has four character classes but only three unique character classes (i.e., [a-z], [0-9], and [^\n]) because [a-z] is a repeated character class. So, compiler first determines the number of unique character classes present in the pattern(s). The compiler then assigns each character class a unique number (e.g., an index or identifier). For example, the compiler assigns [a-z] an index of 1, [0-9] an index of 2, and [^\n] an index of 3. Even though it appears twice, the character class [a-z] is stored as a bitmap once, and can be accessed by its index of "1."

The compiler stores the character classes as a two-dimensional matrix, which can be accessed with two indices as an input. The first index identifies a character class, and the second index identifies a value within that character class.

In the context of the NFA graph, the "element" field of each node for node type="character class" contains character class number. In addition, the "element" field of a node of types "variable count" or "fixed count" can also be the index of a character class, such that the graph walk engine matches for the character class a variable or fixed number of times, respectively.

In addition, the compiler determines the character classes of all patterns. For example, the compiler may receive pattern one "[a-z][0-9]," pattern two "[a-z][^\n]" and pattern three "[0-9][A-F]." While patterns one, two and three have six character classes in total, it has only four unique character classes. Therefore, the compiler assigns an index of 1 to [a-z], an index of 2 to [0-9], an index of 3 to [^\n] and an index of 4 to [A-F]. Any node of the graph can access the character class by accessing its bitmap, regardless of the pattern(s) it appeared in. This reduces the memory required to store all of the character classes.

During walking, the graph walk engine uses the element stored in the node indicating a character class (of node type character class) as the first index and uses the payload segment (e.g., payload byte) as the second index to the particular character class bitmap. This loads a particular bit of the two-dimensional matrix, where the bit loaded at the location of both indices indicates whether the payload segment (e.g., the payload byte) is within the particular character class.

Figure 4B:
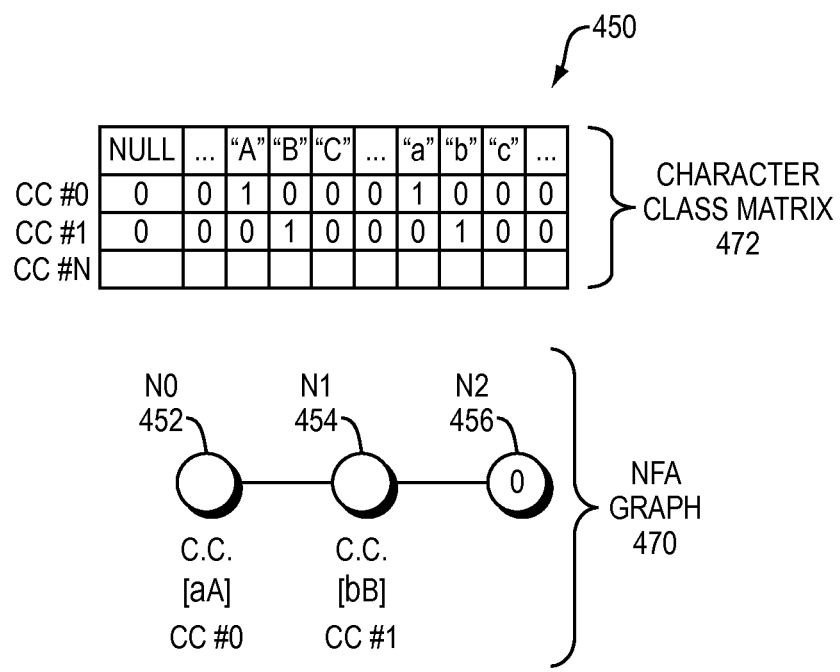
FIG. 4B is a diagram illustrating an example embodiment of an NFA graph employed by the present invention.

FIG. 4B is a diagram 450 illustrating an example embodiment of an NFA graph 470 with dense nodes and a corresponding character class matrix 472 (e.g., bitmap table) employed in the present invention. The NFA graph 470 is configured to match the pattern "[aA][bB]," which matches payloads including "ab," "aB," "Ab," and "AB." The NFA graph 470, in this embodiment, utilizes character classes within the nodes of the graph to reduce the number of nodes in the graph and reduce graph complexity. The compiler determines the pattern includes two unique character classes, [aA] and [bB]. The compiler assigns character class [aA] an index of 0 and assigns character class [bB] an index of 1, and both are stored as a bitmap in a two dimensional matrix.

The character class matrix 472 shows the representation of the character classes [aA] and [bB] at their corresponding indices. Character Class 0 (i.e., [aA]) shows the entries for "A" and "a" being set, and Character Class 1 (i.e., [bB]) shows the entries for "b" and "B" being set. These character classes can be utilized by other graphs employing the same character classes, and the matrix can further include different character classes from other graphs. Another example of a character class matrix is shown in relation to FIG. 21.

Figure 22:
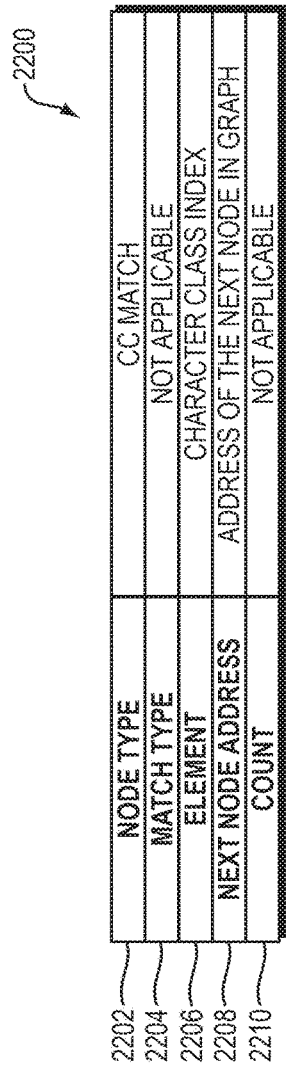
FIG. 22 is a table illustrating a format of a Character Class Match Node.

FIG. 22 is a table 2200 illustrating a format of a Character Class Match Node. The table 2200 includes a node type 2202, match type 2204, element 2206, next node address 2208, and a count value 2210. For the Character Class Match Node, the node type 2202 indicates character class. The match type 2204 indicates that it is not applicable (e.g., a NULL value). The element 2206 indicates a character class index used for accessing a character class in the character class matrix. The next node address 2208 includes an address of the next node in the graph. The count value 2210 is not applicable for a character class match node.

Referring again to FIG. 4B, the graph walk engine, upon reading Node N0 452, determines that the Node N0 452 is matching for any value/character/letter in the designated character class, which in this case is "a" or "A," and loads the first segment of the payload. The graph walk engine loads the node type of the node, which indicates it is a character class, and the element of the node, which indicates that the character class has an index of 0. The graph walk engine then uses the current segment of the payload as an index to the bitmap (e.g., loads Matrix[0][PayloadSegmentValue]) to determine if the segment of the payload matches the character class. If the first segment of the payload is any value/character/letter in the designated character class, as indicated by the value loaded from the bitmap at the location of the indices, the graph walk engine loads Node N1 454, pointed to by "next node address" stored in Node N0 452.

The graph walk engine, upon reading Node N1 454, determines that the Node N1 454 is matching for any value/character/letter in the designated character class, which in this case is "b" or "B," and loads the next segment of the payload. The graph walk engine loads the node type of the node, which indicates it is a character class, and the element of the node, which indicates that the character class has an index of 1. The graph walk engine then uses the current segment of the payload as an index to the bitmap (e.g., loads Matrix[1][PayloadSegmentValue]) to determine if the segment of the payload matches the character class. If the current segment of the payload is any value/character/letter in the designated character class, as indicated by the value loaded from the bitmap at the location of the indices, the graph walk engine loads node pointed by "next node address" stored in Node N1 454 (i.e., Node N2 456). The graph walk engine, upon loading Node N2 456, based on "node type" of Node N2 456, determines that it is a marked node. The graph walk engine can then return a match.

The NFA graph 470 is of reduced complexity and size. Further, increasing the number of values/characters/letters in each character class does not increase or decrease the size of the NFA graph 470. In addition, increasing the number of different character classes in the graph increases the size of the NFA graph 470 linearly, instead of by a multiple of the number of values/characters/letters in the character class.

In addition to the character class, according to an example embodiment of the present invention, another node type is a string node. A string node is one node that matches for consecutive values/letters/characters.

Figure 23:
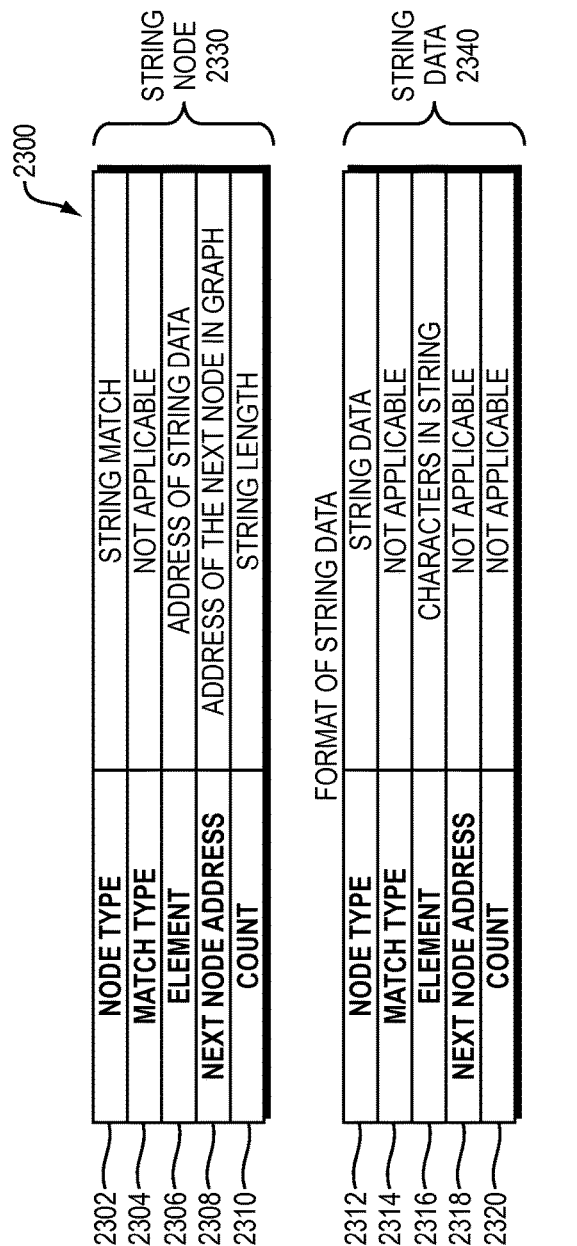
FIG. 23 is a table illustrating a format of a String Match Node.

FIG. 23 are tables 2300 illustrating a format of a String Match Node. A string node table 2330 includes a node type 2302, match type 2304, element 2306, next node address 2308, and count value 2310. The node type 2302 indicates "string match." The match type 2304 is not applicable (e.g., a NULL value). The element 2306 indicates the address of string data 2340. The next node address 2308 indicates the address of the next node in the graph. The count value 2310 indicates the length of the string.

The string data 2340, indicated by the address of the string data of the element 2306 of the string node 2330, includes a node type 2312, match type 2314, element 2316, next node address 2318, and count value 2320. The node type 2312 indicates it is "string data." The element 2316 indicates the characters in the string. The match type 2314, next node address 2318, and count 2320 are all not applicable.

A similar variant to the string node is a case insensitive string node. A case insensitive string node can be indicated in the pattern, in one example embodiment, by a modifier preceding the string, such as "{i}abc", which would match the following payloads: "abc", "abC", "aBc", "aBC", "Abc", "AbC", "ABc", and "ABC". A person of ordinary skill in the art can recognize that the modifier "{i}" could be any indicated symbol or series of symbols.

To process case insensitive string nodes (and case insensitive character nodes), one of the bit for alphabet is masked before making a comparison. For example, ASCII values for capital letters (A-Z) are between 65-90 and are between 97-122. The binary representation of 'A' (e.g., decimal 97) is 1100001 and the binary representation of 'a' (e.g., decimal 65) is 1000001. Therefore, only one bit is different between the two binary values (e.g., bit[5], if indexing from the least significant bit starting from 0). For each corresponding pair of case-insensitive alphabet characters, bit[5] (where the least significant bit of each is zero) is masked, both in the element and the payload segment before comparison. The comparison returns a match because, other than bit[5], which only represents a change in capitalization, the values are the same. A person of ordinary skill in the art can recognize that other bit or bits than bit[5] can be used as the masking bit in other character schemes, for example.

Figure 4C:
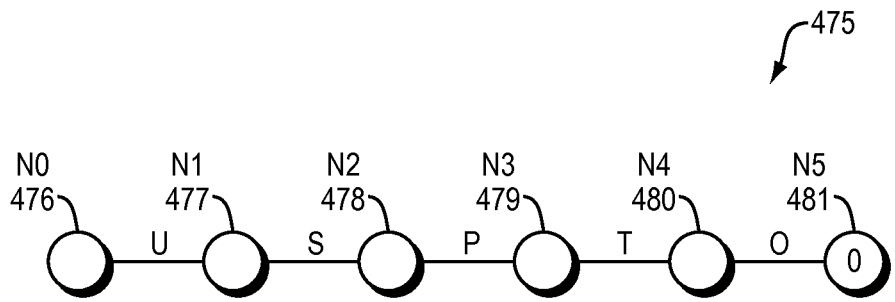
FIG. 4C is an example embodiment of a conventional graph for the pattern "USPTO" using five individual nodes.

FIG. 4C is an example embodiment of a conventional graph 475 for the pattern "USPTO" using five individual nodes, each node checking for a value/character/letter. The conventional graph 475 therefore has a first node N0 476 matching for 'U', a second node N1 477 matching for 'S', a third node N2 478 matching for 'P', a fourth node N3 479 matching for 'T', a fifth node N4 480 matching for 'O', and a marked node N5 481 indicating a match.

Figure 4D:
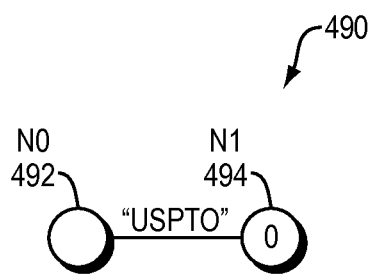
FIG. 4D illustrates an example embodiment of a graph employing a string node.

FIG. 4D illustrates an example embodiment of a graph 490 employing a string node. Node N0 492 is a string node including a pointer to the string "USPTO." Node N0 492 instructs the engine to match for the entire string "USPTO" instead of matching for each individual letter and then loading a next node, as in FIG. 4C.

Figure 24:
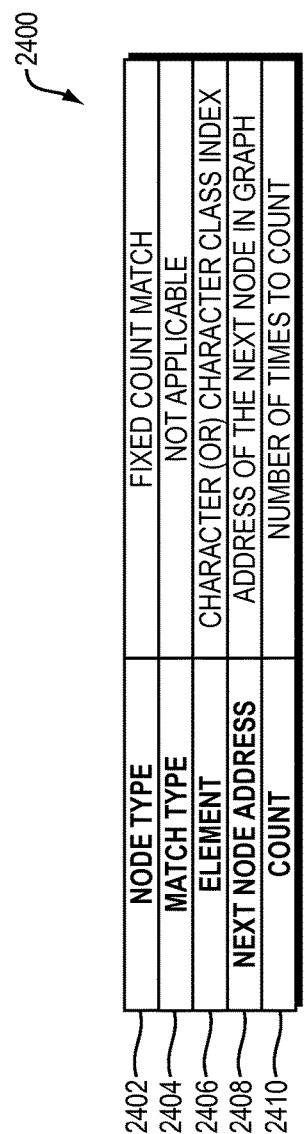
FIG. 24 is a table illustrating a format of a Fixed Count Match Node.

FIG. 24 is a table 2400 illustrating a format of a Fixed Count Match Node. For fixed count nodes, node type 2402 indicates a fixed count match 2402. A match type field 2404 is not applicable for fixed count nodes. For Fixed Count Match Nodes, an element 2406 may indicate a character to match for or it may indicate a character class index to match for. A next node address 2408 contains the address of the next node to process if the match succeeds. A count value 2410 contains the fixed number of times to match the element.

FIG. 25 is a table 2500 illustrating a format of a Variable Count Match Node. The node includes a node type 2502 indicating a variable count match. The node further includes a match type 2504 indicating whether the variable count node is lazy, greedy, possessive, or an all match node. The element 2506 may contain a character to match for or it may indicate a character class index to match for. The next node address 2508 includes the address of the next node to process if the match succeeds. A count value 2510 includes the maximum number of times to match the element, which includes special symbol to represent infinity.

Optionally, the count value 2510 can also contain a second count value to store a minimum number of times the element must match (if no second count value is provided, the default is zero). This can be used to represent range matches. Such patterns can also be represented by a combination of fixed count node matching for element the minimum number of times followed by variable count node matching for the remainder of times.

Figure 5:
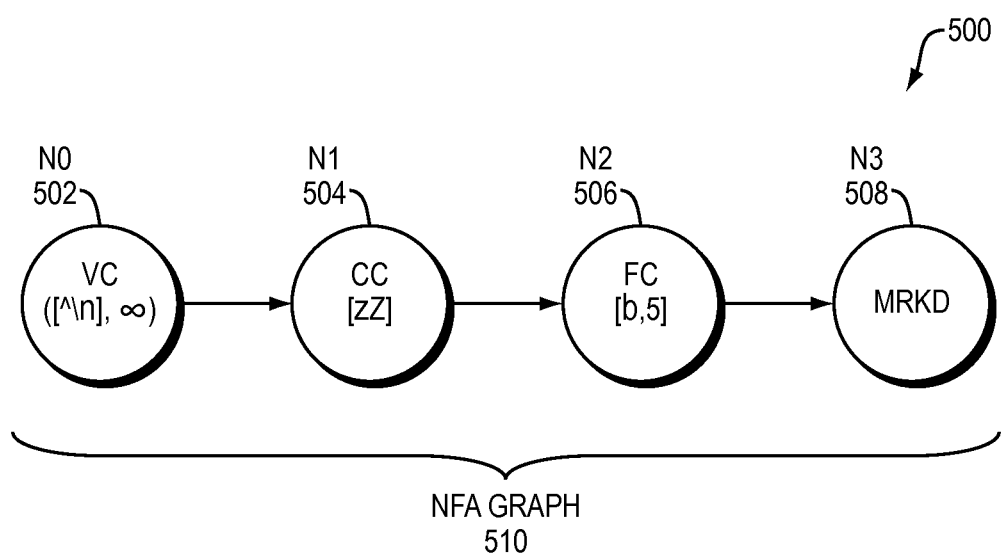
FIG. 5 is a diagram illustrating an example embodiment of an NFA graph illustrating an example embodiment of the present invention.

FIG. 5 is a diagram 500 illustrating an example embodiment of an NFA graph 510 illustrating an example embodiment of the present invention. The NFA graph 510 is configured to detect the pattern "[^\n]*[zZ]b{5}" where [^\n] is a character class indicating any value/character/letter except for the new line character, and ["zZ"] is a character class representing either the characters "z" or "Z".

Node N0 502 is a variable count node. The variable count node can either be lazy, greedy, possessive (which is an optimized form of a greedy node) or all match type node. The node type is set when the graph is compiled from the pattern. The user can indicate in the pattern which match node type the variable count node should be compiled as. Alternatively, the user can also set the compiler to default to any of the four modes, depending on the desired graph behavior. Suppose that the graph walk engine processes a payload of "yyyZbbbbbzyyyZbbbbb."

If Node N0 502 is lazy, the graph walk engine finds the shortest path possible to the next node, Node N1 504. That is, the graph walk engine processes the first instance of "z" or "Z" in the payload at Node N1 504 instead of at Node N0 502, even though Node N0's 502 element includes finding any payload segment other than a new line, which includes "z" and "Z." If Node N0 502 processed the payload in such a way, however, it would not utilize the shortest path through the graph.

The graph walk engine, while processing Node N0 as a variable count lazy node, pushes a run stack entry of the node N0 with a payload offset of zero to the run stack. The graph walk engine, upon pushing the run stack entry, fetches the next node N1 504. The graph walk engine fetches the next byte of the payload corresponding to the payload offset of zero, 'y', and tries to match it with the element of the node N1 504, the character class [zZ]. Since the byte does not match the character class, the graph walk engine pops the run stack entry. The graph walk engine then processes the same byte with popped stack entry which contains Node N0 502. The byte 'y' matches the character class [^\n], so it delivers a match. The graph engine then increments the payload offset by 1 and pushes a run stack entry containing Node N0 502.

The graph walk engine, upon pushing the run stack entry, fetches the next node N1 504. The graph walk engine fetches the next byte of the payload corresponding to the payload offset of one, 'y', and tries to match it with the element of the node N1 504, the character class [zZ]. Since the byte does not match the character class, the graph walk engine pops the run stack entry. The graph walk engine then processes the same byte with popped stack entry which contains Node N0 502. The byte 'y' matches the character class [^\n], so it delivers a match. The graph walk engine increments the payload offset by 1 and pushes a run stack entry containing Node N0 502.

The graph walk engine, upon pushing the run stack entry, fetches the next node N1 504. The graph walk engine fetches the next byte of the payload corresponding to the payload offset of two, 'y', and tries to match it with the element of the node N1 504, the character class [zZ]. Since the byte does not match the character class, the graph walk engine pops the run stack entry. The graph walk engine then processes the same byte with popped stack entry which contains Node N0 502. The byte 'y' matches the character class [^\n], so it delivers a match. The graph walk engine increments the payload offset by 1 and pushes a run stack entry containing Node N0 502.

The graph walk engine, upon pushing the run stack entry, fetches the next node N1 504. The graph walk engine fetches the next byte of the payload corresponding to the payload offset of three, 'Z', and tries to match it with the element of the node N1 504, the character class [zZ]. Since the byte matches the character class, the graph walk engine fetches the next node N2 506.

The graph walk engine then loads the fixed count node N2, which matches for 'b' five times. The graph walk engine loads the next five segments of the payload, all of which are 'b,' which the fixed count node matches to its element, which is also 'b.' After the match of the fixed count node N2 506, the graph walk engine then loads node N3 508, which is the marked node. The marked node indicates that a match is found. The graph walk engine then pops all entries in the run stack and discards them if the duplication bit is '1', which in this case, discards single entry containing Node N0 502 with payload offset three in the run stack. The duplication bit is a flag indicating that, upon a reaching a marked node in the NFA graph (e.g., finding a match in the payload), any run stack entry with the duplication bit flagged (e.g., set to '1') can be popped from the run stack and discarded without further processing. If the duplication bit is not flagged (e.g., set to '0'), then the run stack entries are not discarded upon being popped, and are processed to attempt to find additional (e.g., for an all match node) match.

Figure 17:
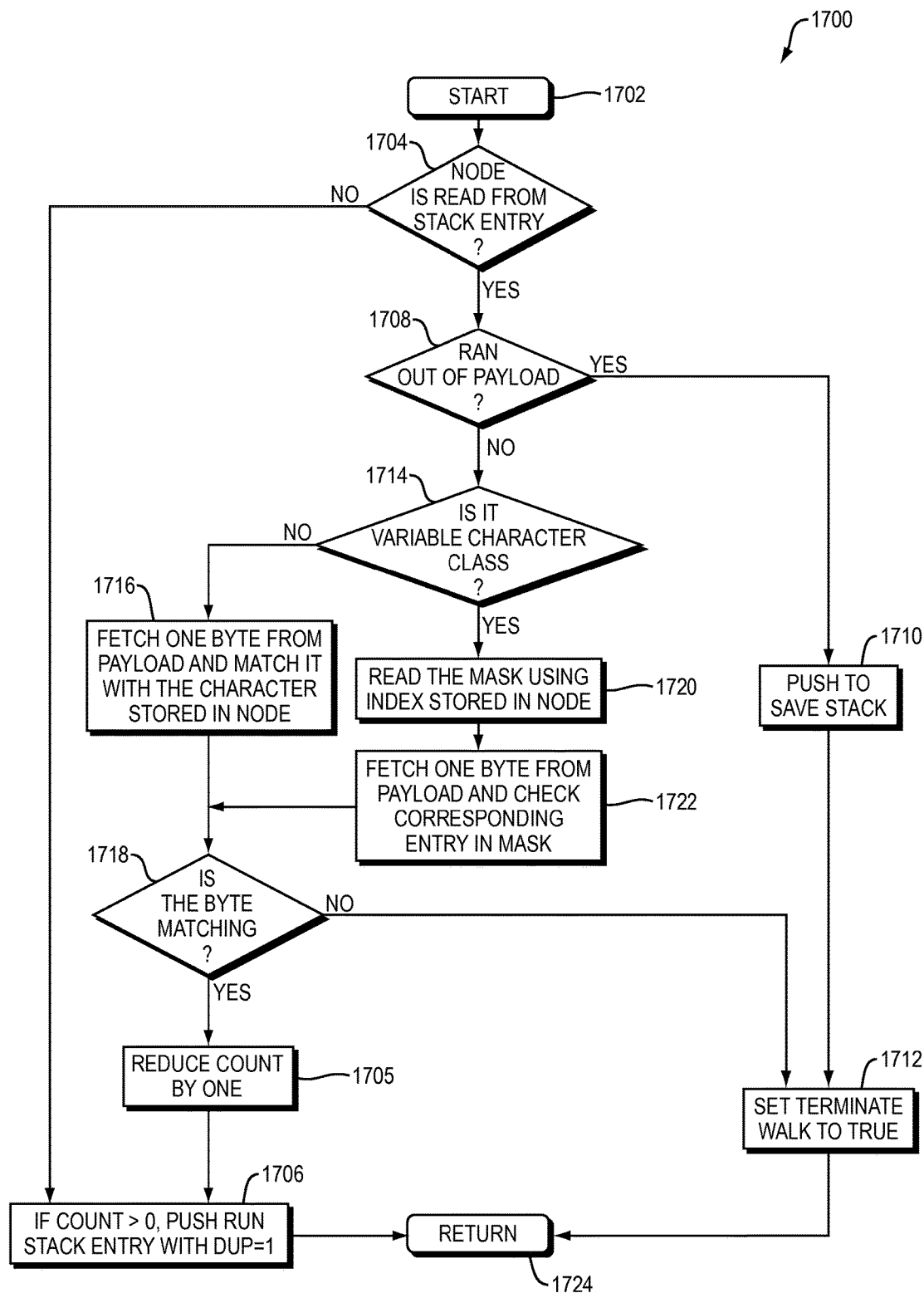
FIG. 17 is a flow diagram illustrating an example embodiment of processing a variable count lazy node.

Processing a variable count lazy node is described in more detail in relation to FIG. 17.

If Node N0 502 is greedy, the graph walk engine finds the longest path possible to the next node, Node N1 504. For example, the first "z" or "Z" in the payload does not necessarily mean that Node N1 504 is processed. Suppose that the graph walk engine processes a same payload of "yyyZbbbbbzyyyZbbbbb." While a lazy Node N0 502 returns "yyyZbbbbb" as a match, but a greedy Node N0 502 returns "yyyZbbbbbzyyyZbbbbb." In other words, Node N0 502 ignores the first possible match and continues matching the payload to find the longest possible match. Matching the payload in such a way requires the graph walk engine to save its steps, for example, by pushing nodes and offset of the payload position to a run stack. This way, if the graph walk engine reaches the end of the payload without finding a match, it can pop nodes from the run stack to backtrack to match an earlier possible match.

In an example embodiment of the present invention, the graph walk engine, in processing a greedy or possessive node N0 502, loads bytes of the payload and matches them against the element until it finds a nomatch or it runs out of payload. The graph walk engine runs out of payload because the character class is [^\n], which covers all values/characters/letters in the payload. The graph walk engine then pushes the node to the run stack including a duplication bit being set, a payload offset, and a count indicating the number of bytes consumed while matching the element indicated in the variable count node (i.e., in this case the count is 19). The graph walk engine then loads character class node N1 504, but as there is no byte to consume from the payload, it returns a nomatch.

The graph walk engine then pops the variable count node from the run stack and reduces the count by one. The graph walk engine then pushes the node to the run stack including the duplication bit being set, a payload offset, and a count (18) indicating the number of bytes consumed. The graph walk engine then loads the character class node N1 504. The graph walk engine attempts to consume the 19$^{th}$ byte of the payload, which is a 'b', but this does not match the character class of Node N1 504, which is [zZ]. The graph walk engine then pops the run stack entry again. This is repeated until the count is decreased to a number where the byte that Node N1 504 consumes is a match, which is when the count is 13. When the count is 13, the variable count node effectively consumes "yyyZbbbbbzyyy." Node N1 504 then attempts to consume the 14$^{th}$ byte, which is "Z," which is a match for the character class [zZ]. Then the graph walk engine loads node N2 506. Node N2 consumes the next 5 "b"s in the payload. Then the graph walk engine loads node N3 508, which is a marked node that indicates a match is found. After processing marked node N3 508, the graph walk engine pops and discards all run stack entries with duplication bit set to 1 and in this case, there is only one such entry in run stack. Therefore, the greedy node found the longest match in the payload. Setting/unsetting the duplicate bit is one implementation scheme to separate (mark) run stack entries pushed by engine during run time from initial input buffer entries also present in run stack, however this can be achieved by other ways as well. Processing a variable count greedy node is described in more detail in relation to FIG. 18.

If Node N0 502 is possessive, the graph walk engine finds the longest path possible to the next node, Node N1 504. The graph walk engine, for the possessive node, delivers the same result as a greedy node described above, but performs a more optimized process, by not backtracking upon reaching the end of the payload, as described in more detail in relation to FIG. 19.

If Node N0 502 is a variable count all match node, the graph walk engine finds all possible paths possible to the next node, Node N1 504. The graph walk engine can return multiple matches for the variable count all match node. Processing a variable count all match node is described in more detail in relation to FIG. 20.

Figure 6A:
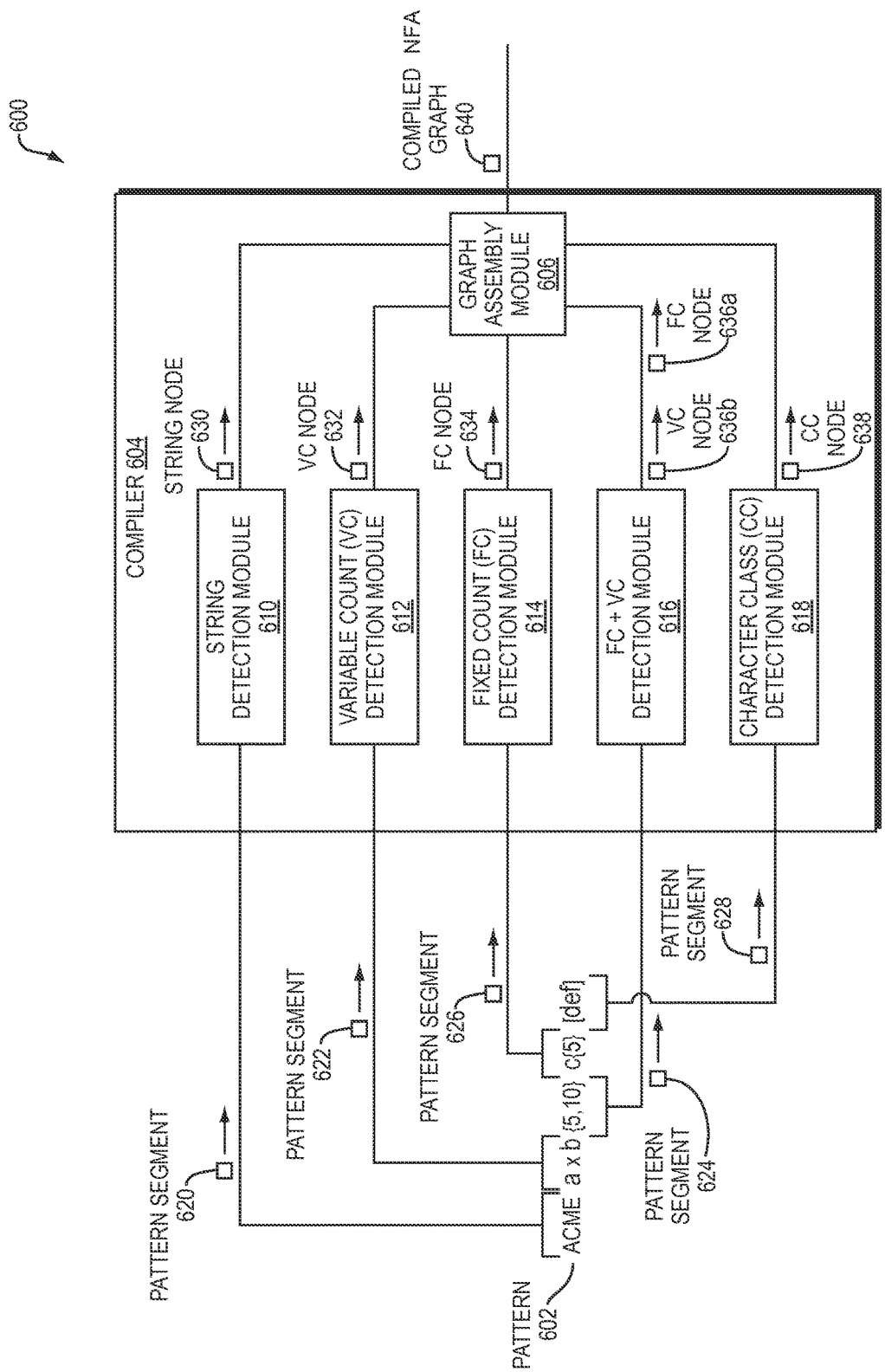
FIG. 6A is a block diagram illustrating an example embodiment of a compiler processing a pattern.

FIG. 6A is a block diagram 600 illustrating an example embodiment of a compiler 604 processing a pattern 602. The pattern 602 in this example is "ACMEa*b{5,10}c{5}[def]." The pattern 602 includes pattern segments 620, 622, 624, 626 and 628 that can be separated into a string node (e.g., "ACME"), a variable count node (e.g., "a*"), a fixed count and variable count node, e.g., "b{5,10}," which is convertible to "b{5}b{0,5}", a fixed count node, e.g., c{5}, and a character class, e.g., [def], respectively.

The compiler 604 includes a string detection module 610, variable count detection module 612, fixed count detection module 614, fixed count and variable count detection module 616, and character class detection module 618. Each module 610, 612, 614, 616 and 618 receives the pattern 602, or respective pattern segments 620, 622, 624, 626, and 628 therein, and generates nodes 630, 632, 634, 636a-b, 638 for a compiled NFA graph 640 assembled by a graph assembly module 606 based on the pattern.

In another embodiment, the compiler 604 examines the pattern 602 for elements and element type without individual modules to match for each element and node type.

Figure 6B:
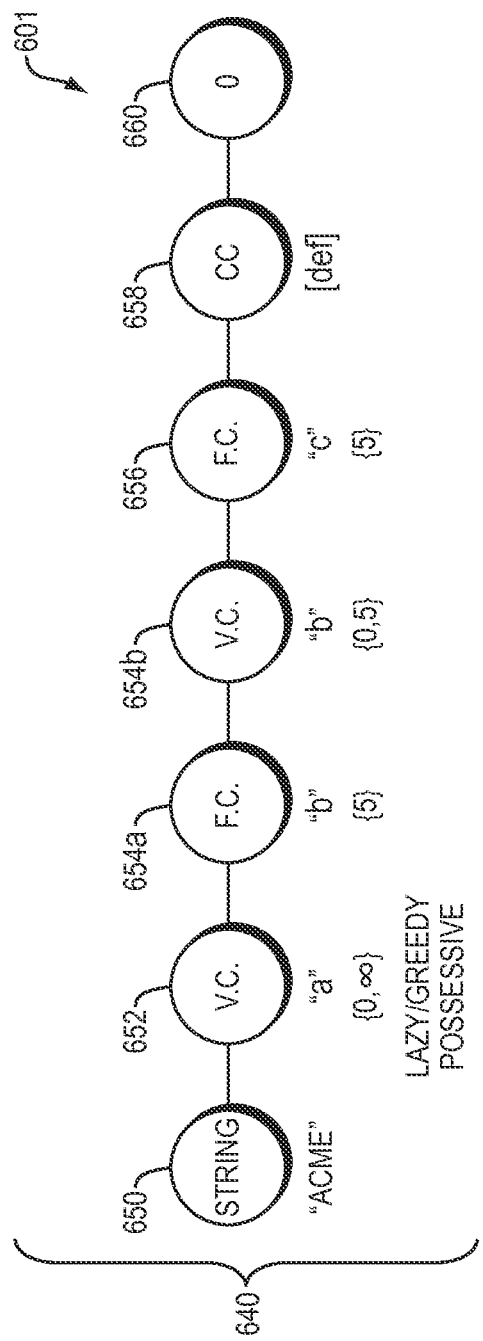
FIG. 6B is a diagram of the compiled NFA graph resulting from the pattern of FIG. 6A.

FIG. 6B is a diagram 601 of the compiled NFA graph 640 resulting from the pattern 602 of FIG. 6A. The compiled NFA graph 640 begins with a string node 650 matching for the string "ACME." The graph 640 then has a next variable count node 652 configured to match for the element "a" an infinite number of times. The variable count node can either be lazy, greedy, possessive, or all. The node can be set to lazy, greedy, possessive, or all match type based on the syntax of the pattern. For example, if a meta-character is followed by a second meta-character of "?", such as the patterns "*?", "+?", "??" or "{n,m}?", the compiler can create a match type lazy variable count node. If the meta-character is followed by a second meta-character of "+", such as "*+", "++", "?+" and "{n,m}+", the compiler can create match type possessive nodes. If a meta-character is followed by a second meta-character of "*", such as the patterns "**", "+*", "?*", and "{n,m}*", the compiler can create match type all variable count nodes.

For example, consider a payload of "abbbbbbb." For a pattern of "ab*", a variable count node with match type greedy is generated. The result is that the node consumes the entire payload, so that the result is "abbbbbbb".

Similarly, for a pattern of "ab*+", a variable count node with match type possessive is created. A possessive node has similar properties to a greedy node, however is configured to not backtrack upon reaching the end of the payload. Likewise, the result is that the variable count possessive node consumes the entire payload here and does not backtrack, so that the result is "abbbbbbb", which happens to be the same as the greedy node.

For a pattern of "ab*?", a variable count node with match type lazy is created. The result is that the variable count node consumes the shortest possible match, which is "a".

For a pattern of "ab**", a variable count node with a match type all is created. The result is that all possible matches are found, so that "a", "ab", "abb", "abbb", "abbbb", "abbbbb", "abbbbbb", and "abbbbbbb" are found.

In other embodiments, various symbols can be used to indicate the match type, for example, by designating special characters to be prefixes or suffixes to the patterns. In other embodiments, a setting of the compiler that generated the graph 640 can set the match type of node.

The graph 640 then has a fixed count node 654a and variable count node 654b, which are based on the "b{5,10}" pattern segment being split into b{5} and "b{0,5}" logically. The fixed count node 654a matches for "b" five times. The variable count node 654b matches for "b" anywhere from zero to five times. The graph 640 then has a fixed count node 656 that matches for "c" five times in the payload. The character class node 658 matches for the element [def], which are any of the characters "d," "e," or "f."

The graph can also match for a character class as part of a variable count node or fixed count node. For instance, the pattern "[xyz]{0,5}" compiles into a variable count node matching for the character class [xyz] from zero to five times. For example, "xyzzx" is a payload that matches the pattern.

Figure 7:
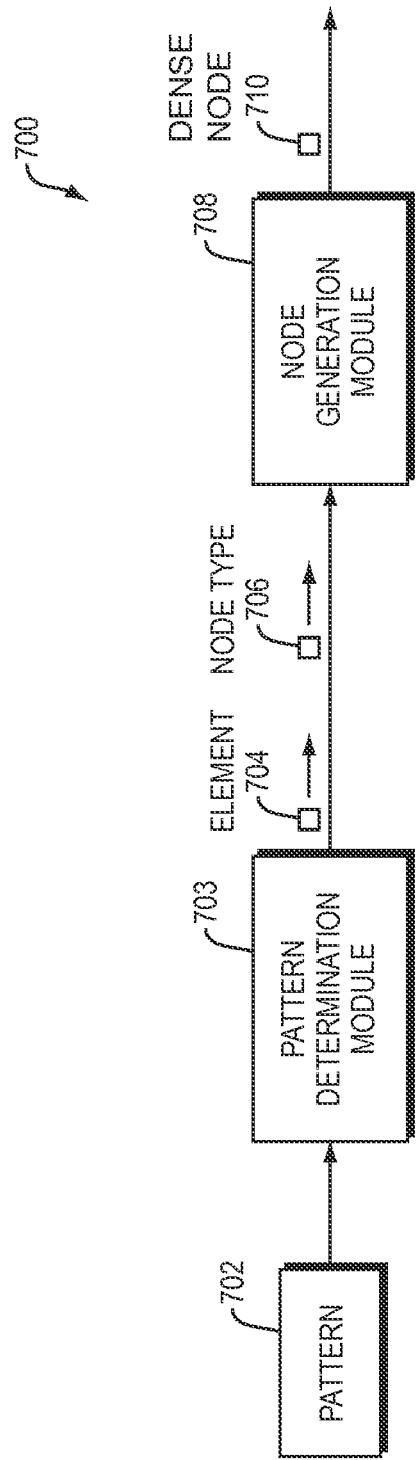
FIG. 7 is a block diagram illustrating an example embodiment of compiling a pattern.

FIG. 7 is a block diagram 700 illustrating an example embodiment of compiling a pattern 702. A pattern determination module 703 examines a pattern 702 for a match term. The match term includes an element and a node type. If the pattern determination module 703 finds the match term, it outputs the match term as an element 704 and node type 706 to a node generation module 708. If the pattern determination module 703 does not find a match term, it indicates the pattern is over, and the pattern determination module 703 can consume another pattern, or if there are no more patterns, finish compiling. The node generation module 708 generates a dense node 710 including the element 704, which can be a value/character/letter, character class, or string, and a node type 706, which can be a value/character/letter, character class, variable count, fixed count, fixed count and variable count, string, or a split node (used for alternation) or marked node (used as final node of the graph) to declare a match.

Figure 8:
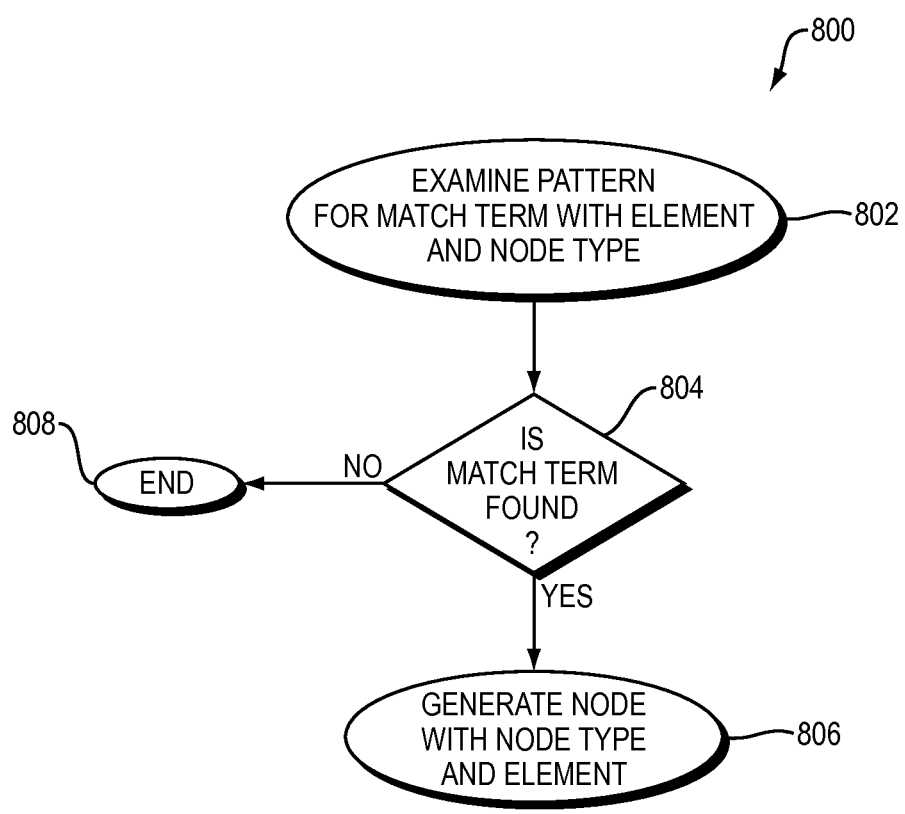
FIG. 8 is a flow diagram illustrating an example embodiment of compiling a pattern.

FIG. 8 is a flow diagram 800 illustrating an example embodiment of compiling a pattern. Compiling begins by examining a pattern for a match term, the match term including an element and node type (802). Then, the method determines whether the match term is found (804). If so, the method generates a node that indicates the node type and the element (806). If not, the method ends (808) and optionally compiles another pattern.

Figure 9:
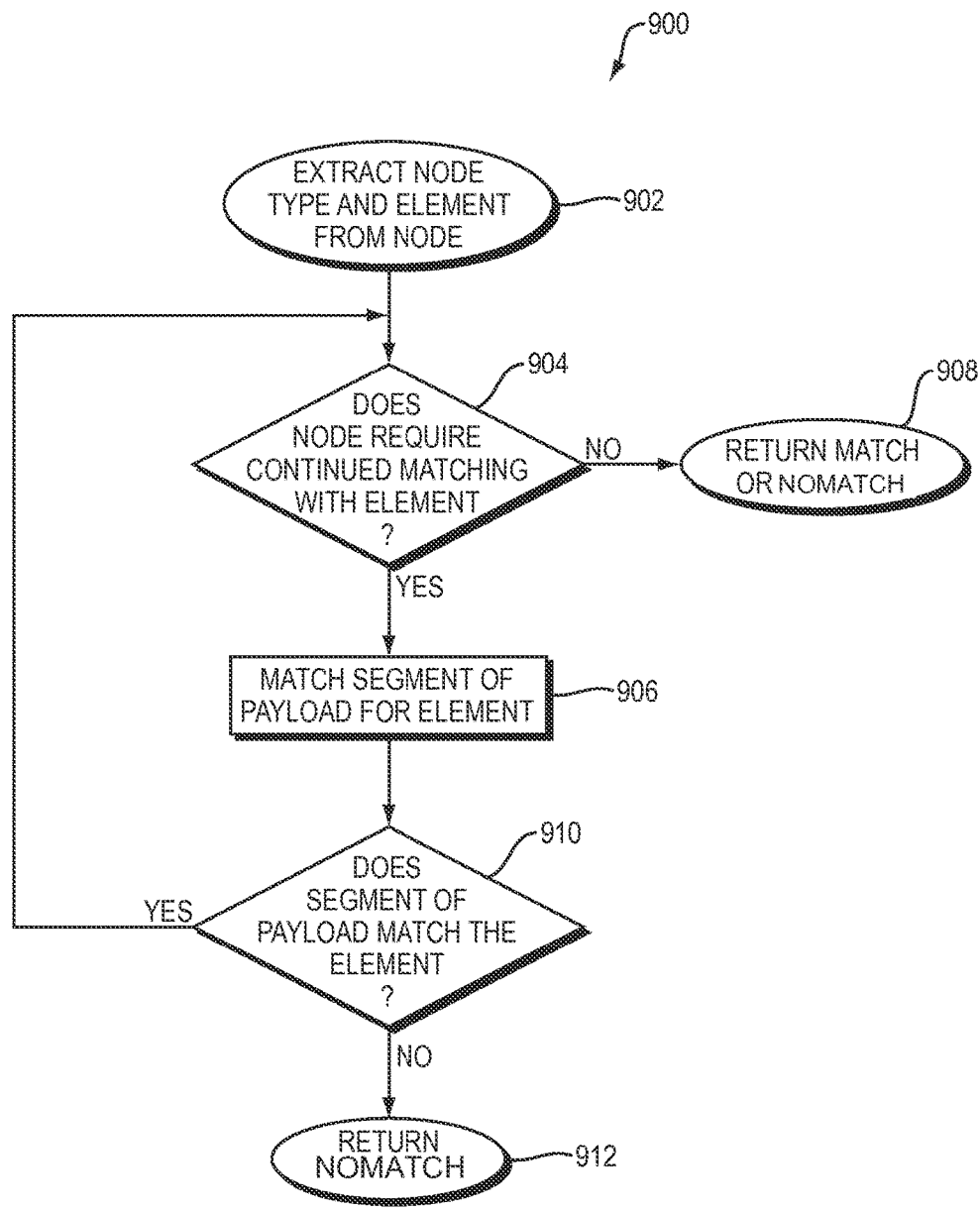
FIG. 9 is a flow diagram illustrating an example embodiment of a graph walk engine processing a node.

FIG. 9 is a flow diagram 900 illustrating an example embodiment of a graph walk engine processing a node. The graph walk engine extracts a node type and element from the node (902). The element, as described above, can be a value/character/letter, character class index, or string value. The graph walk engine then determines whether the node requires continued matching with the same element (904). The graph walk engine can track the number of elements it has matched for a variable count node or fixed count node, for example, by using an index or counting variable. If the node type indicates continued matching for the element, the graph walk engine matches a payload segment to the element (906). The graph walk engine then determines whether the payload segment matches the element (910). If so, it determines whether the node requires continued matching (904). If the node type does not indicate continued matching, the graph walk engine returns a match or nomatch for the node (908) and can be available to process a next node in the graph.

If the segment of the payload does not match the element (910), however, the graph walk engine returns a nomatch (912).

Figure 10:
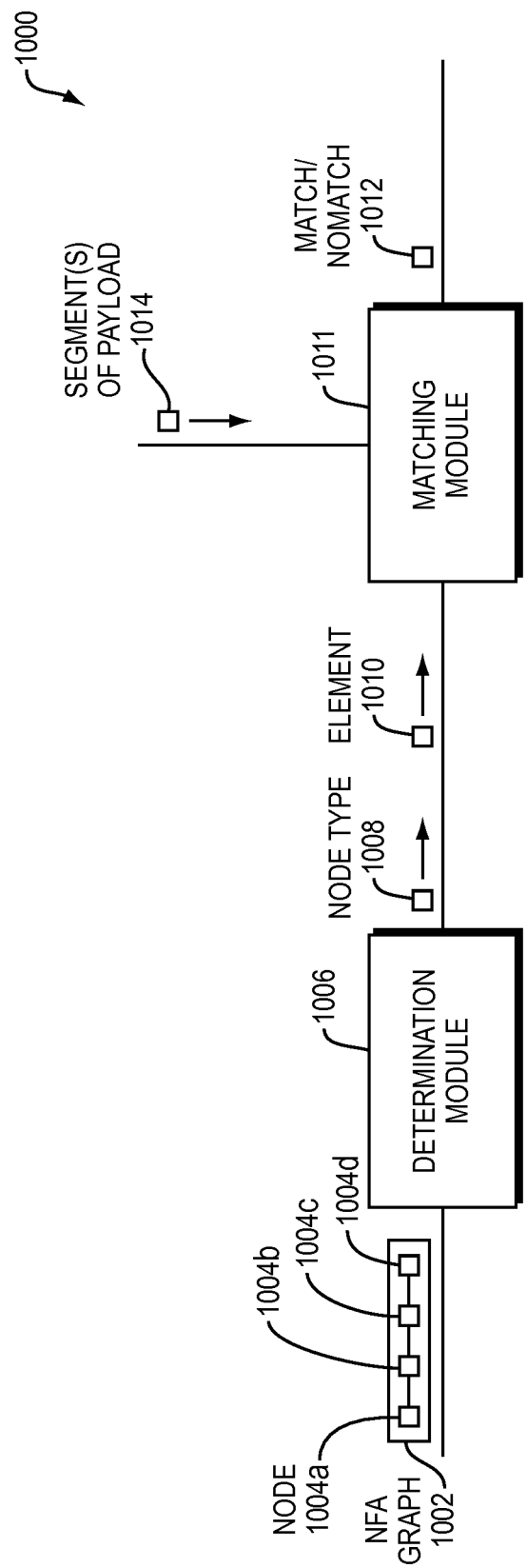
FIG. 10 is a block diagram illustrating an example embodiment of a graph walk engine processing nodes of a NFA graph.

FIG. 10 is a block diagram 1000 illustrating an example embodiment of a graph walk engine processing nodes 1004a-d of a NFA graph 1002. A determination module 1006 receives an NFA graph 1002 including nodes 1004a-d. The NFA graph 1002 can include any number of nodes 1004a-d. Further, the determination module 1006 can, in an embodiment, receive an individual node 1004a-d. The determination module 1006 outputs a node type 1008 and an element 1010 to a matching module 1011. The matching module 1011 matches segment(s) 1014 of payload for the element 1010 based on the node type 1008. The matching module 1011 can receive additional segment(s) 1014 based on the node type 1008, for example, a variable count node or fixed count node that is configured to match one or more payload segment. Upon finishing processing, the matching module 1011 outputs a match or nomatch 1012. Optionally, the matching module 1011 can request the determination module 1006 process a next node of the NFA graph 1002. The matching module 1011 can further process earlier or later segments of the payload and earlier and later nodes of the NFA graph.

Figure 11:
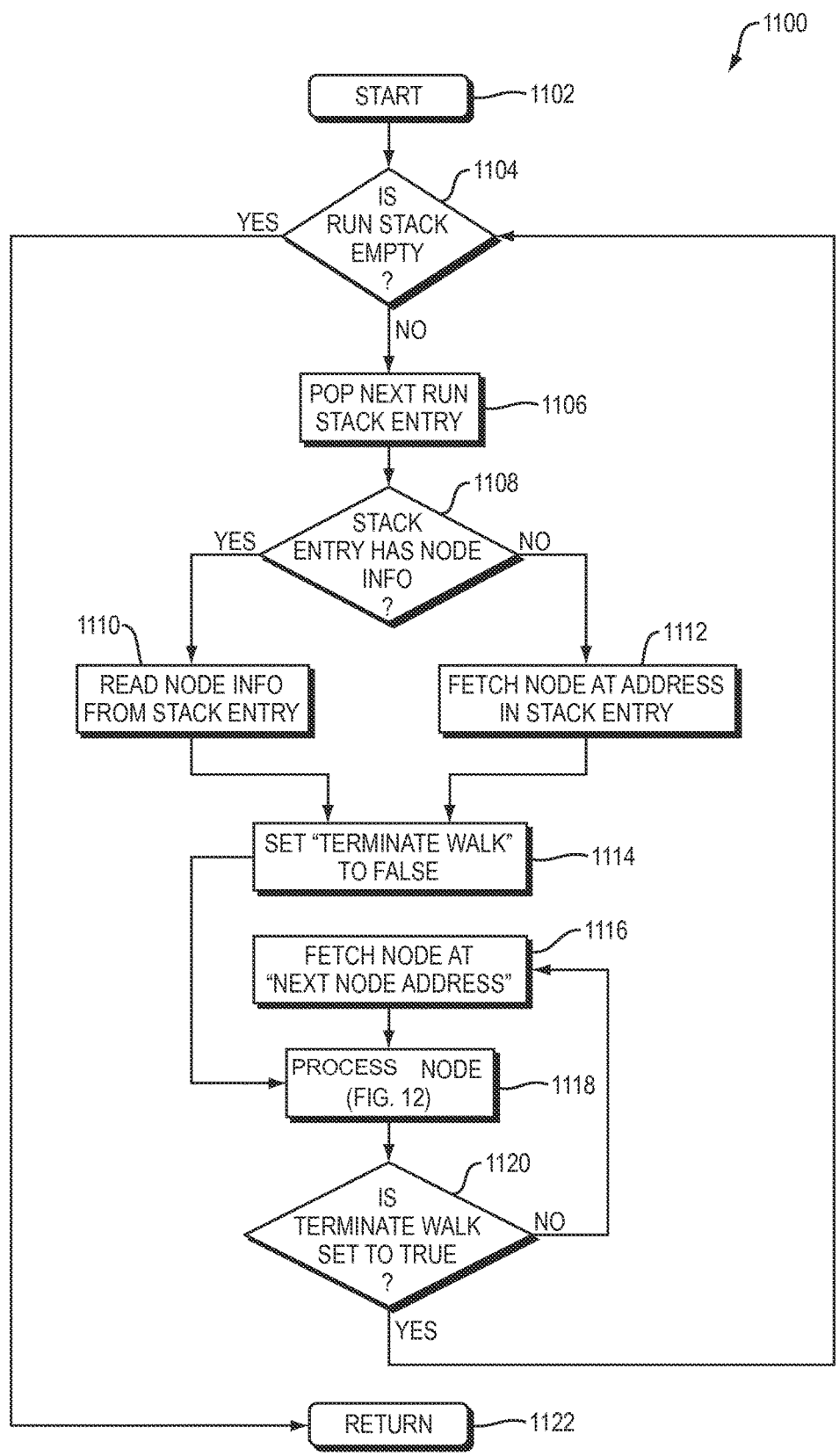
FIG. 11 is a flow diagram illustrating a process of walking the NFA graph employed by the present invention.

FIG. 11 is a flow diagram 1100 illustrating a process of walking the NFA graph employed by the present invention. In an embodiment, elements performing the process can be elements described in relation to the block diagram 250 illustrated in FIG. 2B.

The graph walk engine 252 includes memories storing a run stack 260 employed to save the paths of walks through other portions of the graph and a save buffer/stack 264 employed to store the save buffer/stack 264 when a payload finishes being processed with only partial match, so that the engine can reload the stack entries from the save buffer into the run stack when the next payload of the same flow is loaded. In an embodiment, the run stack 260 or save buffer 264 can be maintained as circular buffers in a on chip memory and it can spill to an external system memory, but other stack implementations and types of memories can be employed. Also, the host can copy (move) entries from save buffer into run stack (input buffer) while feeding a next instruction to the engine to process subsequent payloads of the same flow.

The run stack 260 pushes stack entries to the head pointer and pops stack entries from the head pointer. The save buffer/stack en-queues stack entries at its tail pointer. The save buffer/stack 264 is structured as a queue because it en-queues entries at its tail pointer (e.g., LILO). A host coupled with the processor provides an initial run stack with at least one entry filled-in (e.g., input from the input buffer 258 of FIG. 2). The host can also provide an initial instruction (e.g. from the instruction queue 254). The walk instruction contains the following stack related information: (1) Run Stack Head Pointer; (2) Save Stack Tail Pointer; (3) Number of Run Stack Entries; and (4) Run Stack and Save Stack Size in number of entries.

In an example embodiment of the present invention, the run stack entry includes fields indicating a node type field, a duplicate field, a reverse processing field, a payload offset field, a type specific data field, and an address field. If the node type is "NOP" (e.g., No-op), the graph walker discards the run stack entry and pops the next run stack entry to be processed. If the node type is Fetch, the run stack entry does not contain the node information and the type specific data field is invalid. If the type is any type other than "NOP" or Fetch, (e.g., fixed character, variable count, split node, string node, character class, character, or marked node), the run stack entry itself contains the node information in the type specific data field. The possible node types are listed in the table below.

| Node Type | DESCRIPTION |
|---|---|
| NOP | NOP (No-Operation) |
| FTCH | Fetch Only |
| FCH_CNT | Fixed Counter - Character |
| FCC_CNT | Fixed Counter - Character Class |
| VCH_CNT_ALL | Variable Count Character - All |
| VCH_CNT_GD | Variable Count Character - Greedy Node |
| VCH_CNT_LZ | Variable Count Character - Lazy Node |
| VCH_CNT_PSV | Variable Count Character - Possessive Node |
| VCC_CNT_ALL | Variable Count Character Class - All |
| VCC_CNT_GD | Variable Count Character Class - Greedy Node |
| 0 VCC_CNT_LZ | Variable Count Character Class - Lazy Node |
| 1 VCC_CNT_PSV | Variable Count Character Class - Possessive Node |
| 2 SPLT_ALL | Split Node - All |
| 3 SPLT_GD | Split Node - Greedy |
| 4 SPLT_LZ | Split Node - Lazy |
| 5 SPLT_PSV | Split Node - Possessive |
| 6 STR_MTCH_CS | String - Case Sensitive |
| 7 STR_MTCH_CINS | String - Case Insensitive |
| 8 CH_MTCH | Character Match |
| 9 CC_MTCH | Character Class Match |
| 20-30 | Other Nodes |
| 1 MRK | Marked Node |

The duplicate field is used to separate run stack entries pushed by the graph walk engine during run time from the initial input buffer entries also present in a same run stack. The reverse field indicates whether the payload offset should be incremented or decremented after the current node is processed. This allows the payload to be processed in the forward and reverse directions. The offset field indicates the location of the payload that the current node processes. The address field contains the starting node address if the node type is fetch. Otherwise, the address field contains the address of the next node to be fetched, if the payload matches while processing the stack entry.

Pushing a run stack entry into the run stack 260 allows the graph walk engine to process other NFA nodes or another branch of the NFA graph, while being able to return to the nodes recorded in the run stack 260 if nomatch is found in that branch.

The save buffer/stack 264 allows the graph walk engine to save a partial match, for instance, in the event that it reaches the end of the payload. Upon loading the subsequent payload of the same flow, the engine copies stack entries from the save buffer/stack 264 into the run stack 260. In another embodiment, host software of a host device can copy contents of the save stack to the input stack upon providing a next instruction to the graph walk engine. In this embodiment, the graph walk engine is not aware of packet flow or subsequent packets in the flow, as it is managed by the host software. FIG. 11 illustrates an example embodiment of implementing the described system using a run stack and a save stack, however, a person of ordinary skill in the art can envision other implementations.

The process begins by starting a graph walk (1102). The process then determines whether the run stack (e.g., run stack 260) is empty (1104). If the run stack (e.g., run stack 260) is empty, the process returns (1122). The run stack (e.g., run stack 260) can be pushed entries from an input buffer 258 in response to an instruction 253 from the host. If the run stack (e.g., run stack 260) is not empty (e.g., has at least one entry), the graph walker (e.g., engine 252) pops the run stack (e.g., run stack 260) to load the next run stack entry (1106). The run stack (e.g., run stack 260) is a Last-In-First-Out (LIFO) data structure, so the entry popped from the run stack (e.g., run stack 260) is the most recent entry pushed into the run stack (e.g., run stack 260).

The graph walk engine then determines whether the run stack entry stores node information (1108). If so, the graph walk engine reads the node information from the popped run stack entry (1110). If not, the graph walk engine fetches the node from the memory address indicated in the popped run stack entry (1112).

The graph walk engine then sets a "terminate walk" bit (also referred to as a "done" bit) in the result to false (1114). The graph walk engine then processes the node indicated by the run stack entry (1118), which is explained in more detail in relation to FIG. 12. In relation to FIG. 11, the graph walk engine then determines whether the terminate walk bit gets assigned to TRUE inside the node being processed (1120). If not, the graph walk engine fetches a node indicated at the "next node address" field of the current node (1116). If so, then the graph walk engine determines whether the run stack is empty (1104).

Figure 12:
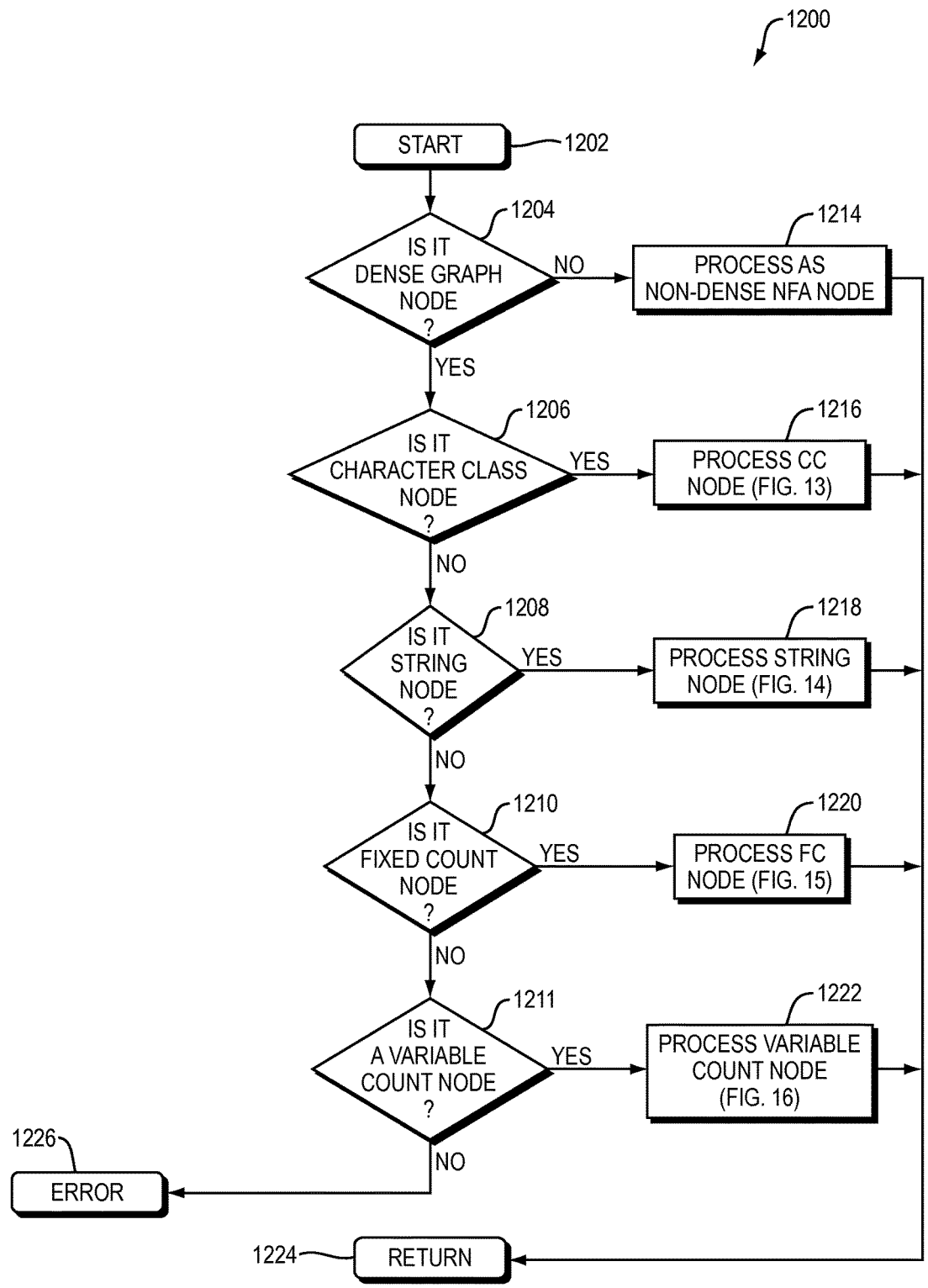
FIG. 12 is a flow diagram illustrating an example embodiment of processing a node.

FIG. 12 is a flow diagram 1200 illustrating an example embodiment of processing a node. The flow diagram 1200 is an expansion of processing a node (1118) of FIG. 11.

The graph walk engine begins processing a node (1202). The graph walk engine determines if the graph walk engine is a dense node (1204). If it is not a dense node, the graph walk engine processes the node as a non-dense NFA node (e.g., a character node, split node, or marked node) (1214). Then the graph walk engine returns (1224).

If the node is a dense graph node (1204), then the graph walk engine determines whether the node is a character class node (1206). If so, the graph walk engine processes the character class node (1216). Processing the character class node is described in more detail in relation to FIG. 13. The graph walk engine then returns (1224).

If the node is not a character class node (1206), the graph walk engine determines whether the node is a string node (1208). If so, the graph walk engine processes the node as a string node (1218). Processing the string node is described in more detail in relation to FIG. 14. The graph walk engine then returns (1224).

If the node is not a string node (1208), the graph walk engine determines whether the node is a fixed count node (1210). If so, it processes the fixed count node (1220). Processing the fixed count node is described in further detail in relation to FIG. 15. The graph walk engine then returns (1224).

In relation to FIG. 12, if node is not a fixed count node (1210), the graph walk engine determines whether the node is a variable count node (1211). If so, the graph walk engine then processes the node as a variable count node (1222). Processing a variable count node is further described in relation to FIG. 16. The graph walk engine then returns (1224). If the graph walk engine determines that the node is not a variable count node (1211), then it returns an error code (1226).

Other embodiments of processing the node can be employed by the graph walk engine. For instance, the graph walk engine can determine the type of the node by checking for each type of node in a different order.

Figure 13:
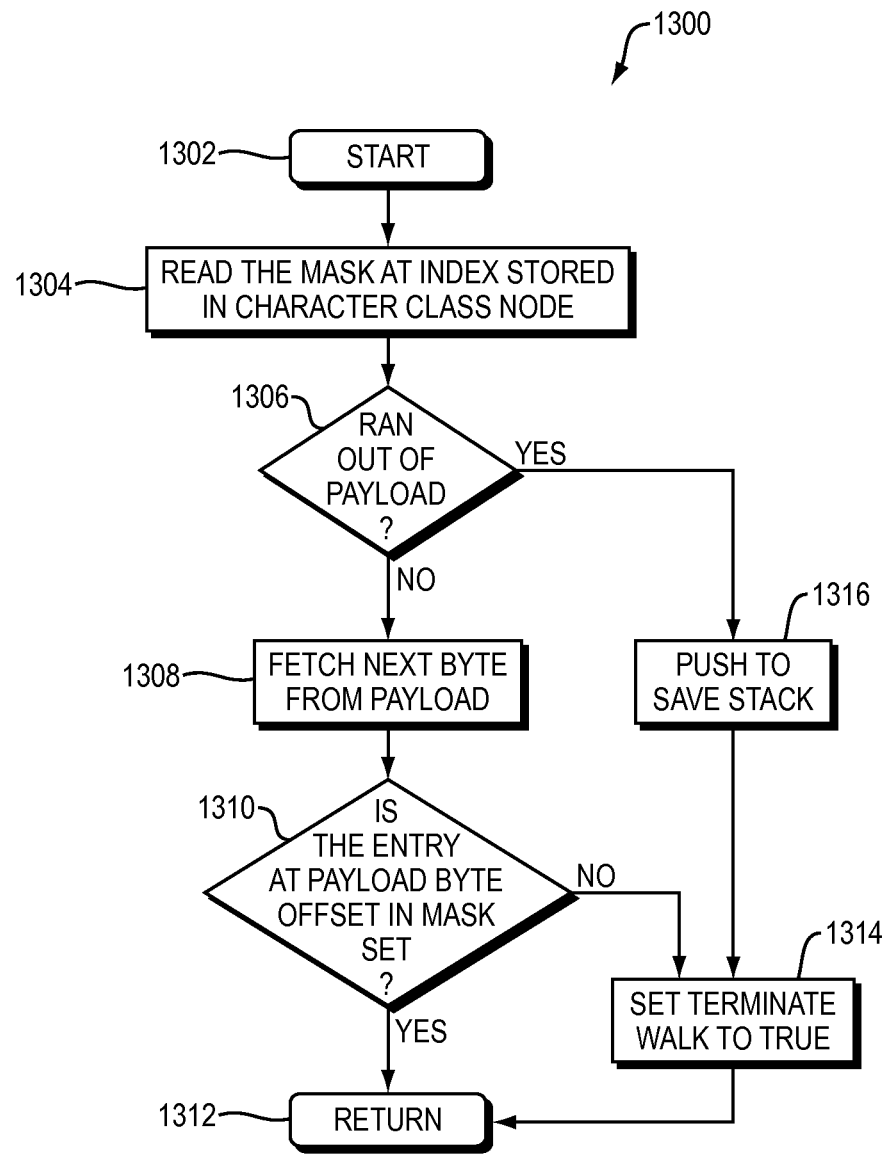
FIG. 13 is a flow diagram illustrating an example embodiment of processing a character class node.

FIG. 13 is a flow diagram 1300 illustrating an example embodiment of processing a character class node. The format of a character class node is described above in relation to FIG. 22. In relation to FIG. 13, the flow diagram 1300 is an expansion of processing the character class node (1216) described in FIG. 12.

FIG. 26 is a table 2600 illustrating an example embodiment of a stack entry pushed in context of processing a character class node type. The stack entry includes a stack entry type 2602 indicating a character class match, an element 2606 indicating a character class index, and a next node address 2608 indicating the next node in the graph. The stack entry further includes a duplicate bit 2612, a reverse bit 2614 indicating if the graph is to be walked in reverse, and an offset bit 2616 indicating the offset of the next byte to process in the payload. The stack entry further includes a match type 2604 and a count value 2610, both of which indicate they are not applicable. The character class stack entry is only queued into the save buffer/stack, and not pushed to the run stack because it is not necessary to push it into the run stack.

In relation to FIG. 13, the graph walk engine begins processing the character class node (1302). The graph walk engine loads a character class index from the character class node (e.g., element 2206 of FIG. 22), and employs the character class index to read the bitmap/mask stored in the two-dimensional matrix (1304). The graph walk engine then checks whether there is at least one more byte in the payload to process (1306).

If there is at least one more byte, the graph walk engine fetches the next byte (or other size of data) from the payload (1308). The graph walk engine uses the byte of the payload to access the bit (or other size of data) of the bitmap/mask and determines whether the bit is set (1310). If the bit is set, the graph walker determines that the byte of the payload matches the character class represented by the node, and returns (1312). If the bit is not set (1310), then the graph walk engine sets the terminate walk bit in the result to "true" (1314) and then returns (1312). The terminate walk bit indicates that the current graph walk did not find a match and indicates that the engine should discontinue the current graph walk thread instead of fetching the next node of the graph.

On the other hand, if the graph walk engine determines that there is no more payload to process (1306), then the graph walk engine pushes the node to the save buffer/stack so that matching can resume for subsequent packets of the same flow (1316). The graph walk engine then sets the terminate walk bit in the result to "true" (1314) and then returns (1312).

Figure 14:
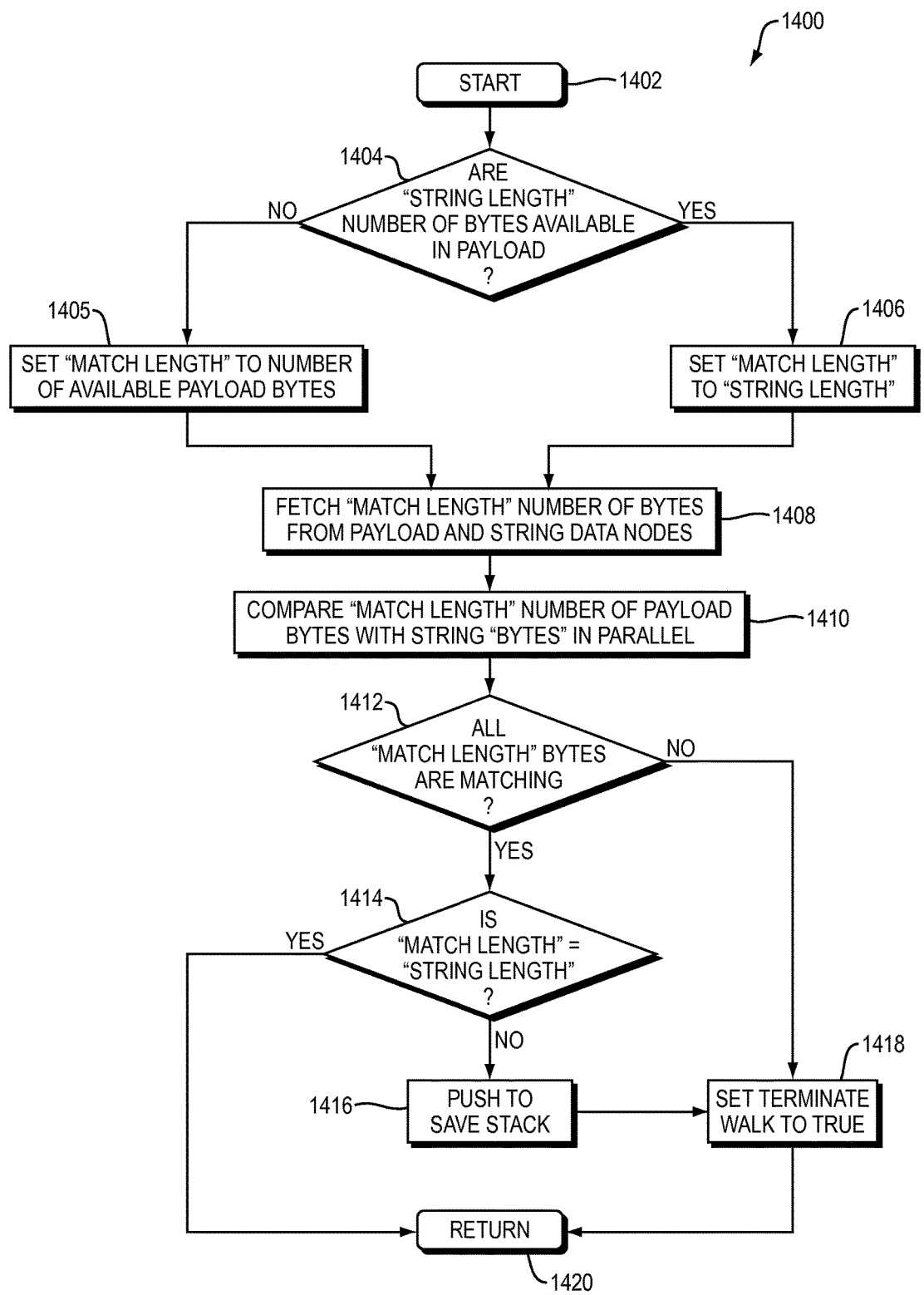
FIG. 14 is a flow diagram illustrating an example embodiment of the graph walk engine processing a string node.

FIG. 14 is a flow diagram 1400 illustrating an example embodiment of the graph walk engine processing a string node. The format of a string node and string data are illustrated in relation to FIG. 23, as described above. In relation to FIG. 14, the flow diagram 1400 is an expansion of processing the string node (1218) described in relation to FIG. 12.

FIG. 27 is a table 2700 illustrating an example embodiment of a stack entry for a string match type. The stack entry includes a stack entry type 2702 indicating a string match, an element 2706 indicating the address of the remaining string data, a next node address 2708 indicating the next node in the graph, and a count value 2710 indicating the remaining length of the string to be processed. The stack entry further includes a duplicate bit 2712 indicating whether the entry in the run stack is a duplicate, a reverse bit 2714 indicating if the graph is to be walked in reverse, and an offset bit 2716 indicating the offset of the next byte to process in the payload. The stack entry further includes a match type 2704 indicating it is not applicable. For string match types, the stack entries are queued to the save buffer/stack as there is no need for them to be pushed to the run stack.

In relation to FIG. 14, the graph walk engine begins processing the string node (1402). The graph walk engine loads string data, which includes the length (e.g., count 2310 of string node 2330 of FIG. 23) of the string from the node, determines the number of bytes (or other size of data) available in the payload, and determines whether the number of bytes available in the payload is equal to or greater than the length of the string (1404). If so, the graph walk engine sets the "match length" to the "string length" (1406). Otherwise, the graph walk engine sets the "match length" to the number of available payload segments (1405). The "match length" is the number bytes of the string that are to be matched to the payload. If the match length is less than the string length (1404), the match length is set to the number of available payload bytes (1405) so that the string can be partially matched, and the match continued with a subsequent packet.

After setting the match length, (1405 or 1406), the graph walk engine fetches a number of bytes from the payload, where the number of bytes is the match length, and also fetches string data nodes (e.g., string data 2340 of FIG. 23) (1408). String data nodes include actual string elements (e.g., element 2316 of string data 2340 of FIG. 23) that are to be compared with the payload segment. The graph walk engine then compares the fetched number of payload segments bytes with the same number of string bytes in parallel (1410). The node then determines whether the "match length" bytes of the payload match all of the fetched bytes of the string (1412). If not, the graph walk engine sets the terminate walk bit of the result to true (1418) and returns (1420). If the bytes of the payload match the bytes of the string (1412), the graph walk engine then determines whether the match length is the same as the string length (1414).

If the match length and string length are the same (1414), the graph walk engine returns (1420). If the match length and string length are not the same (1414), then the graph walk engine pushes a stack entry (FIG. 27) containing the remaining length of the string to match to the save buffer/stack so that remaining "string length" bytes from the subsequent payload of the same flow can be matched to the "remaining string data," along with the information described in relation to FIG. 27 above (1416), sets the terminate walk bit of the result to true (1418) and returns (1420).

Figure 15A:
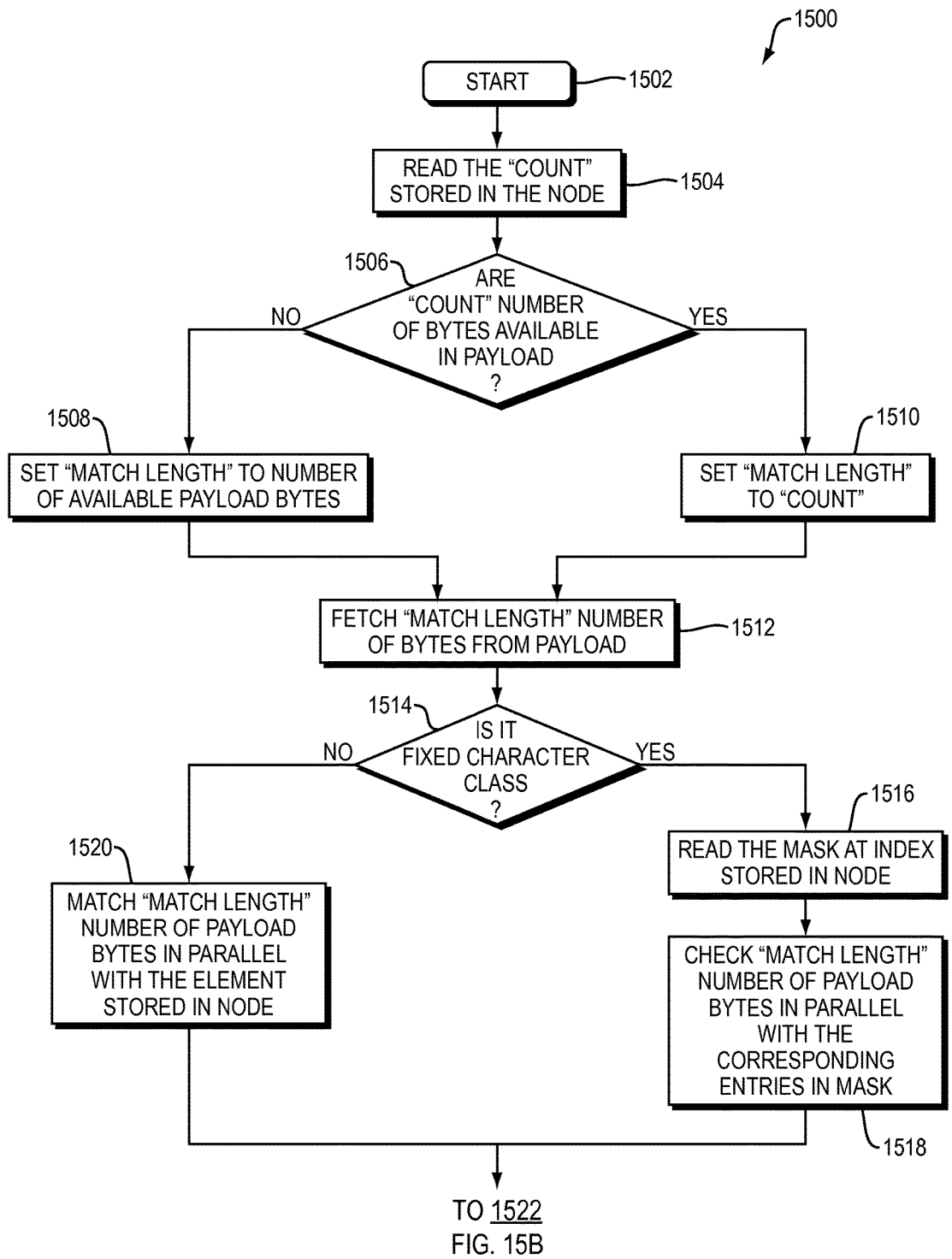
FIGS. 15A and 15B are flow diagrams illustrating an example embodiment of processing a fixed count node.
Figure 15B:
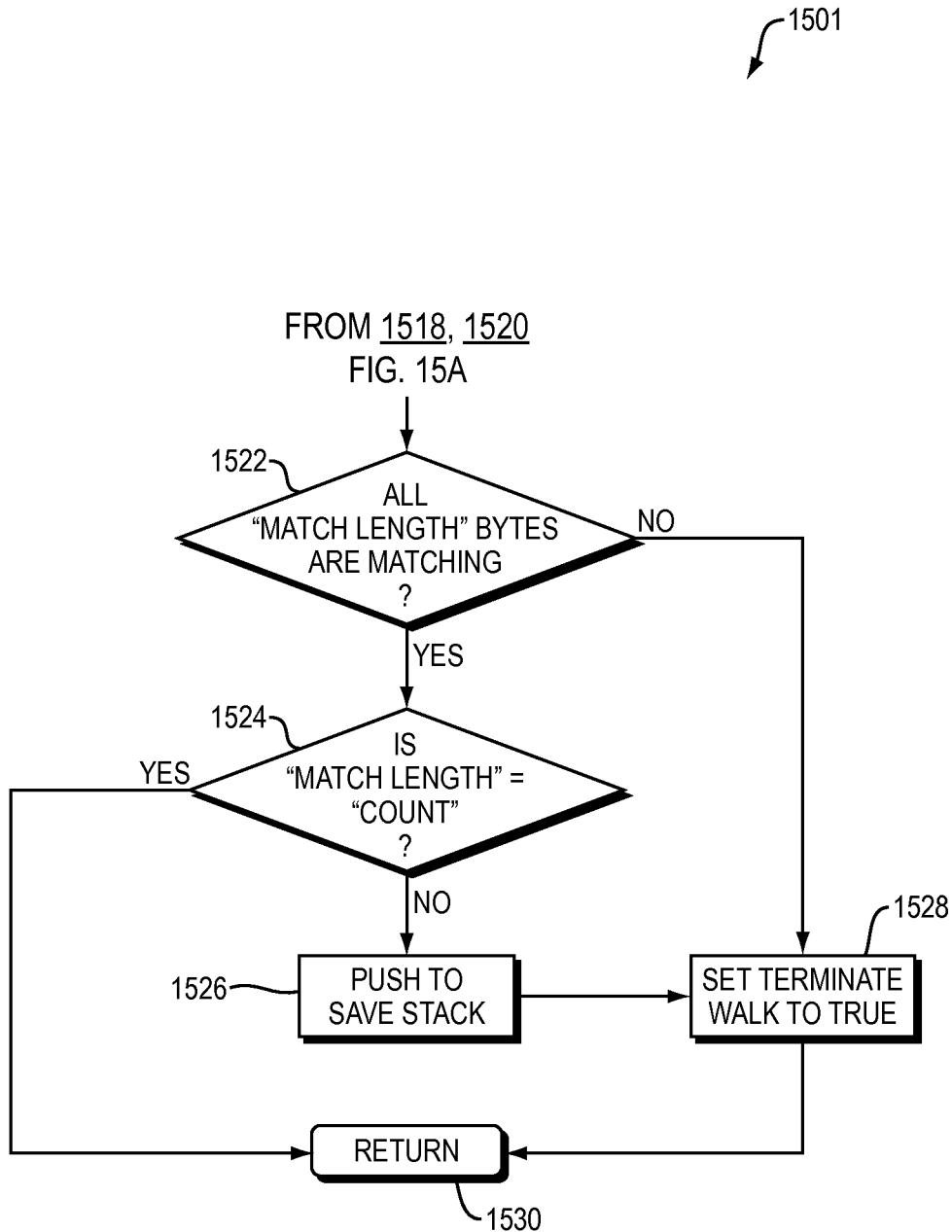

FIGS. 15A and 15B are flow diagrams 1500 and 1501 illustrating an example embodiment of processing a fixed count node. The format of the fixed count node is described in relation to FIG. 24 above. In relation to FIGS. 15A-B, the flow diagrams 1500 and 1501 are expansions of processing the fixed count node (1220) described in relation to FIG. 12.

FIG. 28 is a table 2800 illustrating an example embodiment of a stack entry for a fixed count match type. The stack entry includes a stack entry type 2802 indicating a fixed count match, an element 2806 indicating character or character class index, a next node address 2808 indicating the next node in the graph, and a count value 2810 indicating the remaining count of bytes to match. The stack entry further includes a duplicate bit 2812 indicating whether the node in the run stack is a duplicate, a reverse bit 2814 indicating if the graph is to be walked in reverse, and an offset bit 2816 indicating the offset of the next byte to process in the payload. The stack entry further includes a match type 2804 indicating it is not applicable. For fixed count match types, the stack entries are queued to the save buffer/stack as there is no need for them to be pushed to the run stack.

In relation to FIG. 15A, the graph walk engine begins processing the fixed count node (1502). The graph walk engine reads the "count" (e.g., count value 2410 of FIG. 24) stored in the node (1504). The count stored in the node represents the number of times the character or character class is to be matched to the payload. For instance, for the fixed node derived from the partial pattern "b{5}," the count is 5 because the character 'b' is to be matched 5 times to the payload.

The graph walk engine then determines whether there are "count" number of bytes available in the payload (1506). If so, the graph walk engine sets the match length to "count" (1510). If not, the graph walk engine sets the match length to the number of available payload segments (1508). The "match length" is the number of bytes of the fixed count pattern that are to be matched to the payload. If the match length is less than the count of the fixed count node (1508), the match length is set to the number of available bytes so that the fixed count node can be partially matched, and the match is continued with a subsequent packet of the same flow. After setting the match length (1508 or 1510), the graph walk engine fetches the "match length" number of bytes from the payload (1512).

The graph walk engine then determines whether the node is a fixed count character class node or a fixed count character node, for example, by reading the data in element 2406 of FIG. 24, which indicates a character or an index number of a character class (1514). If it is a fixed count character class node (1514), the graph walk engine reads the character class bitmap/mask using the character class index extracted from the fixed character class node (e.g., element 2406 of FIG. 24) (1516). The graph walk engine then attempts to match the "match length" number of payload segments with the corresponding entries in the mask in parallel (1518). The character class match is performed in the same manner as described above in the context of the character class node. If the node is a fixed count character node (1514), the graph walk engine matches the "match length" number of payload segments in parallel with the element stored in the node (e.g., element 2406 of FIG. 24) (1520).

After determining whether the node is a fixed count character class node or fixed count character node (1514) and responding to the determination (1516 and 1518 or 1520, respectively), referring flow diagram 1501 of FIG. 15B, the graph walk engine determines whether the "match length" number of bytes of the payload match with the character or character class (1522). If so, the graph walk engine then determines whether the match length is the same as the count of the fixed count node (1524). If so, the graph walk engine returns (1530). If not, the graph walk engine pushes a stack entry (FIG. 28) to the save buffer/stack so that the remaining "count" bytes from the subsequent payload of the same flow are matched to the remaining fixed count node element (1526), sets the terminate walk bit of the result to be "true" (1528), and returns (1530).

If the "match length" number of bytes of the payload do not match the character of character class (1522), then the graph walk engine sets the terminate walk bit of the result to true (1528) and returns (1530).

Figure 16:
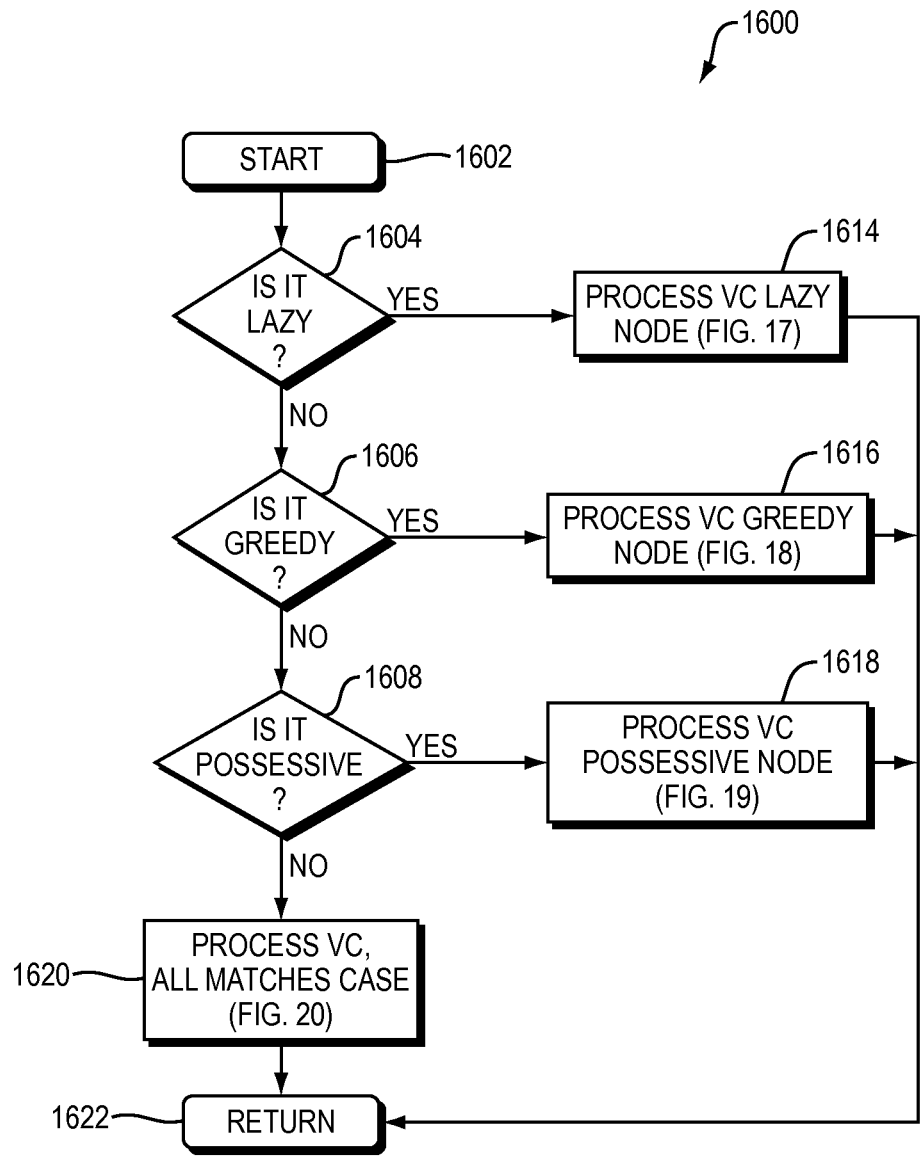
FIG. 16 is a flow diagram illustrating an example embodiment of processing a variable count node.

FIG. 16 is a flow diagram 1600 illustrating an example embodiment of processing a variable count node. The format of a variable count node is described in relation to FIG. 25 above. In relation to FIG. 16, the flow diagram 1600 is an expansion of processing the variable count node (1222) described in relation to FIG. 12.

FIG. 29 is a table 2900 illustrating an example embodiment of a stack entry for a variable count match type. The stack entry includes a stack entry type 2902 indicating a variable count match, an element 2906 indicating character or character class index, a next node address 2908 indicating the next node in the graph, and a count value 2910 indicating the remaining count of bytes to match. The stack entry further includes a duplicate bit 2912 indicating whether the node in the run stack is a duplicate, a reverse bit 2914 indicating if the graph is to be walked in reverse, and an offset bit 2916 indicating the offset of the next byte to process in the payload. The stack entry further includes a match type 2904 indicating whether the node is lazy, greedy, possessive, or all match node. The stack entry can be pushed and popped to the run stack, or in the event of running out of payload, can be copied from the run stack to the save buffer/stack.

In relation to FIG. 16, the graph walk engine begins processing the variable count node (1602). The graph walk engine loads the match type 2504 of FIGS. 25 and determines whether the node match type is lazy (1604). If so, it processes the variable count lazy node (1614), which is explained in further detail in FIG. 17. Then the graph walk engine returns (1622).

If not, the graph walk engine determines whether the node match type is greedy (1606). If so, it processes the variable count greedy node (1616), which is explained in further detail in FIG. 18. Then the graph walk engine returns (1622).

If not, the graph walk engine determines whether the node is possessive match type (1608). If so, it processes the variable count possessive node (1618), which is explained in further detail in FIG. 19. Then the graph walk engine returns (1622).

Figure 20:
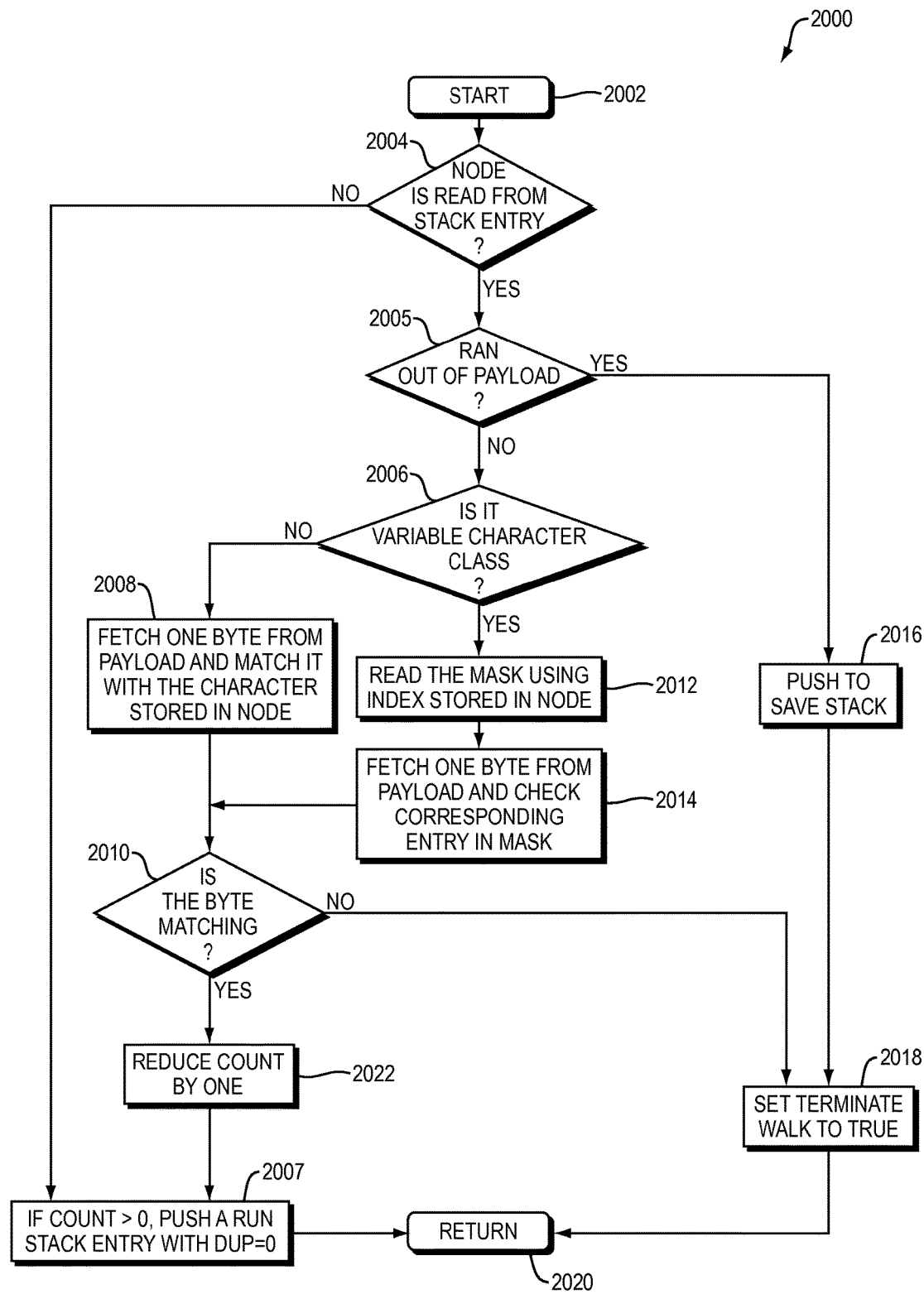
FIG. 20 is a flow diagram illustrating an example embodiment of processing a variable count all match node.

If not, the graph walk engine determines that the node match type is an "all" or "all-match" node and processes the node as a variable count all match node (1620), which is explained in further detail in FIG. 20. Then the graph walk engine returns (1622).

FIG. 17 is a flow diagram 1700 illustrating an example embodiment of processing a variable count lazy node. The format of a variable count node is described in relation to FIG. 25 above, and the format of a variable count stack entry is described in relation to FIG. 29 above. In relation to FIG. 17, the flow diagram 1700 is an expansion of processing the variable count lazy node (1614) described in relation to FIG. 16.

The graph walk engine begins processing the variable count lazy node (1702). The graph walk engine determines whether the node is read from a run stack entry (1704). If the node is not read from a run stack entry, which means the node is being processed for the first time, the graph walk engine determines whether the count (e.g., count value 2510 of FIG. 25) is greater than zero, and if so, it pushes a run stack entry (FIG. 29, 2900) with all relevant information filled as explained above with its duplication bit set to "1" (e.g., duplication bit 2912 of FIG. 29) (1706). The graph walk engine then returns (1724). The pushed run stack entry allows the graph walk engine to remember its return path and continue walking to the next node located at the next node address (e.g., 2508 of FIG. 25). If a match is found while walking the next node path, setting the duplication bit to "1" allows the nodes to be popped and discarded from the run stack. If a match is not found, the nodes can be processed when they are popped from the run stack.

If the node is read from a run stack entry (1704), the graph walk engine then determines whether there is at least one more byte of the payload to be processed (1708). If there are no more bytes of the payload (1708), the graph walk engine pushes a stack entry (FIG. 29, 2900) with the node information to the save buffer/stack (1710), sets the terminate walk bit of the result to "true" (1712) and returns (1724). Pushing the node to the save buffer/stack (1710) saves the progress of the match such that when the graph walk engine processes a subsequent packet belonging to the same application flow, it can load the previous progress of the match from the save buffer/stack and resume matching.

If the payload has not ran out (i.e., if there is at least one byte of payload to be processed) (1708), the graph walk engine determines whether the variable count node is a character class node or a character node by inspecting the element 2906 of FIG. 29 (1714). If the variable count node is a variable count character class node (1714), it reads the bitmap/mask using the character class index stored in the element 2906 of FIG. 29 in the variable count character class node (1720). Then, the graph walk engine fetches one byte from the payload and compares it to the corresponding entry in the bitmap/mask by using the byte from the payload as an index to the bitmap/mask (1722). The graph walk engine determines a match if the entry is set.

On the other hand, if the variable count node is a variable count character node (1714), the graph walk engine fetches one byte from the payload and matches it with the element 2906 of FIG. 29 stored in the node (1716).

After determining whether the node is a variable count character class node or variable count character node (1714) and responding to the determination (1720 and 1722 or 1716, respectively), the graph walk engine determines if the byte matches the element (1718). If so, the graph walk engine decrements the count (e.g., count value 2910 of FIG. 29) by one (1705), pushes a run stack entry (e.g., 2900 of FIG. 29) with the duplication bit (e.g., duplication bit 2912 of FIG. 29) set if the count is greater than zero (1706) and returns (1724). If the count is equal to zero, no entry is pushed into the run stack. Otherwise, the graph walk engine sets the terminate walk bit to "true" in the result (1712) and returns (1724).

Figure 18:
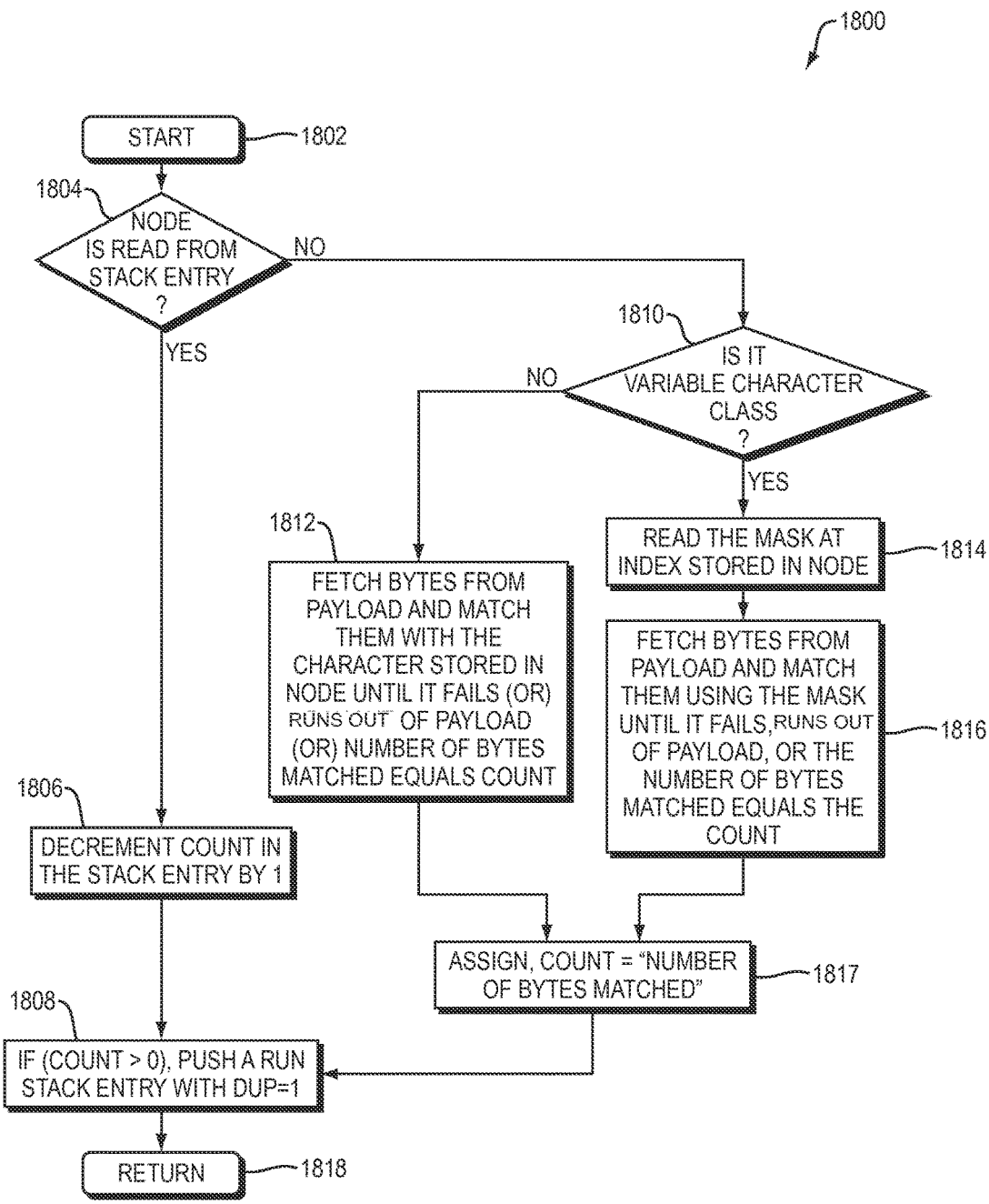
FIG. 18 is a flow diagram illustrating an example embodiment of processing a variable count greedy node.

FIG. 18 is a flow diagram 1800 illustrating an example embodiment of processing a variable count greedy node. The format of a variable count node is described in relation to FIG. 25 above, and the format of a variable count stack entry is described in relation to FIG. 29 above. In relation to FIG. 18, the flow diagram 1800 is an expansion of processing the variable count greedy node (1616) described in relation to FIG. 16.

The graph walk engine begins processing the variable count greedy node (1802). The graph walk engine determines whether the node is read from a run stack entry (1804). If so, the graph walk engine decrements the count (e.g., count value 2910 of FIG. 29) by one in the run stack entry (1806). Then, if the count (e.g., count value 2910 of FIG. 29) is greater than zero, it pushes the run stack entry into the run stack with the duplication bit set (1808). Then the graph walk engine returns (1818).

If the run stack entry is not read from the run stack (i.e., the node is processed for the first time) (1804), the graph walk engine determines whether the variable count node is a variable count character class node or a variable count character node by inspecting the element 2506 of FIG. 25 (1810). If the variable count node is a variable count character class node (1810), it reads the bitmap/mask corresponding to the character class index stored in the variable count character class node by reading the element 2506 of FIG. 25 (1814). Then, the graph walk engine fetches one byte from the payload and compares it to the corresponding entry in the bitmap/mask by using the byte from the payload as an index to the bitmap/mask and continues matching bytes until there is a nomatch or there are no more available bytes in the payload, or the number of bytes matched equals the count value (2510 of FIG. 25) (1816). Then, the graph walk engine assigns count variable (2910 of FIG. 29) to be stored in a run stack entry as the number of bytes the variable count node matched (1817). Then, if the count of the run stack entry is greater than zero, the graph walk engine pushes a run stack entry (2900, FIG. 29) with the duplication bit set as one (1808). If the count of the run stack entry is equal to zero, the graph walk engine does not push a run stack entry. The graph walk engine then returns (1818).

If the node is a variable count character node (1810), the graph walk engine fetches bytes from the payload and matches them with the character stored in the node element (2506, FIG. 25) until it fails, runs out of payload, or the number of bytes matched equals the count (2510, FIG. 25) (1812). Then, the graph walk engine assigns a count value (e.g., count value 2910 of FIG. 29) to be stored in a run stack entry as the number of bytes the variable count node matched (1817).

Figure 19:
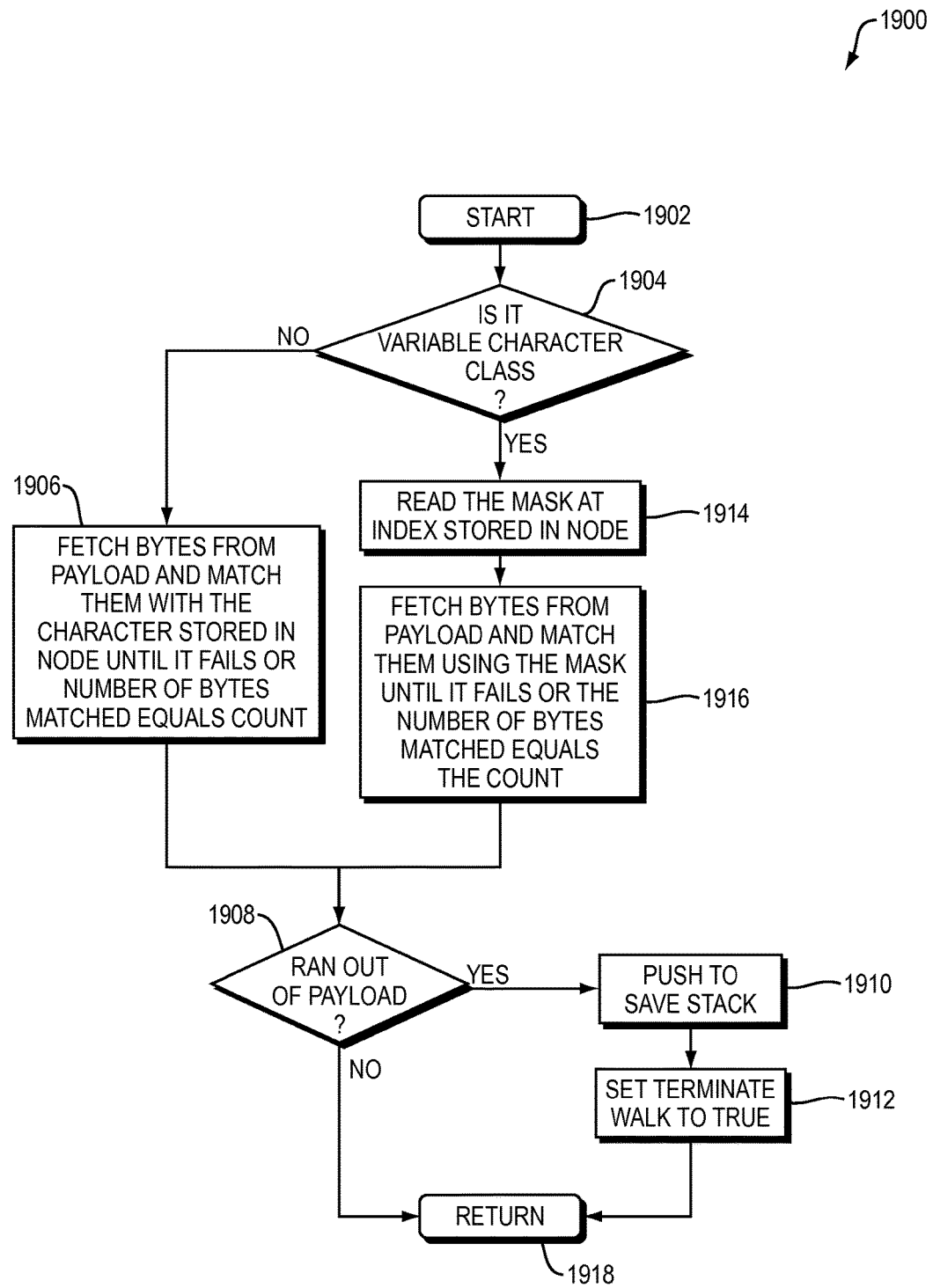
FIG. 19 is a flow diagram illustrating an example embodiment of processing a variable count possessive node.

FIG. 19 is a flow diagram 1900 illustrating an example embodiment of processing a variable count possessive node. The format of a variable count node is described in relation to FIG. 25 above, and the format of a variable count stack entry is described in relation to FIG. 29 above. In relation to FIG. 19, flow diagram 1900 is an expansion of processing the variable count possessive node (1618) described in relation to FIG. 16.

In relation to FIG. 19, the graph walk engine begins processing the variable count node (1902). The graph walk engine determines whether the node is a variable count character class node or a variable count character node by inspecting the element 2506 of FIG. 25 (1904). If the node is a variable count character class node (1904), it reads the bitmap/mask corresponding to the character class index stored in the variable count character class node element (2506, FIG. 25). Then, the graph walk engine fetches bytes from the payload and compares them to the corresponding entry in the bitmap/mask by using the byte from the payload as an index to the bitmap/mask and continues matching bytes until there is a nomatch, there are no more available bytes in the payload or the number of bytes matched equals the count (2510, FIG. 25).

If the node is a variable count character node (1904), the graph walk engine fetches one byte from the payload and compares it to the element (2506, FIG. 25) stored in the node and continues matching bytes until there is a nomatch, there are no more available bytes in the payload, or the number of bytes matched equal the count (2510, FIG. 25) (1906).

After matching bytes from the payload to the character class or value/character/letter (1916 or 1906, respectively), the graph walk engine determines whether there are bytes remaining in the payload (1908). If the graph walk engine has run out of payload (i.e., there are no bytes remaining) (1908), the graph walk engine pushes the node to the save buffer/stack (1910), sets the terminate walk bit to true (1912), and returns (1918). If the graph walk engine has not run out of payload (i.e., there are bytes remaining) (1908), the graph walk engine returns (1918).

FIG. 20 is a flow diagram 2000 illustrating an example embodiment of processing a variable count all match node. The format of a variable count node is described in relation to FIG. 25 above. In relation to FIG. 20, flow diagram 2000 is an expansion of processing the variable count all match node (1620) described in relation to FIG. 16.

The graph walk engine begins processing the variable count node (2002). The graph walk engine determines whether the node is read from a run stack entry (2004). If the node is not read from the run stack (2004), it pushes a run stack entry (FIG. 29, 2900) with the duplication bit (FIG. 29, 2912) unset (e.g., set to 0) (2007). The graph walk engine then returns (2020).

If the node is read from the run stack (2004), the graph walk engine determines whether it has run out of payload (e.g., whether no bytes remain in the payload) (2005). If not, or if bytes remain in the payload, the graph walk engine determines whether the variable count node is a variable count character class node or a variable count character node by inspecting the element 2906 of FIG. 29 (2006).

If the node is a variable count character class node (2006), the graph walk engine reads the bitmap/mask corresponding to the character class index stored in the variable count character class node (2012). Then, the graph walk engine fetches one byte from the payload and compares it to the corresponding entry in the bitmap/mask by using the byte from the payload as an index to the bitmap/mask (2014).

If the node is a variable count character node (2006), the graph walk engine fetches one byte from the payload and compares it to the value/character/letter stored in the node (2008).

After matching the byte of the payload to the character class or character (2014 or 2008, respectively), the graph walk engine determines whether the byte matches the character class or character (2010). If there is a match (2010), the graph walk engine decrements the count (i.e. count value 2910, FIG. 29) by one (2022). If the count is greater than zero, the graph walk engine pushes a run stack entry (FIG. 29, 2900) with the duplication bit (FIG. 29, 2912) unset (e.g., set to 0) (2007) and returns (2020). If the count is equal to zero, the graph walk engine does not push any stack entry and returns (2020). If there is nomatch, the graph walk engine sets the terminate walk bit to true (2018) and returns (2020).

If the graph walk engine has run out of payload, or there are no bytes of payload remaining (2005), the graph walk engine pushes the node to the save buffer/stack (2016). Then the graph walk engine sets terminate walk to true (2018) and returns (2020).

FIG. 21 is a table 2100 illustrating an example embodiment of a bitmap/mask employed in a character class. The table 2100 shows a character class index 2102, a character class definition 2104, and ASCII values 2106. In an embodiment implementing a character class table, a memory may not store the values of the character class index 2102, the character class definition 2104, or the ASCII values 2106; however, they are shown here to illustrate how the character class definitions relate to the character class matrix and how the indices can access the character class matrix. FIG. 21 shows five character class definitions only an example embodiment. Other embodiments can include different kinds of character classes, and the number of unique character classes can be any number.

A character class of [^\n], being assigned a character class index of 1, translates to match every character except for a new line because the "^" operator creates the inverse of whatever follows it, and "\n" indicates a new line. Therefore, every bit in the bitmap/mask is set to "1" except for the ASCII value corresponding to new line, which is 12. Therefore, a node processing a byte having an value of 12 accesses this character class CharacterClassMatrix[1][12], where "1" is the character class index and "12" is the value of the payload to the character class. Since the value at this location in the table is "0," the payload is not a match. However, any other payload loaded into CharacterClassMatrix[1][PayloadByte] results in a match.

A character class of [a-z], being assigned a character class index of 2, translates to match every character in the range of 'a' through 'z.' Therefore, in the bitmap/mask corresponding to character class index 2, the values from 97 through 122 are set as "1" and all other values are set as "0." Therefore, a node processing a payload segment representing the ASCII value "c" accesses CharacterClassMatrix[2][99], where "2" is the character class index and "99" is the value of the payload. Since the value at this location in the table is "1," the payload is a match to the character class. However, payloads outside of the range of 97-122 for this character class are not a match. For example, if the payload is the digit "4," the node accesses CharacterClassMatrix[2][52], which has a value of "0," which indicates a nomatch.

A character class of [^a-z], being assigned a character class index of 3, translates to match every value/character/letter other than those in the range of 'a' through 'z.' Therefore, in the bitmap/mask corresponding to character class index 3, the values from 97 through 122 are set as "0" and all other values are set as "1." Therefore, a node processing a payload segment representing the ASCII value "c" accesses CharacterClassMatrix[3][99], where "3" is the character class index and "99" is the value of the payload. Since the value at this location in the table is "0," the payload is a nomatch to the character class. However, payloads outside of the range of 97-122 for this character class are a match. For example, if the payload is the digit "4," the node accesses CharacterClassMatrix[3][52], which has a value of "1," which indicates a match.

A character class of [0-9], being assigned a character class index of 4, translates to match every value/character/letter in the range of '0' through '9.' Therefore, in the bitmap/mask corresponding to character class index 4, the values from 48 through 57 are set as "1" and all other values are set as "0." Therefore, a node processing a payload segment representing the ASCII value "D" accesses CharacterClassMatrix[4][68], where "4" is the character class index and "68" is the value of the payload. Since the value at this location in the table is "0," the payload is a nomatch to the character class. However, payloads within of the range of 48-57 for this character class are a match. For example, if the payload is the digit "4," the node accesses CharacterClassMatrix[4][52], which has a value of "1," which indicates a match.

A character class of [ABCabc], being assigned a character class index of 5, translates to match the individual values/characters/letters "A", "B", "C", "a", "b", and "c". Therefore, in the bitmap/mask corresponding to character class index 5, the values from 65, 66, 67, 97, 98 and 99 are set as "1" and all other values are set as "0." Therefore, a node processing a payload segment representing the ASCII value "c" accesses CharacterClassMatrix[5][99], where "5" is the character class index and "99" is the value of the payload. Since the value at this location in the table is "1," the payload is a match to the character class. However, payloads other than the values of 65, 66, 67, 97, 98 and 99 for this character class are not a match. For example, if the payload is the digit "4," the node accesses CharacterClassMatrix[5][52], which has a value of "0," which indicates a nomatch.

In an embodiment, the character class matrix can be used for any data type or data length. In the embodiment described above, the payloads are characters, which can be 7-bit or 8-bits. However, data of any length can be employed and does not necessarily have to be in the form of characters. Other encodings of data can be employed. Examples of other applications of such a table are video processing, audio processing, binary searches, or any pattern searching application.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of walking a non-deterministic finite automata (NFA) graph representing a pattern, the method comprising:
by a processor, extracting a node type, a next node address, and an element from a node of the NFA graph; and
by the processor, matching a segment of a payload with the element by matching the payload with the element at least zero times, a number of the at least zero times based on the node type, wherein extracting the node type, next node address, and the element from the node enable the processor to identify the pattern in the payload with less nodes relative to another NFA graph representing the pattern.

2. The method of claim 1, wherein the node type is at least one of a variable count, fixed count, fixed-variable count, character, case insensitive character, character class, case sensitive string, case insensitive string, marked, split.

3. The method of claim 1, further comprising, by the processor, pushing an entry to a run stack, the entry indicating at least one of the node type, an address of a next node in the graph, a payload offset, a count value, a duplicate bit, a reverse bit.

4. The method of claim 3, wherein pushing the entry to the run stack is based on the node type.

5. The method of claim 4, wherein pushing the entry to the run stack is performed if the node type is variable count, fixed-variable count, or split.

6. The method of claim 1, further comprising, by the processor:
popping a top entry of a run stack;
loading a graph node indicated by the popped top entry; and
matching the segment of the payload with the element, the element indicated in the loaded graph node, at a payload offset indicated in the popped top entry.

7. The method of claim 6, wherein popping the top entry of the run stack is performed after a mismatch of matching the segment of the payload with the element.

8. The method of claim 1, further comprising, by the processor:
popping a top entry of a run stack;
extracting graph node information stored in the popped top entry; and
matching the segment of the payload with the element, the element indicated in the extracted graph node, at a payload offset indicated in the popped top entry.

9. The method of claim 1, wherein the node type of string represents a portion of the pattern of a plurality of values, each value being at least one of a byte, letter, or character.

10. The method of claim 1, wherein matching the segment of the payload with the element associated with the node type of string includes matching at least two values within the segment against respective values of the string stored as the element in the node.

11. The method of claim 10, further comprising:
if the segment partially matches the element and if the length of the payload is shorter than the length of the string stored as the element of the node, loading a next payload of a same flow of the payload and continuing matching remaining values in the string to the values in the next payload.

12. The method of claim 11, further comprising pushing a partial match to a save buffer to be loaded upon loading the next payload of the same flow of the payload.

13. The method of claim 12, wherein pushing the partial match to the save buffer includes storing a current run stack entry being processed in the save buffer; and further comprising:
upon loading the next payload, copying the stored at least one entry in the save buffer to the run stack.

14. The method of claim 1, wherein matching the segment of the payload with the element associated with the node type of variable count includes matching with the element a variable number of times indicated by a count value extracted from the node.

15. The method of claim 14, wherein the variable number of times are at least zero times, at most a finite number of times, or at most an infinite number of times.

16. The method of claim 1, wherein the node type further indicates that the variable count node is a greedy node, lazy node, possessive node, or all match node.

17. The method of claim 1, wherein matching the segment of the payload with the element if the node type is variable count lazy node includes returning the shortest match found in the payload.

18. The method of claim 1, wherein matching the segment of the payload with the element if the node type is variable count lazy node includes pushing a stack entry to a run stack, the stack entry indicating the variable count lazy node and payload offset, and loading a next node at the next node address in the graph.

19. The method of claim 18, wherein matching the segment of the payload with the element if the node type is variable count lazy node includes, if matching the next node element with the segment is a mismatch, popping the node of the node type of variable count lazy node from the stack entry of the run stack, and matching the element stored in the popped node with the payload segment.

20. The method of claim 19, wherein upon matching the segment of the payload with the element stored in the popped node, reducing a count value of the variable count lazy node, pushing an updated stack entry to the run stack and loading a next node at the next node address stored in the popped entry.

21. The method of claim 18, wherein if the segment of the payload continues in a next payload of a same flow of the first payload, further comprising:
pushing the run stack entry to a save buffer; and
upon loading the next payload, loading the save buffer entries into the run stack.

22. The method of claim 1, wherein matching the segment of the payload with the element if the associated node type is variable count greedy node or variable count possessive node includes returning a longest match found in the payload.

23. The method of claim 1, wherein matching the segment of the payload with the element if the node type is variable count greedy node includes:
fetching at least one segment of the payload,
matching the at least one segment to the element, and
if there is a nomatch and at least one segment matches the element a number of times less than or equal to a variable count in the variable count greedy node, or no more segments of the payload are available:
pushing a run stack entry storing the node type of the node, a payload offset of the at least one segment of the payload, and a number of segments matched, if the number of segments matched indicates the element has been matched less than a maximum number of times,
fetching a next node of the NFA graph indicated by the next node address, and
continuing matching a next segment of the payload indicated by a position after the payload offset with a second element of the next node, wherein if there is a nomatch, popping the run stack entry from the run stack, decrementing a number of segments matched count, pushing the updated run stack entry back to the run stack, and continuing matching the next segment of the payload from the offset stored in the popped entry with the element of a next node stored at the next node address in the popped entry.

24. The method of claim 1, wherein matching the segment of the payload with the element if the node type is variable count possessive node includes continually matching the payload segment to the element until a nomatch or a count of the variable count possessive node indicates the element has been matched a maximum number of times, and then continuing to match the subsequent segment of the payload with the next node stored at the next node address.

25. The method of claim 1, wherein matching the segment of the payload with the element if the node type is variable count all match node includes returning all matches found in the payload.

26. The method of claim 1, wherein matching the segment of the payload with the element if the node type is variable count all match node includes matching the segment to the element, and if it is a match, pushing a stack entry to a run stack, the stack entry indicating the variable count all match node and payload offset with an indication to continue matching the NFA graph, and loading a next node at the next node address, and if it is a nomatch, popping the stack entry from the run stack.

27. The method of claim 1, wherein the node type of fixed count represents a portion of the pattern to match for an element a fixed number of times.

28. The method of claim 27, wherein the element of the node type of fixed count can be character, character class or string.

29. The method of claim 1, wherein matching the segment of the payload with the element associated with the node type of fixed count includes matching at least two values within the segment against a value of the element stored in the node.

30. The method of claim 29, further comprising:
if the segment matches the element and if the length of the payload is shorter than the count of the fixed count node, loading a next payload of a same flow of the payload and continuing matching the remaining values in the element to the values in the next payload.

31. The method of claim 1, wherein the element can be at least one of a character, character class and string.

32. The method of claim 1 wherein the node type of character class represents a portion of the pattern to match an element by employing a Boolean-or operation of at least one value.

33. The method of claim 32, wherein each character class is stored in a memory as a mask, wherein an indicator corresponding to each possible character in the mask is set if the character is part of the character class, and not set if it is not part of the character class.

34. The method of claim 1, wherein upon the successful match, loading, from the next node address extracted from the node, a second node of the NFA graph.

35. The method of claim 1, wherein:
if the node type is variable count, extract a count value from the node, the count value indicates a maximum number of times to match with the element,
if the node type is fixed count, extract a count value from the node, the count value indicates an exact number of times to match with the element,
if the node type is string, extract a count value from the node, the count value indicates a length of the string, and
if the node type is fixed-variable count, extract two count values from the node, a first count value indicates an exact number of times to match with the element and a second count value indicates a maximum number of times to match with the element.

36. The method of claim 1, wherein matching the segment of the payload with the element associated with the node type of marked includes indicating a match is found, and popping any entries in a run stack, or, if indicated in the node, continuing walking, in a reverse direction, a next node at the next address indicated in the node.

37. A system for walking a non-deterministic finite automata (NFA) graph representing a pattern, the system comprising:
a memory; and
a processor, the processor coupled to the memory and configured to extract a node type, next node address, count value, and an element from a node of the NFA graph, the processor further configured to match a segment of a payload for the element by matching the payload for the element at least zero times, a number of the at least zero times based on the node type, wherein extracting the node type, next node address, and the element from the node enable the processor to identify the pattern in the payload with less nodes relative to another NFA graph representing the pattern.

38. The system of claim 37, wherein the node type is at least one of variable count, fixed count, fixed count and variable count, character, case insensitive character, character class, string, case insensitive string, marked and split.

39. The system of claim 37, wherein the processor is further configured to push an entry to a run stack, the entry indicating at least one of the node type, an address of a next node in the graph, a duplicate bit, a reverse bit.

40. The system of claim 39, wherein the processor is further configured to push the entry to the run stack based on the node type.

41. The system of claim 40, wherein the processor is further configured to push the entry to the run stack if the node type is variable count, fixed-variable count, or split.

42. The system of claim 37, wherein the processor is further configured to:
pop a top entry of the run stack;
load a graph node indicated by the popped top entry; and match the segment of the payload for the element, the element indicated in the loaded graph node, at the payload offset indicated in the popped top entry.

43. The system of claim 42, wherein the processor is further configured to pop the top entry of the run stack after a mismatch of matching the segment of the payload with the element.

44. The system of claim 37, wherein the processor is further configured to:
pop a top entry of the run stack;
extract graph node information stored in the popped top entry; and
match the segment of the payload for the element, the element indicated in the extracted graph node, at the payload offset indicated in the popped top entry.

45. The system of claim 37, wherein the node type of string represents a portion of the pattern of a plurality of values, each value being at least one of a byte, letter, or character.

46. The system of claim 37, wherein the processor is further configured to match the segment of the payload for the element associated with a node type of string by comparing at least two values within the segment against respective values of the string stored as the element in the node.

47. The system of claim 46, wherein the processor is further configured to, if the segment partially matches the element and if the length of the payload is shorter than the length of the string stored as the element of the node, load a next payload of a same flow of the payload and continuing matching remaining values in the string to the values in the next payload.

48. The system of claim 47, wherein the processor is further configured to push a partial match to a save buffer to be loaded upon loading the next payload of the same flow of the payload.

49. The system of claim 48, wherein the processor is further configured to push the partial match to the save buffer by storing a current run stack entry being processed in the save buffer and, upon loading the next payload, copy the stored at least one entry in the save buffer to the run stack.

50. The system of claim 37, wherein the processor is further configured to match with the element a variable number of times indicated by a count value extracted from the node.

51. The system of claim 37, wherein the variable number of times are at least zero times, at most a finite number of times, or at most an infinite number of times.

52. The system of claim 37, wherein the node type further indicates that the node is a greedy node, lazy node, possessive, or all match node.

53. The system of claim 37, wherein the processor is further configured to, if the node type is variable count lazy node, includes returning the shortest match found in the payload.

54. The system of claim 37, wherein the processor is further configured to, if the node type is variable count lazy node, push a stack entry to a run stack, the stack entry indicating the variable count lazy node and payload offset, and load a next node at the next node address in the graph.

55. The system of claim 54, wherein the processor is further configured to, if matching the next node element with the segment is a mismatch, pop the node of the node type of variable count lazy node from the stack entry of the run stack, and matching the element stored in the popped node with the payload segment.

56. The system of claim 55, wherein the processor is further configured to, upon matching the segment of the payload with the element stored in the popped node, reduce a count value of the variable count lazy node, push an updated stack entry to the run stack, and load a next node at the next node address stored in the popped entry.

57. The system of claim 54, wherein the processor is further configured to, if the segment of the payload continues in a next payload of a same flow of the first payload, push the run stack entry to a save buffer, and upon loading the next payload, load the save buffer entries into the run stack.

58. The system of claim 37, wherein the processor is further configured to, if the node type is variable count greedy node or variable count possessive node, return the longest match found in the payload.

59. The system of claim 37, wherein the processor is further configured to, if the node type is variable count greedy node,
fetch at least one segment of the payload,
match the at least one segments to the element,
if there is a nomatch and at least one segment matches the element a number of times less than or equal to a variable count in the variable count greedy node, or no more segments of the payload are available:
push a run stack entry storing the node type of the node, a payload offset of the at least one segment of the payload, and a number of segments matched, if the number of segments matched indicates the element has been matched less than a maximum number of times,
fetch a next node of the NFA graph indicated by the next node address, and
continue matching a next segment of the payload indicated by a position after the payload offset with a second element of the next node, wherein if there is a nomatch, pop the run stack entry from the run stack, decrement a number of segments matched count, pushing the updated run stack entry back to the run stack, and continue matching the next segment of the payload from the offset stored in the popped entry with the element of a next node stored at the next node address in the popped entry.

60. The system of claim 37, wherein the processor is further configured to, if the node type is variable count possessive node, continually match the payload segment to the element until a nomatch or a count of the variable count possessive node indicates the element has been matched a maximum number of times, and then continuing to match the subsequent segment of the payload with the next node stored at the next node address.

61. The system of claim 37, wherein the processor is further configured to, if the node type is variable count all match node, return all matches found in the payload.

62. The system of claim 37, wherein the processor is further configured to, if the node type is variable count all match node, match the segment to the element, and if it is a match, pushing a stack entry to a run stack, the stack entry indicating the variable count all match node and payload offset with an indication to continue matching the NFA graph, and loading a next node at the next node address, and if it is a nomatch, popping the stack entry from the run stack.

63. The system of claim 37, wherein a node type of fixed count represents a pattern to match for an element a fixed number of times.

64. The system of claim 63, wherein an element can be at least one of a character, character class and string.

65. The system of claim 37, wherein the processor is further configured to match the segment of the payload with the element associated with the node type of fixed count by matching at least two values within the segment against a value of the element stored in the node.

66. The system of claim 65, wherein the processor is further configured to, if the segment matches the element and if the length of the payload is shorter than the count of the fixed count node, load a next payload of a same flow of the payload and continue to match the remaining values in the element to the values in the next payload.

67. The system of claim 37, wherein the element can be at least one of a character, character class and string.

68. The system of claim 37, wherein the node type of character class represents a portion of the pattern to match an element by employing a Boolean-or operation of at least one value.

69. The system of claim 68, wherein each character class is stored in a memory as a mask, wherein an indicator corresponding to each possible character in the mask is set if the character is part of the character class, and not set if it is not part of the character class.

70. The system of claim 37, wherein upon the successful match, loading, from the next node extracted from the node, a second node of the NFA graph.

71. The system of claim 37, wherein the processor is further configured to:
   if the node type is variable count, extract a count value from the node, the count value indicates a maximum number of times to match with the element,
   if the node type is fixed count, extract a count value from the node, the count value indicates an exact number of times to match with the element,
   if the node type is string, extract a count value from the node, the count value indicates a length of the string, and
   if the node type is fixed-variable count, extract two count values from the node, a first count value indicates an exact number of times to match with the element and a second count value indicates a maximum number of times to match with the element.

72. The system of claim 37, wherein the processor is further configured to match the segment of the payload with the element associated with the node type of marked by indicating a match is found, and popping any entries in a run stack, or, if indicated in the node, continuing walking, in a reverse direction, a next node at the next address indicated in the node.

* * * * *